(12) United States Patent
Lehmann et al.

(10) Patent No.: US 8,126,903 B2
(45) Date of Patent: Feb. 28, 2012

(54) COMPUTER IMPLEMENTED METHOD FOR ALLOCATING DRIVERS AND PASSENGERS SHARING A TRIP

(75) Inventors: Jens Lehmann, Walldorf (DE); David Sommer, Walldorf (DE)

(73) Assignee: SAP AG, Walldorf (DE)

( * ) Notice: Subject to any disclaimer, the term of this patent is extended or adjusted under 35 U.S.C. 154(b) by 248 days.

(21) Appl. No.: 12/643,165

(22) Filed: Dec. 21, 2009

(65) Prior Publication Data

US 2011/0153629 A1 Jun. 23, 2011

(51) Int. Cl.
G06F 7/00 (2006.01)
G06F 17/30 (2006.01)
(52) U.S. Cl. ........................................ 707/758; 707/736
(58) Field of Classification Search ................... None
See application file for complete search history.

(56) References Cited

U.S. PATENT DOCUMENTS 4,626,836 A 12/1986 Curtis et al.
(Continued)

*Primary Examiner* — Hung T Vy
*Assistant Examiner* — Tuan A Pham
(74) *Attorney, Agent, or Firm* — Kenyon & Kenyon LLP

(57) ABSTRACT

Techniques for allocating drivers and passengers sharing a trip. The techniques may include a trip sharing service comprising receiving a first service request; specifying a first potential trip data object by the trip sharing service and executing a matching method. Matching may include checking a first potential trip data object against at least a second potential trip data object. Matching may further include comparing the specifications of the first potential trip data object with the specifications of the at least one second potential trip data object, determining the degree of congruency of the specifications of the compared potential trip data objects, assigning one role to a first and a second user, and adding the second potential trip data object to a result list in case the determined degree of congruency between the first and the second potential trip data object exceeds a predefined threshold.

20 Claims, 16 Drawing Sheets

U.S. PATENT DOCUMENTS

| | | |
|---|---|---|
| 5,070,470 A | 12/1991 | Scully et al. |
| 6,363,352 B1 | 3/2002 | Dailey et al. |
| 6,388,772 B1 | 5/2002 | Williams |
| 7,082,402 B2 | 7/2006 | Conmy et al. |
| 7,974,849 B1 | 7/2011 | Begole et al. |
| 2001/0014866 A1 | 8/2001 | Conmy et al. |
| 2001/0014867 A1 | 8/2001 | Conmy |
| 2002/0016729 A1 | 2/2002 | Breitenbach et al. |
| 2003/0004772 A1 | 1/2003 | Dutta et al. |
| 2003/0040946 A1 | 2/2003 | Sprenger et al. |
| 2003/0204474 A1 | 10/2003 | Capek et al. |
| 2004/0039630 A1 | 2/2004 | Begole et al. |
| 2004/0167877 A1 | 8/2004 | Thompson, III |
| 2005/0033614 A1* | 2/2005 | Lettovsky et al. .......... 705/5 |
| 2005/0154620 A1 | 7/2005 | Hentschel et al. |
| 2005/0193011 A1 | 9/2005 | Peebles et al. |
| 2005/0262164 A1 | 11/2005 | Guiheneuf et al. |
| 2006/0106655 A1* | 5/2006 | Lettovsky et al. .......... 705/6 |
| 2006/0155591 A1* | 7/2006 | Altaf et al. .................. 705/5 |
| 2006/0206363 A1 | 9/2006 | Gove |
| 2006/0276960 A1* | 12/2006 | Adamczyk et al. ........ 701/201 |
| 2007/0033103 A1 | 2/2007 | Collins et al. |
| 2007/0143412 A1 | 6/2007 | Qi |
| 2009/0031232 A1 | 1/2009 | Brezina et al. |
| 2009/0083229 A1 | 3/2009 | Gupta |
| 2009/0327169 A1 | 12/2009 | Kamar et al. |

* cited by examiner

COMPUTER IMPLEMENTED METHOD FOR ALLOCATING DRIVERS AND PASSENGERS SHARING A TRIP

FIELD OF THE INVENTION

The present invention relates to the field of data processing, and more particularly to a computer implemented method for allocating drivers and passengers sharing a trip.

BACKGROUND AND RELATED ART

The most convenient and usually quickest way for door-to-door transport is the usage of a private car. Said means of transport is however expensive and connected with negative consequences on the environment in respect of noise and pollution. In most cases a car transports only one or two persons although most cars provide room for four or even more persons. Several trip-sharing services help to bring together persons having the same or very similar trip plans thereby reducing damage to the environment reducing traffic congestions and reducing travel costs for all participants.

Current trip-sharing services usually require its users to execute several manual steps to find potential trip accompanies for a planned trip, to contact the potential trip accompany and to meet an agreement regarding the departure time and place, the payment and other aspects of the trip. This is a time consuming task: a user usually has to log into the web portal of the trip-sharing service he is registered at, has to search for planned trips of other registered users having the same or a similar place of time of departure or arrival. In addition to checking these basic data of the planned trips the user has to manually check whether the other user fits to his own personality e.g. in regard of smoking habits or taste in music. Finally the communication between the potential trip accompanies according to current trip-sharing services requires an exchange of emails, phone calls or other manual activities for reaching an agreement among the participants.

SUMMARY OF THE INVENTION

The present invention relates to a computer implemented method for allocating drivers and passengers sharing a trip.

Preferred embodiments of the present invention relate to a method being provided to users in the form of a trip sharing service. A trip sharing service according to further embodiments of the invention is a computer implemented service operable to maximize the users' convenience regarding the organization of shared trips, in particular regarding the task of finding appropriate trip accompanies and regarding the allocation of trip accompanies to each other as trip accompanies.

A particularly advantageous feature according to preferred embodiments of the invention is the provision of an intelligent matching method for detecting potential trip accompanies having a high degree of congruency regarding their trip plans and regarding the personalities. The matching method is operable to evaluate a multitude of user preferences for the arrangement of a shared trip. Upon receipt of a service request, the trip sharing service according to further embodiments of the invention creates a potential trip data object and uses the specifications given in the service request and, depending on the embodiment, the specifications of the user profile, to specify the created potential trip data objects.

A data object is a data entity that can be uniquely identified and be manipulated by the commands of a programming language. A trip data object is a data object stored to a storage medium, e.g. a database, or held in memory of a processing device, which comprises data characterizing details of a trip. A potential trip data object is a trip data object representing a trip in the 'real world' planned by a user which has not yet taken place. According to some embodiments of the invention, trip related parameters, e.g. the time of departure and arrival and the place of departure and the destination location specify a potential trip data object. According to further embodiments of the invention, a potential trip data object in addition comprises user related data, e.g. smoking preferences or the taste in music of the user. User related preferences are derived from the settings of the user profile but can be overridden by user related parameters comprised in the service request. Two compared potential trip data objects will not match in case the place of departure of the passenger is not within the pickup area of the driver.

The potential trip data object is compared with existing trip data objects stored in a database of the trip sharing service in a matching method of the trip sharing service. The matching method determines the degree of congruency of the specifications of the newly created trip data object with all the existing potential trip data objects.

According to a further embodiment of the invention, users corresponding to potential trip data objects having a high degree of congruency when compared to each other in the matching method can be automatically or semi-automatically allocated to each other as trip accompanies. This feature is particularly advantageous as it reduces the time and effort that is currently required to reach an agreement with a potential trip accompany upon the details of the trip. Those details are for example the pick-up and drop off place, the starting time or the price. The time and effort required for reaching an agreement upon the details of the trip does not pay off for short trips, e.g. trips from home to work and back executed daily by millions of commuters, based on current trip sharing services. The trip sharing service according to further embodiments of the invention solves said tasks automatically or semi-automatically, thereby significantly reducing time and effort spent currently by the users to agree on the trip details. Thereby, the service facilitates in particular the allocation of trip accompanies for short distance trips. Short distance trips make up a large fraction of the total car traffic.

A further advantage of said automation is that persons being less internet savvy do not have to login to a service portal multiple times, click through long lists of potential trip accompanies and exchange multiple emails.

According to a further embodiment of the invention, the submission of one email request and the receipt of a second email comprising the details of an arranged shared trip may be the only two situations in which a user has to use electronic communication technology in order to arrange a trip with the help of the trip-sharing service.

The allocation of trip accompanies based on the congruency of their respective trip specifications and their respective user preferences is a fairer way of allocating free car seats than the allocation methods of current trip-sharing services. Currently, users investing more time in finding appropriate trip accompanies have a higher chance of finding a matching person than a person spending less time in the search.

The trip-sharing service according to further embodiments of the invention provides an improved automatic multi-dimensional and adaptive matching method for determining potential trip accompanies.

According to further embodiments of the invention the trip-sharing service in addition to the matching method provides an efficient method for allocating users sharing a high matching score to each other as trip accompanies.

According to further embodiments the matching method of the trip-sharing service is able to intelligently and dynamically assign one of the matching users a driver role and the other matching user a passenger role. The matching method thereby considers at least the driver/passenger preferences of each user. According to further embodiment of the invention, the matching method in addition considers the place of departure of all matching trip accompanies in relation to the destination location in the assignment of the driver and passenger role. The users of the trip-sharing service according to preferred embodiments of the invention are able to specify their preference to act as driver in the form of a value of a scale ranging for example from 0 to 10. The scale value 0 indicates that a driver never wants or is not able to act as driver. The maximum scale level indicates that a user always wants to drive but the user may also specify in between values therein scale values residing in the middle of the scale indicate that a user is likewise willing to act as driver or as passenger. The users preference to act as passenger is considered to be inverse to his preference to act as driver: a person having the value ZERO in said scale is considered never to act as driver and to be a categorical passenger. A user having the highest possible scale value is considered as categorical driver never acting as passenger. The user may also determine a low scale value indicating that he prefers to act as passenger but may also act as driver if no driver can be found by the trip-sharing service for the requested trip. Further embodiments of the invention use scales comprising more or less than the said 11 different scale values 0-10, or use the scale to indicate the preference of a user to act as passenger.

The allocation of roles by the trip-sharing service may in addition determine the distance of the departure location of both allocated persons from the destination location and may, based on that data in the user's preferences to act as a driver or passenger, assign the driver and passenger roles.

Current trip-sharing services use only two discreet 'driver' or 'passenger' attributes and do not allow a user to gradually adapt his preference to act as driver. Surely there exist cases of users who can never act as driver, e.g. persons not owning a car or not having a driving license, and of users who always want to act as drivers. However, it will be often the case that a user owns a car but wants to save money by sharing his car with others or by acting as car passenger. This kind of user may be assigned the driver or the passenger role depending on the peculiarities of each particular case.

A significant disadvantage of many car sharing services currently available is that the number of passengers by far exceeds the number of drivers. As a result many trip-sharing requests cannot be matched and will not result in the arrangement of a shared trip. The trip-sharing service according to preferred embodiments of the invention solves this problem by dynamically allocating driver roles resulting in a much higher fraction of successfully mediated shared trips: in case none of two matching persons is particularly keen on acting as driver for a particular trip but both users match very well in other regards, e.g. regarding the specifications of the trip plans and user-related preferences, one person having a preference to drive greater than 0 may be dynamically assigned the role of a driver by the trip-sharing service.

A further advantage of the matching method of the trip-sharing service according to further embodiments of the invention is the ability of the matching method to automatically compare a multitude of personality features and trip-related features very quickly. According to current trip-sharing services the registered users have to manually login to the service portal, search for planned trips of other users planning to travel to the same or a nearby destination location at the same time. In case a user detected a potential trip accompany whose trip plans matched according to said basic trip data (time and place of a trip) he or she currently has to manually evaluate whether the potential trip accompany is acceptable regarding additional features of the person. Said features are features which can be of relevance during the time spent together on the trip. Such features can be the preferred age, the preferred gender and the preferred smoking habits of a trip accompany. Said features can also comprise the taste in music of the user and the preferred experience or preferred manners of driving of a trip accompany acting as driver. This manual evaluation may take considerable time and effort and the user may soon lose track of the best matching candidate if the number of potentially trip accompanies is high.

The trip matching method according to a preferred embodiment of the invention helps to save time and effort by automating this evaluation step and by matching users automatically based on their specifications of planned trips and based on user-related specifications. Such features can be the preferred age, the preferred gender and the preferred smoking habits of a trip accompany. Said features can also comprise the taste in music of the user and the preferred experience or preferred manners of driving of a trip accompany acting as driver. In addition a user of the trip-sharing service according to further embodiments of the invention may specify that he solely or preferentially wants to share a trip with members of the same social group. The social group can be the group of employees of a company or of a department of a company. The group may be derived from the user's profiles of various social networks such as Facebook or Xing. The social group can also be specified within the trip-sharing service. A further feature that can be considered by the matching method is acquaintance of users of the trip-sharing service with each other. A user who has shared a trip multiple times with another user of the service may specify in his user profile that he preferentially wants to share trips with persons he already knows from previous shared trips.

According to a further embodiment of the invention the user profiles available for the trip-sharing service are selected from the group consisting of social communities, employee profile lists of companies, LDAP directories and user profile lists. Various software modules being able to pass the profile data of various social networks and user repositories have been developed to extract user-related data and to define user profiles according to the requirements of the trip-sharing service.

According to a further embodiment of the invention the user can evaluate former trip accompanies. The evaluation comprises criteria such as cleanliness of the car or the person himself, kindliness and friendliness of the driver or passenger, driving skills and further criteria. A user can evaluate and assign a grade to each of these criteria. The result of the feedback information provided by one or multiple users can be used as additional specification in the matching method: a user may specify that he or she wants to share a trip only with persons having been evaluated positively by a minimum number of other users or have reached a positive evaluation score exceeding a particular threshold.

According to a further embodiment, registered users having used the trip-sharing service to organize a shared trip receive at the end of the respective month a message reminding the user to provide feedback information on the trip accompanies he has not evaluated yet. The message can comprise a link to facilitate the process of logging into the trip-sharing service portal and to provide feedback information on past trips.

A further advantageous feature of the matching method according to further embodiments of the invention is the consideration of a price specification during the match. The price specification of both matching users is used to determine a final price. The price determination by the matching method can be adapted in order to increase the efficiency and utilization of the service and to increase the number of drivers participating in the trip-sharing service. A user of the trip-sharing service can specify the maximum price he is willing to pay in the role as passenger, e.g. in cent per kilometers or cent per mile. The user can also specify the minimum reward he expects to receive in the role as driver. The matching method considers the utmost price a potential passenger is willing to pay and the minimum reward a potential driver expects to receive and determines whether both users match given their pricing preferences. In case the passenger is willing to pay more per mile than the driver expects to receive according to one embodiment of the invention the actual price will be determined by the matching method as in between price lying between the specifications of both users.

According to other embodiments of the invention the price will be higher than said in between price including the possibility to be equal to the maximum price a passenger is willing to pay. The flexibility regarding the pricing policy is particularly beneficial as this feature allows to make the trip-sharing service more attractive to drivers. In case much more passengers than drivers use the service the pricing strategy can be flexibly adapted to attract more drivers. As a result more persons can be attracted to use the trip-sharing service and to act as driver. The number of drivers is the bottleneck of many current trip-sharing services. By adapting the algorithm which determines the final price to be paid by the passenger to the driver, the trip-sharing service according to said embodiments of the invention can be adapted to the current distribution of users preferring to drive or preferring to act as passenger.

According to further embodiments of the invention the user can specify the maximum detour he is willing to accept in the role as driver in order to pick-up a passenger. The maximum detour for picking up a passenger can be specified as a time or as a distance measure. The maximum acceptable detour can be given in absolute values, e.g. a particular number of miles or kilometers or as relative value. A relative value can be for example 10% of the total route of the trip. The specification of relative values is particularly advantageous as in general users accept a much longer detour for long distance trips than for short trips, e.g. for a trip from home to work executed daily by commuters. Based on the user-specific settings for the maximum detour on departure, the trip-sharing service calculates the pickup radius. The pickup radius specifies the pickup area. The pickup area is an area surrounding the place of departure within which a user in the role of a driver is willing to pick-up passengers for a particular trip. The pickup area is considered in the matching method.

In addition the user can specify the maximum detour he is willing to accept in the role as driver to drop off a passenger. The maximum detour can be specified as a time or as a distance measure. The maximum acceptable detour for dropping off a passenger can be given in absolute values, as a particular number of miles or kilometers or as relative values. Based on the user-specific settings for the maximum detour for dropping off a passenger the trip-sharing service calculates a drop off radius. The drop off radius specifies the area around the destination location of the driver within which the driver is willing to drop off passengers for a particular trip. The drop off area considered in the match is considered in the matching method. Two compared potential trip data objects will not match in case the destination location of the passenger is not within the drop off area.

According to further embodiments of the invention each user of the trip-sharing service can specify a blacklist of users which shall not be considered as potential trip accompanies by the trip-sharing service. This feature provides the user with the possibility to be sure not to be allocated to a person he once shared a trip with and does not want to be allocated to a second time. The user may use this blacklist also to ensure that he will not share a trip with a colleague his dislikes or with a neighbor he has a dispute with.

According to a further embodiment of the invention the matching method is provided by a trip-sharing service hosted on a remote server. The trip-sharing service is accessible via multiple different interfaces from multiple different types of clients. The service is able to return a result to the clients via multiple different interfaces. A user may register for the service by creating a user profile. The user profile comprises contact data of the user, e.g. an email address or a mobile phone number. A user can determine the value of various user-related specifications which are used by the trip-sharing service in the matching method to determine a matching trip accompany. The user might specify his preferences regarding the smoking habits, the age, the gender, the social proximity or driving skills of potential trip accompanies. He can specify the price he is willing to pay in case he uses the trip-sharing service as passenger and the minimum price he wants to receive for acting as driver. He can set his driver/passenger preferences wherein the settings can be a value of a scale ranging from 0 to a maximum scale value. Said specifications are evaluated during the matching process. For example in case a user has specified to share trips with non-smokers only the trip-sharing service will not suggest a smoker as a trip accompany. In case the user according to the specifications of his user profile is not willing to pay the minimum reward expected by the driver, the trip-sharing service will not match both users in the matching process.

According to further embodiments of the invention exceptions exist from this general behavior which will be explained later.

Each of the mentioned specifications can be assigned a weight by the user. A non-smoker who does not mind others to smoke may set the weight of the specification indicating the smoking habits of a trip accompany to 0. As a result this specification will not be considered in the matching method. In case a user does in any circumstance not want to share a trip with persons having a particular age or taste in music the user may set a high weight to these features and the matching method will consider the specifications accordingly. Features having been assigned a high weight by the user will be required to match perfectly or almost perfectly while other features having been assigned a low weight may allow a match although the matched person does not fit to the user in that particular regard.

Some specifications are considered by the matching method as mandatory. Said specifications are specifications for the starting time, the place of departure, the arrival time and the destination location. In case the trip plans of users differ significantly regarding the place of departure regarding the destination location and the time for performing the trip are matched between users resulting in an allocation of users to a particular trip does not make any sense. Therefore these features are required to match in any case. In addition the minimum amount of money the driver expects to receive and the price a passenger is willing to pay at the most have to fit together otherwise a match is not possible. In addition, for a successful match, it is required that one of the matching users can be assigned the role of a driver and one can be assigned the role of a passenger. Said features are required to match otherwise the potential trip data objects corresponding to two users will not match and the corresponding users will not be allocated as trip accompanies.

According to a further embodiment of the invention the data evaluated in the matching step is derived from multiple resources. The smoking habits, gender and similar data are usually derived from the specifications of the user profile of a user registered for the trip-sharing service. Other data, e.g. the time and place of departure or arrival are specified within a service request sent to the trip-sharing service. Specifications which never or only rarely change, e.g. the smoking habits, the gender or the taste in music are usually specified within the user profile. Data which will change for every service request, e.g. the time and location of a planned trip are submitted in the service request.

A service request is a message sent from a client or another remote service to the trip sharing service. The trip sharing service according to further embodiments of the invention provides a multitude of different communication interfaces. The service request can therefore be submitted based on a multitude of communication technologies. The interfaces provided by the web service will in the following be referred to as 'web service' interfaces. The term 'web service' therein and in the following does not merely refer to a web service in the strict meaning of the word (a software system for machine-to-machine communication based on SOAP, the XML based interface of the service being described by a WSDL file). Accordingly, the term 'web service interface' does not necessarily refer to an XML based interface described by a WSDL file and supporting the data exchange via web services in the strict meaning of the word. Rather, the term 'web service' in the following denotes any kind of communication technology for exchanging data between two processing devices. The term 'web service' as used in the following therefore includes web services in the strict sense, e.g. RESTful web services, but includes also the exchange of data via SMSs, Http requests, remote procedure calls (RPC), CORBA, DOOM, RMI or any other communication technology. The term web service also includes data exchange via RDS, satellite link, e-mails or SMS interface or via instant messaging based e.g. on XMPP/Jabber. Web services in the strict sense, conforming to the specification of the world wide web consortium (W3C) will in the following be referred to as 'W3C web services' and their corresponding XML based interfaces will be referred to as 'W3C web service interface'. The W3C web service may according to some embodiments of the invention be registered in an UDDI registry.

A service request submitted to the trip sharing service can therefore be a meeting request e-mail submitted to the e-mail interface of the service, a web service request submitted to the W3C web service interface or a SMS submitted to the SMS interface of the service. The result retrieved by the client can be received via the same interface used for submitting the request or via another interface. According to further embodiments of the invention, the user can specify the communication technology and interface used to receive a response from the service in his user profile.

According to a further embodiment of the invention, the starting time submitted by a user to the trip-sharing service specifies the earliest acceptable starting time for the user. Accordingly the time of arrival submitted by a user to the trip-sharing service specifies the latest acceptable arrival time for the user. The submitted starting time and the submitted arrival time therefore define a time window within which a user is prepared or willing to travel. The broader the specified time window the higher the chances of a user to find a matching trip accompany based on the matching method of preferred embodiments of the invention.

According to further embodiments of the invention the starting time and the time of arrival submitted to the trip-sharing service specify the actual starting time and the estimated arrival time of the planned trip. For example a driver who knows exactly when he wants to start and when he will arrive and who is not flexible regarding his trip plans may submit this information to provide other persons with the option to join him as passengers. As the timeframe submitted by the driver via the starting time and the arrival time parameters is in that case roughly equal to the time required to travel, the driver according to the described use case scenario will accept only passengers requiring only a very small or no detour.

According to a further embodiment of the invention each of the specifications of the user profile can be overwritten by the submission of a service request comprising in addition to the time and place information of the trip user-related specifications. For example a non-smoker who wants to ensure to find a matching driver for a particular urgent trip may specify his service request submitted to the trip-sharing service to accept smokers for the next trip although according to his user profile, he does not want to share trips with smokers.

According to preferred embodiments of the invention it is possible to assign multiple passengers to one trip. The assignment of multiple passengers to one trip requires that each of the passengers matched to the one single driver associated with each trip in that the driver accepts each passenger as trip accompany and vice versa.

Users who prefer to act as passengers are, according to the matching method of a preferred embodiment of the invention, preferentially assigned to drivers which have not yet been assigned a passenger. Only in case there does not exist an alternative match, more than one passenger is assigned to one driver. This feature of the matching method ensures that the driver is not unduly burdened by multiple passengers, each passenger potentially requiring the driver to deviate from the direct route to the destination location in order to pick-up or drop off a passenger.

Each potential trip planned by a user corresponds to a potential trip data object. The potential trip data object represents a trip event of the real world but differs from the real world event in that the starting time and the arrival time of the potential trip data object specifies the timeframe within which the trip of the real world is planned to take place. The potential trip data object according to a preferred embodiment of the invention is created by the trip-sharing service upon receipt of a service request of the user. The potential trip data object comprises basic trip related data such as the earliest acceptable starting time and the latest acceptable arrival time according to the user submitting a service request to the trip-sharing service. The receipt of a service request by the trip-sharing service results in the generation of a potential trip data object. The potential trip data object according to further embodiments of the invention in addition comprises user-related specifications according to the user profile values of the user, e.g. the user preferences regarding the smoking habits, the gender and the taste in music or age of a potential trip accompany.

According to a further embodiment of the invention the potential trip data objects compared in the matching method are implemented as multidimensional vectors. Each vector comprises trip related and user-related specifications. Each specification is represented by one dimension of the vector. A vector could for example comprise dimensions representing the place of departure, the starting time, the destination, the maximum price payable as passenger, the minimum expected reward as driver, the user's smoking preferences or the user's preferences regarding the gender of trip accompanies. Each dimension has assigned a weight which corresponds, geometrically, to the length of each vector component. A vector component represents the influence of that vector in a given dimension. Some dimensions can have assigned a high weight while other dimensions such as a taste in music of the trip accompany may have a low weight. The weight of some of the dimensions representing a specification, e.g. the taste in music can be specified by the user in his user profile.

The weight of a dimension determines the impact of each dimension on the overall matching score obtained by comparing the vectors of two potential trip data objects with each other. The similarity of two vectors is determined based on the angle between both vectors within a multidimensional space. The smaller the angle, the more similar are both multidimensional vectors to each other and the higher is the matching score. The weight of a particular dimension determines the impact of that dimension on the matching score of the two compared vectors.

According to a further embodiment of the invention the determination of the vector similarity is executed by the TREX search engine of SAP which comprises multiple vector operations based on the vector space model and a data mining feature pack for advanced algebraic analysis. TREX supports structured data search not only for document Metadata but also for mass business data and data in SAP business objects. In indices for structured data are implemented compactly. Data can be aggregated and analyzed in linear time to enable large volumes of data to be processed entirely in memory.

According to a further embodiment of the invention the matching method returns a result list comprising potential trip data objects with a matching score exceeding a predefined threshold. The list is sorted according to the matching score of a potential trip data object. Each potential trip data object represents a service request of a particular user. Two matching potential trip data objects represent a pair of potential trip accompanies. The potential trip data object with the highest matching score is the first potential trip data object in the result list and referred to as best matching potential trip data object. The user corresponding to the best matching potential trip data object is referred to as 'best matching user'.

According to a further embodiment of the invention a user can specify a threshold for an automatic allocation of trip accompanies in his user profile. Said threshold determines the matching score above which a user corresponding to a potential trip data object is automatically accepted as trip accompany. A confirmation of the user to accept the other user whose matching score exceeds a threshold for automatic allocation of trip accompanies is not required. Matching users with a matching score below the matching score threshold for automatic trip accompany allocation may be suggested to the user as trip accompanies by the trip-sharing service. An allocation of trip accompanies in this case is established upon receiving an explicit confirmation of the user.

According to a further embodiment of the invention a further threshold for the matching score is specified by the user. Potential trip accompanies having been detected by the matching method and having a matching score below the threshold are never suggested to the user as potential trip accompanies.

According to further embodiments of the invention the user submitting a request to the trip-sharing service does not receive a suggestion of a potential trip accompany if the criteria specified in the user profile are not met. However, there exist a few cases according to which a user will be suggested a potential trip accompany while also one of his specifications is not met by the matching user:
a) In case no user was found meeting all specifications of the first user submitting the service request to the trip-sharing service, the user having the highest available matching score is suggested to the first user.
b) In case only one single specification was not met by the second user but all other features match perfectly and no user was found matching all features perfectly the user having the highest available matching score is suggested to the first user.

To simplify matters the expression of a 'matching user' in the following refers to a user having specified via a service request a potential trip data object the potential trip data object having been detected by the matching method to match to another potential trip data object.

According to a further embodiment of the invention the suggestion of a potential trip accompany not matching perfectly to the specifications of a user is connected with a time information: in case 24 hours before the planned trip starts according to the specifications of the service request submitted by the first user to the trip-sharing service, the trip-sharing service suggests potential trip accompanies even in case these potential trip accompanies do not match perfectly or have a matching score slightly below the minimum matching score specified by the user.

The comparison of the planned place of departure of the two users requires execution of some additional calculation steps in order to determine whether the two places can be considered as being located together in spatial proximity. If the place of departure and the destination location of both compared potential trip data objects and corresponding users are close enough to each other is referred to in the following as 'location matching'.

According to further embodiments of the invention each user profile comprises a radius determining the maximum acceptable distance from the place of departure to pick-up a passenger. Said radius is referred to as pickup radius. The value is only of relevance in case the user indeed acts as driver because usually a passenger would not mind the driver accepting a long detour to pick him up. In addition each user profile comprises a radius determining the maximum acceptable distance from the destination location to drop off a passenger. Said radius is referred to as drop off radius. Again this radius is only of relevance for the matching step in case the user acts as driver.

Both radiuses can be given an absolute time or distance measures, e.g. in minutes or miles or in relative values, e.g. 10% of the total route distance or 10% of the total travel time. With the help of both radiuses a user can specify the maximum acceptable detour for picking up and dropping off passengers in case he acts as driver. Both radiuses of a user profile are used by the matching method to determine if two users match. A match between the users requires that the place of departure and the destination location of the passenger lie within the area specified by the radiuses of the driver for the maximum acceptable detour for picking up and dropping off passengers. Passengers having either a place of departure or a destination location lying outside these areas do not match to the driver as the matching score is significantly diminished by a mismatch regarding said feature.

The driver/passenger roles are however dynamically assigned by the matching method at the end of the matching method wherein the driver/passenger preferences of the potential trip data objects and their respective places of departure in relation to their destinations are evaluated. It is therefore not determined at the beginning of the matching method who of the users will indeed act as driver and whose radius values are relevant. The first user may have significantly smaller radius values than the second user in case he is not willing to lose too much time by picking up or dropping off passengers. Therefore the trip-sharing service according to further embodiments of the invention uses a permissive location matching method and uses, according to other embodiments of the invention, a strict location matching method. The use of the strict location matching method gives the danger of overseeing potential users but is more straight forward to implement. The use of the permissive location matching method guarantees that all matching users are detected but requires the execution of an additional filtering step after the matching score has been calculated for a pair of potential trip data objects.

According to the permissive location matching method the length of the pickup radiuses of the two potential trip data objects are compared and the larger of the two radiuses is used to determine if the places of departure of both users match. Analogously the larger of the two drop off radiuses of both potential trip data objects is used to determine if the destinations of both users lie close enough to each other. The permissive location matching method guarantees that no potential matching user pair is missed. However, in case at the end of the matching method the user with the smaller pickup or drop off radiuses is determined to be the driver the determined matching score may be too high and needs to be corrected in an additional filtering step. In the filtering step the matching score is reduced in case the place of departure or the destination location of the actual passenger lies outside the pickup or drop off area of the actual driver.

According to the strict location matching method the shorter of the two pickup radiuses is used to determine if the places of departure of both users match. The shorter of the two drop off radiuses of both potential trip data objects is used to determine if the destinations of both users lie close enough to each other. In case the strict location matching method is applied the filtering step is not necessary.

According to further embodiments of the invention the permissive location matching method is the default location matching method in order to make the matching regarding the maximum detour for picking up a passenger as permissive as possible. It is therefore assumed in the matching step that the larger pickup and drop off radiuses are associated with the user having the driver role. In case this assumption is wrong and the pickup or drop off place of the passenger lies outside the pickup and drop off areas of the driver the wrong assumption is corrected in the filtering step.

According to further embodiment the area surrounding the place of departure of the driver as specified by the pickup radius is segmented into at least two segments. In case the area is split into two or more segments one of the segments has to be centered upon the axis connecting the place of departure with the destination location of the driver. Said segment is referred to as S0 segment. The segments adjoining S0 are referred to as S1. The segments adjoining the S1 segment (with the exception of S0) are referred to as S2 segments. In case the pickup places of multiple matching passengers lie within the pickup area of the driver, the matching score of the passengers which have to be picked up in S0 are highest followed by the matching score of passengers having to be picked up in S1, S2 and so on provided that the passengers do not differ from each other in other respects. The place of departure of the user having assigned the passenger role is referred to as pickup place. This feature is particularly advantageous as the consideration of the pickup place in the matching method helps to preferentially allocate passengers to drivers who require only a minimum detour. The segment S0 is the segment lying more or less on the direct route of the driver to his destination location. The smaller the segment size the more fine-grained information on the required detour for picking up a passenger is available.

Analogously the area defining the maximum detour acceptable for the driver to drop off a passenger is determined by the drop off radius of the driver with respect to the destination location of the driver. Said area can be segmented and can be considered during the matching method as well. A drop off place requiring no or only a very small detour, e.g. the drop off places lying within S0 will result in an increased matching score. Drop off places lying in S1 segments or even S2 segments will result in a lower matching score compared to drop off places lying in S0.

According to a further embodiment of the invention the specifications of the potential trip data objects evaluated and compared in the matching method in addition comprise a specification on the segment of the pickup area within which the pickup place of the passenger is located and a specification of the segment within which the drop off place is located. Both areas indicate the utmost detour acceptable for a user acting as driver for picking up and dropping off passengers.

According to further embodiments of the invention, the location matching method is implemented as a 'corridor matching method'. According to said embodiments, a corridor is defined along the route. Each user can specify the width of the corridor as a time or as a distance measure. The maximum acceptable detour can be given in absolute values, e.g. a particular number of miles or kilometers, or as a relative value. A relative value can be for example 3% of the total route of the trip. Said value defines a corridor of the width of 6% of the total route length (3% to the left side and 3% to the right side of the driver. The 'corridor matching method' is particularly advantageous, as it allows a driver to pick up passengers at an arbitrary place along the route lying within said corridor. The 'corridor matching method' therefore does not require the places of departure and the destination location to match. It is merely required that the passenger's pickup place lies within the corridor somewhere along the route of the driver from the drivers place of departure to the driver's destination location location.

According to a further embodiment of the invention the matching algorithm is able to learn from previous decisions of a user regarding trip accompanies suggested by the trip-sharing service. Previous decisions of a user therefore influence the results generated by the matching method and help to improve the matching service. In case a first user in the past has multiple times accepted users as trip accompanies who did not match perfectly to the specifications of the first user, the repeated acceptance of these non-perfect matching users may have led to a shift of that very specification of the first user which was hitherto the cause for the matching method resulting in imperfect matches. For example a first user may have specified in his user profile that the maximum acceptable detour for picking up passengers in the role as a driver is 10% of the total distance of the route. As the specification was too strict the first user repeatedly did not receive perfect matches but sub-optimal matches of passengers having a pickup location requiring a detour of 11% and 12%. The first user repeatedly accepted these passengers requiring a detour of 11% and 12%. As a result the trip-sharing service automatically changed the specifications of the user profile of the first user regarding the maximum acceptable detour for picking up passengers from 10% to 12% of the total route. The matching method initiated upon the result of a service request as a consequence uses a maximum detour limit for picking up passengers of 12% of the total route.

According to a further embodiment of the invention the adoption of those specifications of a user profile having repeatedly been violated by accepting also users as trip accompanies not matching that specification perfectly is not executed automatically. Rather the user is prompted to agree to the modification of that specification in his user profile. That feature informs a user that a particular specification in his user profile may be too limiting for an effective matching of trip accompanies.

According to further embodiments of the invention the service request submitted to the trip-sharing service is required to comprise at least data specifying the earliest acceptable starting time, the latest acceptable arrival time, the place of departure and the destination location of the planned trip. The term 'acceptable' indicates the point in time that the user submitting the service request considers as acceptable. The place of departure and the destination location have to be unequivocal addresses or geo-coordinates to provide the service with unequivocal information for matching users with each other sharing the same or a nearby place of departure or destination location.

According to other embodiments of the invention the service request submitted to the trip-sharing service may comprise general user-specific or group-specific tags representing places or routes. As unequivocal addresses are hard to memorize and cumbersome to enter, according to preferred embodiments of the invention the user has the option to specify the place of departure or the destination location in the service request via tags. Those tags are automatically replaced by a mapping service by unequivocal addresses. The mapping service is a part of the trip-sharing service and precedes the execution of the matching service.

Unequivocal address information is required by many services in the context of appointment and trip management, e.g. for calculating the distance between two locations and for estimating the required travel time. The entry of those unequivocal addresses is however time consuming as most people memorize only a very limited number of complete addresses including street, house number and postal code. Usually people use the names of persons, buildings or activities when referring to particular places, e.g. 'Mike', 'Mr. Peters', The Pentagon', 'Home' or 'Work'.

According to said embodiment of the invention, the user is allowed to enter ambiguous names, for example 'Mike' or 'Home', in order to refer to an unequivocal address including street, house number and postal code. The ambiguous tags are mapped to unique addresses, the addresses being used in further processing steps. In contrast to complete address blocks, those tags can be entered by the user very quickly and conveniently. It is possible, for example, to specify a route by entering 'from Mike to Tom' or 'from Home to Work'. In order to calculate the route to get from one person to the other, e.g. by a route planning service, those tags have to be mapped to the complete address of each person. As the name 'Mike' may, depending on the user, denominate different persons located in different places, a personalized, user-specific mapping and tag replacement has to take place. In order to calculate a route based on location tags contained in a service request, a personalized mapping schema specifying to which address the name 'Mike' has to be mapped is required. The personalized mapping information may be provided as additional information within the service request or may be a part of a user profile available to the service.

According to a further embodiment of the invention, the mapping also comprises the mapping of general terms and names to unequivocal addresses, e.g. 'Pentagon' or 'White House' and the mapping of group specific tags. The general and personalized tags of a user profile according to said embodiment of the invention can be supplemented by tags being specific for a particular social group the user belongs to. The user being registered for a service may be member of a particular social group, e.g. a social network such as Xing or MySpace, may belong to the personnel of a company or a particular department of a company. In case the department of the company the user is working at organizes a Christmas staff party at a particular restaurant, the tag 'Christmasparty' may be mapped to the unequivocal address of the restaurant for all user profiles being member of said social group. The process of mapping comprises a text analysis step in which token boundaries are determined, in which some of the tokens are recognized by the service as tags representing unequivocal addresses and wherein regular expressions may be applied in order to identify location tags.

According to a further embodiment of the invention, the mapping of location tags to unequivocal addresses also comprises the mapping of tags to routes. According to this use case scenario, the service request may comprise one single tag representing a route rather than two location tags representing the starting point and destination location. For example, the tag 'Highway' could represent the route from 'Work' to 'Home' via the highway, while the tag 'Countryroad' refers to an alternative route from 'Work' to 'Home'. The required mapping information is derived, according to one embodiment of the invention, from a list of 'favorite routes' being contained in a user's profile. Alternatively, the mapping information could be specified within a text field of the service request.

According to further embodiments of the invention, the matching method of the trip sharing service is initiated on a remote server hosting the trip sharing service as follows:

1. At first, a client submits a service request to the trip sharing service. The service request comprises data enabling the service to create and specify a potential trip data object. Typically, a service request comprises at least the first acceptable starting time and the latest acceptable arrival time for the user, the departure and the destination location. The service request in addition comprises contact data of the user, e.g. an e-mail address, a mobile phone number or the like. According to further embodiments of the invention the user can specify a default place of departure, e.g. his home address. According to said embodiments, the service request does not require to comprise data on the place of departure as this information can be derived from the user's profile. The service request can be specified explicitly by the user planning to use the trip sharing service to organize a planned trip. The service request may also be submitted automatically by software programs installed on the client side which predict necessary trips in the future and submit service requests accordingly.

2. In the next step, the service request is received by the trip sharing service. The trip sharing service according to said embodiment comprises multiple web service interfaces for receiving service requests and returning results. The service request can be, for example, an XML based web service request, a meeting request e-mail or an SMS.

3. In the next step, the service request is mapped to a user profile of a registered user of the trip sharing service. The contact address or any other data indicating the identity of the user submitting the request is extracted from the service request and used to map the service request to a user profile of the service.

4. The service, after receiving the service request from the client device of the user, extracts data from the service request necessary to create a potential trip data object. The data specifies the place of departure and the destination location is added to the potential trip data object. In addition the data indicating the first acceptable starting and arrival time is added to the potential trip data object. According to a preferred embodiment of the invention, said data indicates the time frame during which the user is prepared and willing to travel.

The client device is a processing device owned by a user. The client device may be a notebook, a desktop computer, a mobile phone, a netbook and the like. According to further embodiments of the invention, the client can be a third party server hosting a third party service, e.g. an event management server hosting an event management service. According to the latter use case scenario, the user owning or using the client device is in fact the user submitting a service request to the event management service.

5. A mapping method is executed by the trip sharing service mapping tags to unequivocal addresses: in case the trip sharing service request comprises tags representing routes or places, the tags have to be mapped to unequivocal addresses or geo-coordinates at first. The place of departure and the destination location can be specified as unequivocal address or by the usage of user- or group specific place or route tags. In case tags are used, tag mapping information stored in the user profile, in the group profile or on a storage medium accessible by the trip sharing service is retrieved. User specific tags are read from the user profile of the user submitting the service request, group specific tags are read from a group profile and general tags are resolved by reading general tag mapping information from a storage medium accessible by the service. The service request may also comprise tag mapping specifications, in case which the specifications of the service request override the tag mapping specifications of the user or group profile. In case a route tag has been provided, the route tag is mapped to two unequivocal places indicating the place of departure and a destination location.

6. The specifications of the profile are, in addition to the time and unequivocal place of departure and destination location information added to the potential trip data object. Said user related specification comprise at least the user's preferences regarding the price he is willing to pay at the utmost as passenger, the reward he wants to receive at least in the role as driver, and his driver/passenger preferences.

7. After its creation, the potential trip data object is stored in association with the user profile to a database.

8. In the next step, the matching method is executed.

The matching method tries to match the newly generated potential trip data object against all potential trip data objects already existing in the database of the trip sharing service. For each pair of the newly generated potential trip data object and an existing potential trip data object from the database, the matching method determines the degree of congruency. After all existing potential data objects have been compared with the newly generated potential trip data object existing potential trip data objects are collected in a result list. The result list of matching potential trip data objects is sorted according to the matching score of the pairs of compared potential trip data objects.

The matching method comprises the following steps:

1. Comparison of potential trip data objects: at first, the newly generated potential trip data object is compared with an existing trip data object contained in the trip sharing service's database to determine the degree of congruency between both data objects. According to an embodiment of the invention, the trip sharing service compares only basic trip related specifications: the place of departure, the destination, the earliest acceptable starting time and the latest acceptable arrival time. According to further embodiments of the invention, the restrictive location matching method is applied, while further embodiments of the invention apply the permissive location matching method. The roles are assigned by the trip sharing service dynamically and flexibly at the end of the matching method. In case both compared potential trip data objects specify that the corresponding user will under no circumstances act as driver (or as passenger), the matching method ensures that no two categorical passengers or two categorical drivers match with each other. According to further embodiments, other specifications of the compared potential trip data objects are compared as well, e.g. smoking habits, age, gender, the price, the driver/passenger preferences, mutual acquaintance and other parameters. According to a preferred embodiment, the comparison of two potential trip data objects is implemented as a comparison of two multi-dimensional vectors. Each dimension of a vector represents one specification of the corresponding potential trip data object, e.g. the smoking preference of the user or his taste in music. According to further embodiments of the invention, each dimension is associated with a weight. The comparison of vectors has the advantage that the run time behavior of the algorithm is very fast, because it is of linear complexity. Even in case the database of the trip sharing service comprises millions of potential trip data objects, the result will still be returned quickly. The growth of the number of available trip data object in the database will result in a linear increase of processing time of comparing the new vector with all existing vectors in the database to determine the degree of congruency. According to further embodiments of the invention, the comparison of potential trip data objects is implemented as an execution of weighted rules which determine for each available specified parameter of the two compared trip sharing data objects the degree of congruency. The driver/passenger preferences are also considered: in case one user acts preferentially ad driver and the second user preferentially acts as passenger, the matching method determines a higher matching score for potential trip data objects having mutually fitting driver/passenger preferences. This does, however, not guarantee that the user preferring to act as driver will indeed be assigned the driver role at the end of the matching method. The driver/passenger specification of a user increases his chance of having assigned the preferred role by the matching method.

2. Determining the degree of congruency: according to preferred embodiments of the invention, the comparison of potential trip data objects results in an overall degree of congruency. According to preferred embodiments of the invention, the degree of congruency is specified as matching score. Said embodiments are advantageous as they provide the user with the possibility to specify thresholds for the matching score. Matching potential trip data objects and their corresponding users, in the following referred to as 'matching users', reaching a matching score which exceeds a threshold can, for example, be automatically assigned as trip accompanies by the trip sharing service later on.

3. Assigning driver and passenger roles: in case the matching score between two users is high enough, each user is assigned a driver and a passenger role. In most cases, the user having the greater preference to act as driver will be assigned the driver role. In case both users have equal driver/passenger preferences, the driver role will be dynamically assigned to that user whose place of departure lies farther apart from the destination location. This feature of the matching method reduces the distance that has to be driven in total: in case the user lying farthest apart from the destination location is assigned the driver role, he can pick-up one or more passengers along his route to the destination location of the trip. In case the user lying next to the destination location would have been assigned the driver role, said user would at first have to drive in the opposite direction of the destination location to pick-up other users. In case one of the users is a categorical driver or passenger, the roles cannot flexibly be assigned to the users. In the following, the user having been assigned the role of the driver will be referred to as driver. The user having been assigned the role of the passenger will be referred to as passenger.

4. Filtering: in case a permissive location matching method was applied by the matching method, the comparison of the potential trip sharing objects of two users may have resulted in a matching score which is too high. In case a permissive location matching method was applied, the execution of a filtering step is necessary to check if the calculated matching score is correct or needs to be lowered. In case the result of this check is that the matching score between two compared potential trip data object was too high, the matching score is reduced accordingly.

5. Generating the result list: the potential trip data object having been created by the trip sharing service upon receipt of the service request is referred to as 'first potential trip data object'. In case the matching score of the first potential trip data object corresponding to the service request and any of the potential trip data objects existing in the database reaches a threshold, the existing potential trip data object is added to a result list. Depending on the embodiment of the invention, the threshold can be defined by the trip sharing service internally or by the user via his or her user profile.

6. After having compared the first potential trip data object with all existing trip data objects, the result list comprises all existing potential trip data objects yielding a matching score above a threshold. The potential trip data objects of the result list are sorted according to the matching score. In case at least one matching potential trip data object was found in the database of the trip sharing service, the result list is not empty and the matching method was executed successfully. In case no existing potential trip data object yielded a sufficiently high matching score, the result list is empty and the matching method was not executed successfully.

7. According to further embodiments of the invention, a route is calculated for all matching potential trip data objects in the result list. The route connects the places of departure with the destinations of both matching users. The route is determined by the trip sharing service or is retrieved from an external route calculation service.

Depending on the embodiment of the invention, the route can represent the shortest route regarding the travel time or regarding the distance.

After the matching method has terminated, both users corresponding to the first and the best matching potential trip data objects have to be notified of the successful match and have to be assigned to each other as trip accompanies. The first user corresponds to the user having submitted the service request resulting in the execution of the trip sharing service. The best matching user corresponds to the best matching potential trip data object existing already in the database.

Depending on the embodiment of the invention and on user specific settings, the first user and the best matching user are allocated as trip accompanies for a particular trip automatically, upon confirmation by one user or upon confirmation of both users. The allocation of trip accompanies requiring the explicit confirmation of the allocated users is referred to as semi-automatic allocation of trip accompanies.

In case both users have successfully been allocated to each other (automatically or semi-automatically), the data comprised in both potential trip data objects is used by the trip sharing service to specify a new data object, an arranged trip data object. According to further embodiments of the invention, the starting time of the arranged trip data object is the first starting time acceptable by both users. For example, the potential trip data object corresponding to the user submitting the service request comprises the value 2 p.m. as starting time while the best matching potential trip data object having been read from the trip sharing service's database comprises the value 2.30 p.m. as starting time. In this case, the starting time of the arranged trip data object is 2.30 p.m. In case the respective embodiment of the invention comprises a route calculation, the time required for the trip is used to specify the expected arrival time of the arranged trip data object. The arranged trip data object is stored to the trip sharing service's database.

An allocation process following a successful matching method tries to allocate the best matching user, which is the user corresponding to the best matching potential trip data object, to the user submitting the service request as trip accompany. The allocation process may be executed automatically or upon confirmation by the user.

According to further embodiments of the invention, other users reaching a matching score slightly below the threshold for automatically allocating matching users as trip accompany are allocated to the first user as trip accompany only upon the user's explicit confirmation. By modifying the threshold in his user profile, the user may flexibly determine the matching score above which the trip sharing service is allowed to automatically allocate matching users as trip accompanies.

According to a further embodiment of the invention, a user can specify the number of seats available in his car for the case he acts as driver. In case multiple users acting preferentially as passengers match to said user acting as driver, multiple passengers can be assigned to the driver.

In case the matching method has been executed successfully, the best matching user has to be allocated to the first user submitting the service request.

Automatic Allocation of Trip Accompanies:

In case the matching score is high enough for an automatic allocation of trip accompanies, the trip sharing service determines, which user has been assigned the driver role and which user has been assigned the passenger role by the matching method. The server hosting the trip sharing service sends a notification of a successful match to the device of the driver. The notification comprises user specific data of the passenger, e.g. an e-mail address or a mobile phone number as contact data. In addition, the notification comprises the place of departure of the passenger, the pick-up place. The notification in addition comprises information on the price of the arranged trip.

In addition, the trip sharing service sends a notification of a successful match to the device of the passenger. Said notification comprises user specific data of the driver, e.g. the driver's e-mail address or his mobile phone number. In addition, the notification sent to the passenger may comprise the arrival time. The notification in addition comprises information on the price of the arranged trip.

No further action of the driver or the passenger is required. As both users have selected the option of an automatic allocation of trip accompanies in their user profiles and the matching score was high enough, it is assumed that both users agree to the automatic allocation of each other as trip accompanies. Each user may manually contact his allocated trip accompany, but he is not obliged to do so. The number of manually executed steps in order to organize a shared trip can thus be minimized and tremendously simplified.

In case the user corresponding to the best matching potential trip data object has a high matching score which, however, does not reach the threshold for automatic trip accompany allocation, a semi-automatic trip allocation procedure is initiated by the trip sharing service which requires the confirmation of one or both users. Depending on the embodiment of the invention, the semi-automatic allocation of trip accompanies to each other may be executed server-based or client-device based.

Server-Based Semi-Automatic Allocation of Trip Accompanies:

In case the best matching pair of potential trip data objects reaches a high score which however is still below the threshold values specified by both users corresponding to the compared data objects, a first matching result message is sent from the server hosting the trip sharing service to the client device of the driver. The driver is selected as first recipient as typically the number of available drivers is lower than the number of passengers and drivers can therefore be expected to be more selective regarding trip accompanies than the passengers. The first matching result message comprises user specific information on the suggested passenger. The driver may accept or reject the best matching user as trip accompany.

In case the driver accepts the suggested passenger, an acceptance message is submitted from the driver's device to the server. The server in this case submits a second matching result message. The second matching result message is sent to the client device of the passenger and comprises user specific data on the driver. The passenger can accept or reject the driver.

In case the passenger accepts the driver, an acceptance message is submitted from the client device of the passenger to the server, comprising the information that the passenger accepts the driver. As a consequence, an arranged trip data object is created by the trip sharing service and stored to the tip sharing service's database. The server now submits a message to the driver's device and the passenger's device, the message comprising a notification on the arranged trip.

In case the driver rejects the suggested passenger, a rejection message is submitted from the client device of the driver to the server hosting the trip sharing service. The trip sharing service checks if the result list of the executed matching procedure comprises a further user matching to the current driver.

If so, the server determines if the driver role of the new pair of matching user is still assigned to the user having currently assigned the driver role. It is possible that the current driver has a passenger role and the further matching user has the new driver role. The service determines the current role of the former driver and the role of the further matching user and submits a new first matching result message to the current's driver's device suggesting the current matching passenger.

In case no such further matching user could be found, the semi-automatic allocation of trip accompanies is aborted without an allocation of trip accompanies, without the arrangement of a shared trip and without the creation of an arranged trip data object. The potential trip data objects remain unchanged in the database of the trip sharing service and may lead to another successful match during the next execution of the matching method.

In case the passenger rejects the driver, a rejection message is submitted to the server. The trip sharing service as a result checks, if a further user was found in the previously executed matching method. In case no further matching user was found the method is aborted without an allocation of trip accompanies.

In case a further matching user was found, the current roles of the former passenger and the further matching user is determined by the server. The former passenger may act as passenger or as driver according to the further match. The trip sharing service will determine the current driver and the current passenger based on the pair of the former passenger and the further matching user. Afterwards, the service sends a message to the new driver's device suggesting the user currently having associated the passenger role.

The server-based, semi-automatic allocation of trip accompanies requires the exchange of at least 6 messages:
- a message suggesting a passenger, the message being sent from the server to the driver's device
- an acceptance message indicating the acceptance of the suggested passenger by the driver, the acceptance message being sent from the driver's device to the server
- a message suggesting the driver, the message being sent from the server to the passenger's device
- an acceptance message indicating the acceptance of the suggested driver by the passenger, the acceptance message being sent from the passenger's device to the server
- a notification of the server on a successful arrangement of a trip sent to the driver's device
- a notification of the server on a successful arrangement of a trip sent to the passenger's device Client Device-Based Semi-Automatic Allocation of Trip Accompanies:

According to further embodiments of the invention, the semi-automatic allocation of trip accompanies is established based on the communication between the client devices of the passenger and the user. Said client device-based semiautomatic allocation of users requires at least five communication steps in case the driver immediately accepts the passenger and vice versa:
- a message suggesting a passenger, the message being sent from the server to the driver's device
- an acceptance message indicating the acceptance of the suggested passenger by the driver, the acceptance message being sent from the driver's device to the passenger's device
- an acceptance message indicating the acceptance of the driver by the passenger, the acceptance message being sent from the passenger's device to the driver's device
- a confirmation message indicating the successful allocation of the driver and the passenger as trip accompanies, the confirmation message being sent from the driver's device to the server a confirmation message indicating the successful allocation of the driver and the passenger as trip accompanies, the confirmation message being sent from the passenger's device to the server In another aspect of an embodiment of the invention, the client device-based semi-automatic method for allocating trip accompanies in case of a successful execution of the matching method comprises:

determining, in case of a successful execution of the matching method, the role of the first user and the role of a best matching user, wherein the potential trip data objects of the result list having the highest degree of congruency with the first potential trip data object is the best matching potential trip data object and wherein the best matching user is the user corresponding to the best matching potential trip data object, sending, in case of a successful execution of the matching method, a first matching result message from the server hosting the trip sharing service to the client device belonging to the driver determined in the role determination step, the first matching result message comprising:
  data specifying the passenger,
  data specifying pick-up time, pick-up place of the passenger;

sending, in case the driver accepted the passenger as tip accompany, a driver's acceptance message from the client device belonging to the driver to the client device belonging to the passenger, the passenger having been specified in the first matching result message;

receiving, in case the driver accepted the passenger as tip accompany, the driver's acceptance message by the client device of the passenger, the driver's acceptance message comprising:
  data specifying the driver;

sending, in case the passenger accepted the driver as tip accompany, a passenger's acceptance message from the client device belonging to the passenger to the client device belonging to the driver;

sending, in case the passenger accepted the driver as tip accompany, a confirmation of a successful allocation of trip accompanies from the client device of the passenger to the server hosting the trip sharing service;

receiving, by the client device belonging to the driver, the passenger's acceptance message sent from the client device belonging to the passenger in case the passenger accepted the driver as trip accompany;

sending, after having received the passenger's acceptance message, a confirmation of a successful allocation of trip accompanies from the client device of the driver to the server hosting the trip sharing service;

According to further embodiments of the invention, the client device-based allocation of trip accompanies is executed by a trip manager program installed on each of the client devices. The trip manager program comprises one or multiple machine-machine interfaces enabling the devices to exchange data with each other, e.g. via the Internet, via a mobile telephone connection or any other data exchange technology. The trip manager program according to further embodiments of the invention is in addition capable to prompt the user via a graphical user interface for accepting or rejecting a suggested trip accompany.

According to a further embodiment of the invention, the user can specify in his user profile if he wants his position to be tracked during the trip. In case the user has security concerns when traveling with an unknown person, he may use this option to ensure that he can be located along the route or in case the driver notably deviates from the route. The tracking function requires that the client device of the user comprises means to determine the current position of the car. Such a client device could be, for example, a mobile phone comprising a GPS receiver. The trip sharing service receives the position information from the client and stores this information to its database. The positional data is deleted from the server after the user preferring to be tracked has reached his destination location.

According to a further embodiment of the invention, the trip sharing service comprises in addition the function of tracking the position of users currently executing a trip having been organized by the trip sharing service, wherein the trip sharing service submits an alarm in case the position significantly deviates from an originally determined route of an arranged trip.

According to further embodiments of the invention, the semi-automatic allocation of trip accompanies is executed by client devices having installed a trip manager program.

The trip manager program installed on a client device facilitates the use of the trip sharing service by the user of the client device. The trip manager program in operation is able to communicate with the remote trip sharing service. The trip manager program manages four distinct lists of data objects representing predicted, published, arranged and past trips. The data objects are referred to accordingly as predicted, published, arranged and past trip data objects. Each trip data object comprises at least specifications of the starting and arrival time, on the place of departure and on the destination location. The location information can be determined in the form of unequivocal addresses or in the form of general, user- or group-specific tags.

The first list comprising predicted trip data objects is stored solely on a client device. Predicted trip data objects can be trip data objects predicted by a service integration module as explained in the following paragraphs. A predicted trip data object can also be created manually by the user, e.g. via a graphical user interface provided by the trip manager program. The predicted trip data objects are stored solely on the client device and are not known to the trip sharing service. For example, in case a user plans a trip but is not sure if he will be able to travel at the specified day, he may define the trip data object in advance. The main function of the first list is to act as container for planned trips for which still some relevant data is missing, e.g. the place of departure, or which are not guaranteed to take place at all. Possible user actions on the predicted trip data objects are: create, delete, edit and publish. The publication of a predicted trip data object is equivalent to moving the respective predicted trip data object to the second list comprising published trip data objects. Moving a particular predicted trip data object from the list of predicted trip data objects to the list of published trip data objects (the second list on the client) triggers the submission of a service request to the trip sharing service. The service request comprises the trip specifications (starting time, arrival time, place of departure, destination) of the predicted trip data object. The published trip data object is stored by the trip sharing service in a database. The trip sharing service uses the specifications of the published trip data objects and the specifications of a user profile corresponding to the service request to create a potential trip data object. Said potential trip data object is used by the trip sharing service in the next step to execute the mapping and matching service as described beforehand.

The second list comprising published trip data objects is stored on the client device. As the specifications of each published trip data object are submitted as service request to the trip sharing service upon publication and result in the generation of a corresponding potential trip data object on the server, the data contained in the second list of trip data objects on the client is also contained on the server hosting the trip sharing service.

A trip data object does not necessarily have to be created in the list of predicted trip events first. A trip data object may be created directly as published trip data object in the second list. Depending on the embodiment of the invention, the published trip data object may be created automatically or manually by the user. A published trip data object created in the second list is automatically published upon creation and submitted to the trip sharing service in the form of a service request. On the server side, the service request triggers the creation of a potential trip data object and the execution of the matching method. The trip data objects of the second list can be created, edited or deleted. Any action upon said published trip data objects will be automatically submitted to the trip sharing service in the form of a service request.

According to further embodiments of the invention, the automatic prediction and creation of predicted or potential trip data objects in the first or second list is executed by a service integration module. The service integration module is a piece of software installed on the client device. The service integration module has read and write access to a calendar application and to the first and second list of the trip manager program. In case the service integration module predicts a required event based on the analysis of the electronic calendar of the calendar application, the service integration module may create a predicted trip data object or a published trip data object. The expression 'required event' refers to data objects being stored in, written to or read from an electronic calendar of a calendar application, the data objects representing an event in the real world. An event can be a singular event or a recurring event comprising a particular recurrence pattern.

If the service integration module creates a predicted trip event in the first list, the user has the option to review the prediction result and to publish the predicted trip event manually. In case the service integration module creates a published trip data object in the second list, a corresponding service request is submitted automatically to the trip sharing service.

According to further embodiments of the invention, service integration module can be implemented as 'plug-in' or 'add-in' for the calendar application or the groupware server of the calendar application. It can also be implemented as an independent service program being registered as event listener with a calendar event of a calendar application or the groupware server of the calendar application. It can also be implemented as an independent service program updating the electronic calendar on a regular basis. As said service integration module has to be interoperable with the calendar application or the respective groupware server, the implementation details of the service integration module depend on the type and version of the calendar application, e.g. on a particular version of Microsoft Outlook or Lotus Notes or the corresponding groupware servers.

According to a further embodiment of the invention, the trip manager program is implemented as event listener listening on the creation of events in a calendar application installed on the client device. If a new event is specified by the user of the client device, the trip manager software automatically creates a predicted trip data object in the first list of trip data objects.

The third list located on the server side and also on the client device side comprises arranged trip data objects. In case the trip sharing service determines at least one matching potential trip data object and in case the corresponding matching user could be successfully allocated to the user of the client device comprising the trip manager program, an arranged trip data object is created by the trip sharing service and stored to the database. The corresponding potential trip data objects on the server side are supplemented with a link pointing to the arranged trip data object in the third list. The arranged trip data objects are also supplemented with at least two pointers to their at least two respective published trip data objects corresponding to the driver and the at least one passenger.

The arranged trip data object is similar but not identical to the published trip data objects it is derived from: for example, the driver and the passenger have specified via their published trip data objects a time frame within which each of them was willing to travel. On the contrary, the arranged trip data object comprises the starting and arrival time of the actual trip. The specifications of the arranged trip event are submitted by the trip sharing service to the client device, resulting in the creation of an arranged trip event in the third list stored on the client device and a deletion of the corresponding published trip event in the second list. The arranged trip data objects of the third list can be edited, deleted or used to contact the allocated trip accompany by the user of the trip manager program.

The fourth list comprises past trip data objects. After the arrival time according to the specifications of the arranged trip data object is reached, the corresponding data object is moved from the list of arranged trip data objects to the fourth list comprising past trip data objects. This movement is executed on the trip manager program on the client and also on the server hosting the service integration module. A user can click on a past trip data object to provide feedback information on the trip accompany corresponding to the past trip data object or to contact said trip accompany. According to a further embodiment of the invention, the past trip event is deleted after three month from the list.

While the first list is located solely on the client device, the second, third and fourth lists are located on the client device and on the server hosting the trip sharing service.

According to further embodiments of the invention, the trip manager program and the service integration module are implemented as one single piece of software unifying the capabilities and functions of both software modules.

According to a further embodiment of the invention, the trip manager program is implemented as software running on the Android operating system.

According to further embodiments of the invention, the client devices are mobile processing devices such as smart phones, mobile phones, Blackberries, netbooks, notebooks or navigation devices.

The trip manager program according to further embodiments of the invention is operable to manage the communication between the client device with the server during the automatic and semi-automatic trip accompany allocation process.

According to further embodiments of the invention, the trip manager program is in addition operable to manage the communication between two client devices in the semi-automatic client device-based allocation of trip accompanies. To provide said communication functionalities, the trip management program comprises an appropriate interface for exchanging messages with the trip sharing server and with other instances of the trip management program being installed on other devices.

According to further embodiments of the invention, the trip sharing service can be initiated by a service request submitted by a first client device, the first client device including:

a storage medium having installed a calendar application and a service integration module, the service integration module having read and write access to the calendar application, the service integration module comprising instructions, the instructions when executed by a processor cause the processor to perform a method for integrating the trip sharing service in the calendar application, the method comprising:

submitting a service request to the trip sharing service by the service integration module, the service integration module having read and write access to the calendar application, the service request being a call of a first web service interface of the trip sharing service, the call of the first web service interface initiating the execution of the trip sharing service and the generation of at least one result, the at least one result being used for creating a meeting request e-mail, the meeting request e-mail comprising data of the result, the meeting request e-mail being sent to the e-mail address of the first user, the first user using the calendar application;

receiving the meeting request e-mail by the calendar application;

creating an event corresponding to the received meeting request email in the electronic calendar of the calendar application upon receipt of the meeting request e-mail by the calendar application, the event being taken from the group consisting of singular events and recurring events, the recurring events being events with a particular recurrence pattern, the event being a data object in an electronic calendar of the calendar application;

means for displaying the graphical user interface of the electronic calendar application and the updates introduced to the calendar application;

processing means for executing the instructions;

input means for specifying via a graphical user interface provided by the service integration module a service request to the trip sharing service, the input being provided by the user;

a network interface for connecting the computer system to a network.

In the following, the term 'data object' refers to computer interpretable objects comprising data which can be manipulated by the commands of a programming language.

The manual specification of planned trips, the manual search for and evaluation of potential trip accompanies and the subsequent communication steps between both potential trip accompanies to agree upon the trip details requires considerable time and effort. As a result, current trip sharing services are used only by a fraction of the people having a car or being interested to use a trip sharing service as passenger.

According to further embodiments of the invention, said limitations of current trip sharing services are overcome by a dynamic and flexible matching method being operable to intelligently and dynamically assign driver and passenger roles to matching users, by an elaborate and adaptable matching method being operable to calculate a matching score based on a multitude of user and trip related specifications and by an flexible and automatic way of allocating users as trip accompanies.

BRIEF DESCRIPTION OF THE DRAWINGS

In the following, embodiments of the invention are described by way of example, only making reference to the drawings in which.

Figure 1:
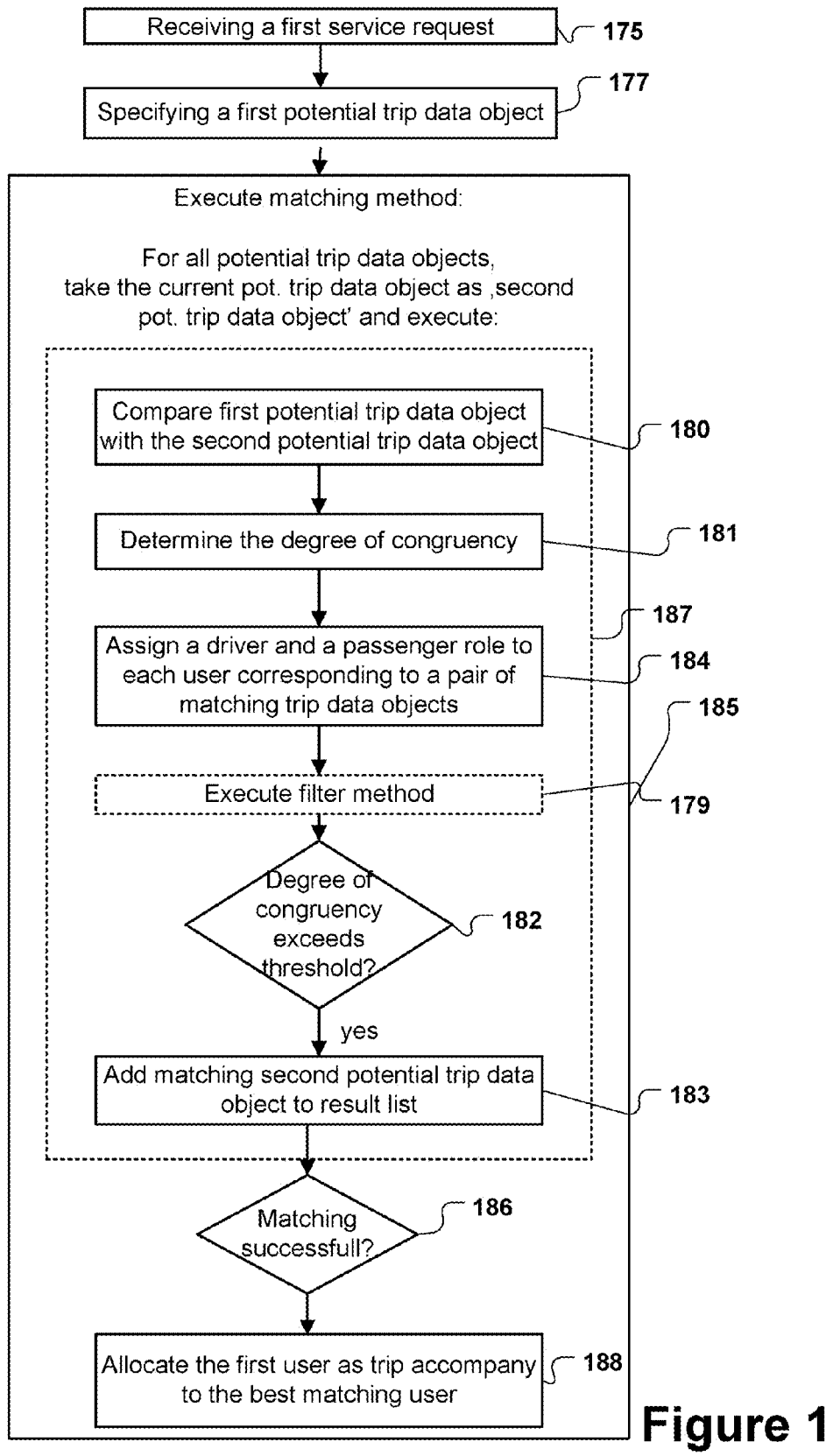
FIG. 1 illustrates the receipt of a service requests by the trip sharing service triggering the execution of the matching method.
Figure 3:
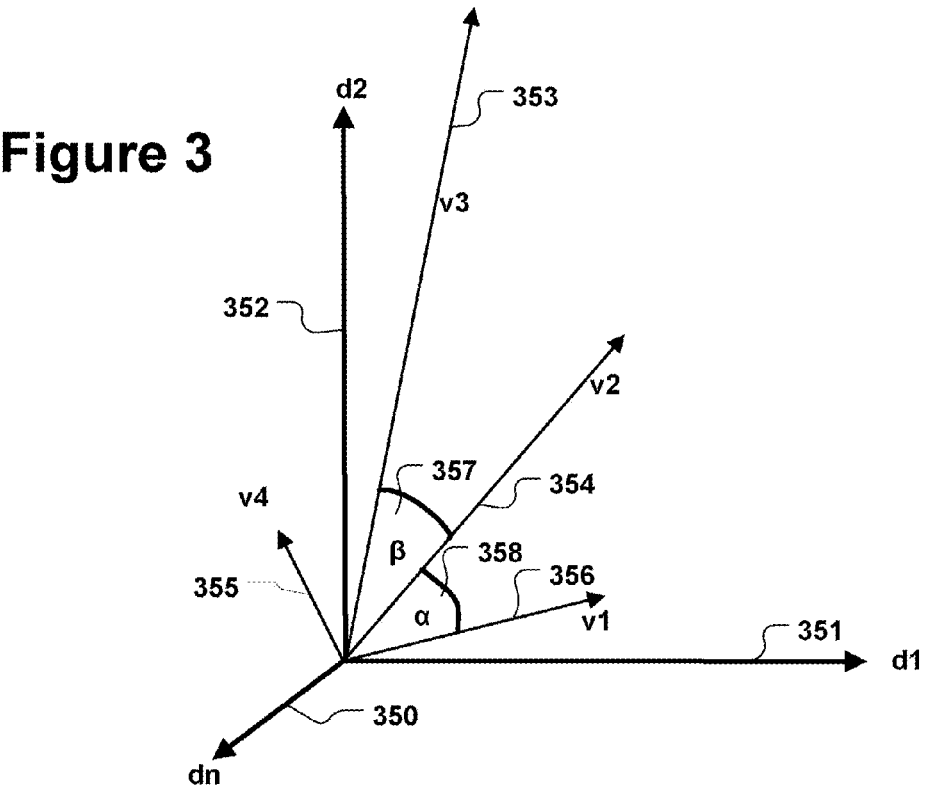
FIG. 3 illustrates multi-dimensional vectors, each vector representing a potential trip data object.

The matching method according to the embodiment depicted in FIG. 1 determines, whether a first potential trip data object created after receiving a first service request reaches a sufficient level of congruency with one or more potential trip data objects stored in the database of the trip sharing service. The execution of the matching method is initiated by the receipt of the first service request by the trip sharing service. The highest scoring match of the first potential trip data object with an existing potential trip data object corresponds to a match of the user submitting the service request to the user having formerly submitted the service request resulting in the creation of the best matching potential trip data object. According to preferred embodiments of the invention, the determination of the degree of congruency is implemented as a comparison of vectors as depicted in FIG. 3.

Figure 6A:
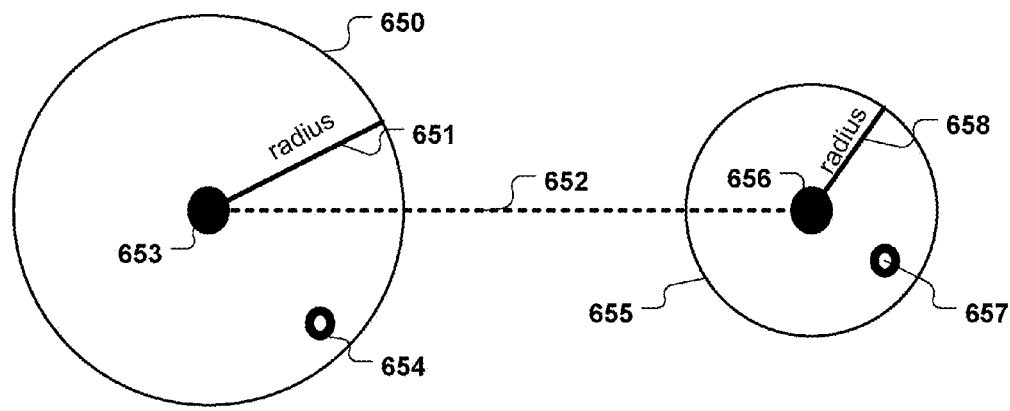
FIG. 6a illustrates the location matching based on pick-up and drop-off radiuses.
Figure 6B:
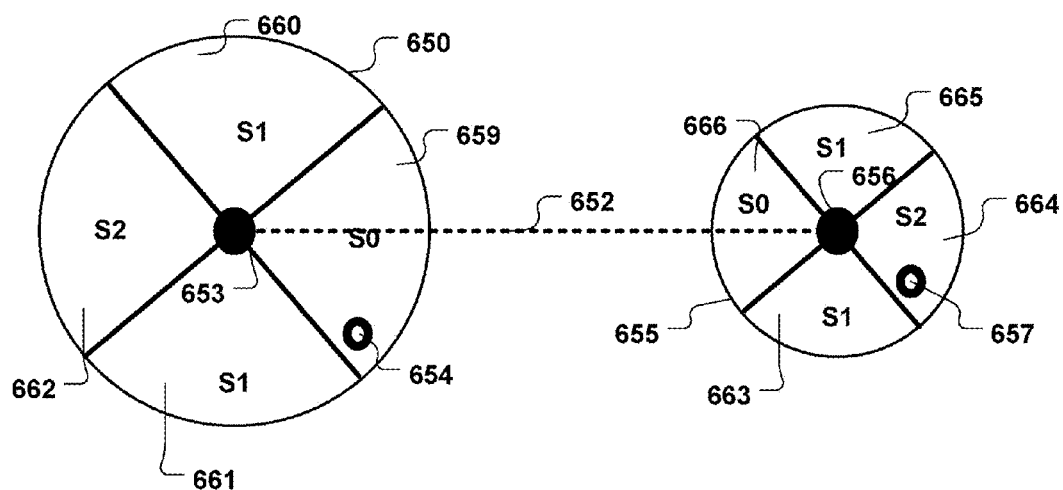
FIG. 6b illustrates the segmentation of circular areas specified by pickup and drop-off radiuses.

Further aspects of the matching method regarding the matching of locations are depicted in FIGS. 6a and 6b.

Figure 2:
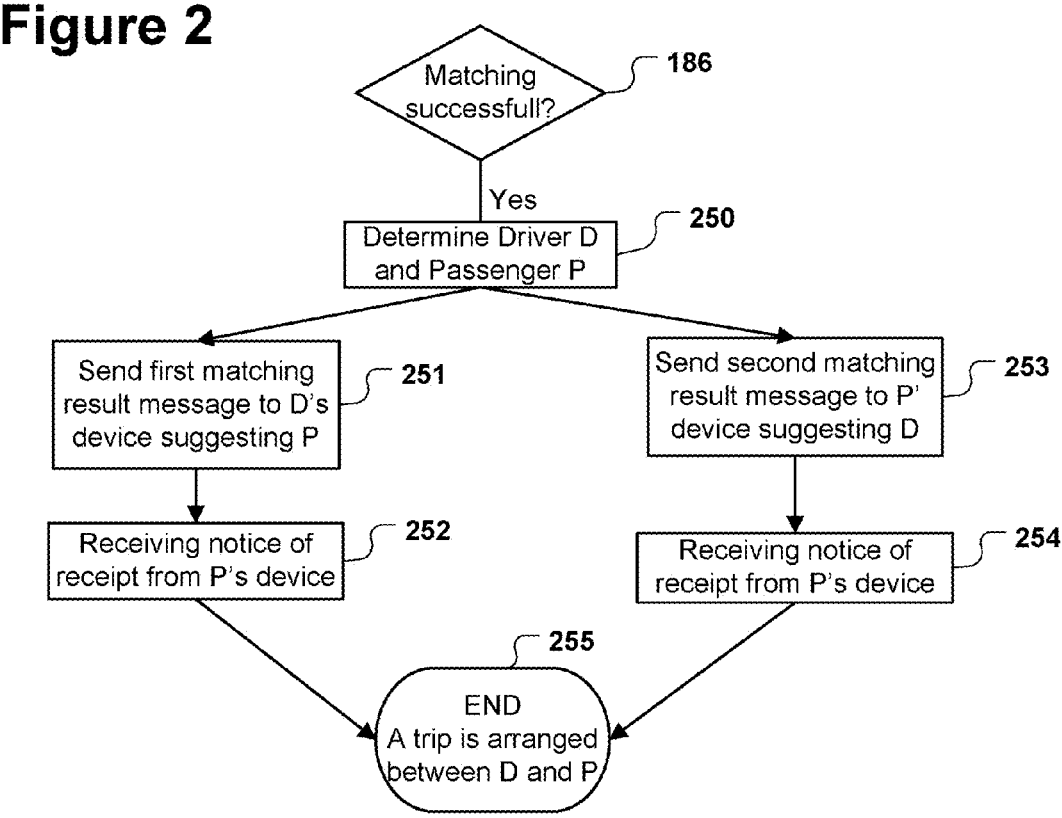
FIG. 2 illustrates the automatic allocation of trip accompanies after a successful match of users.
Figure 4:
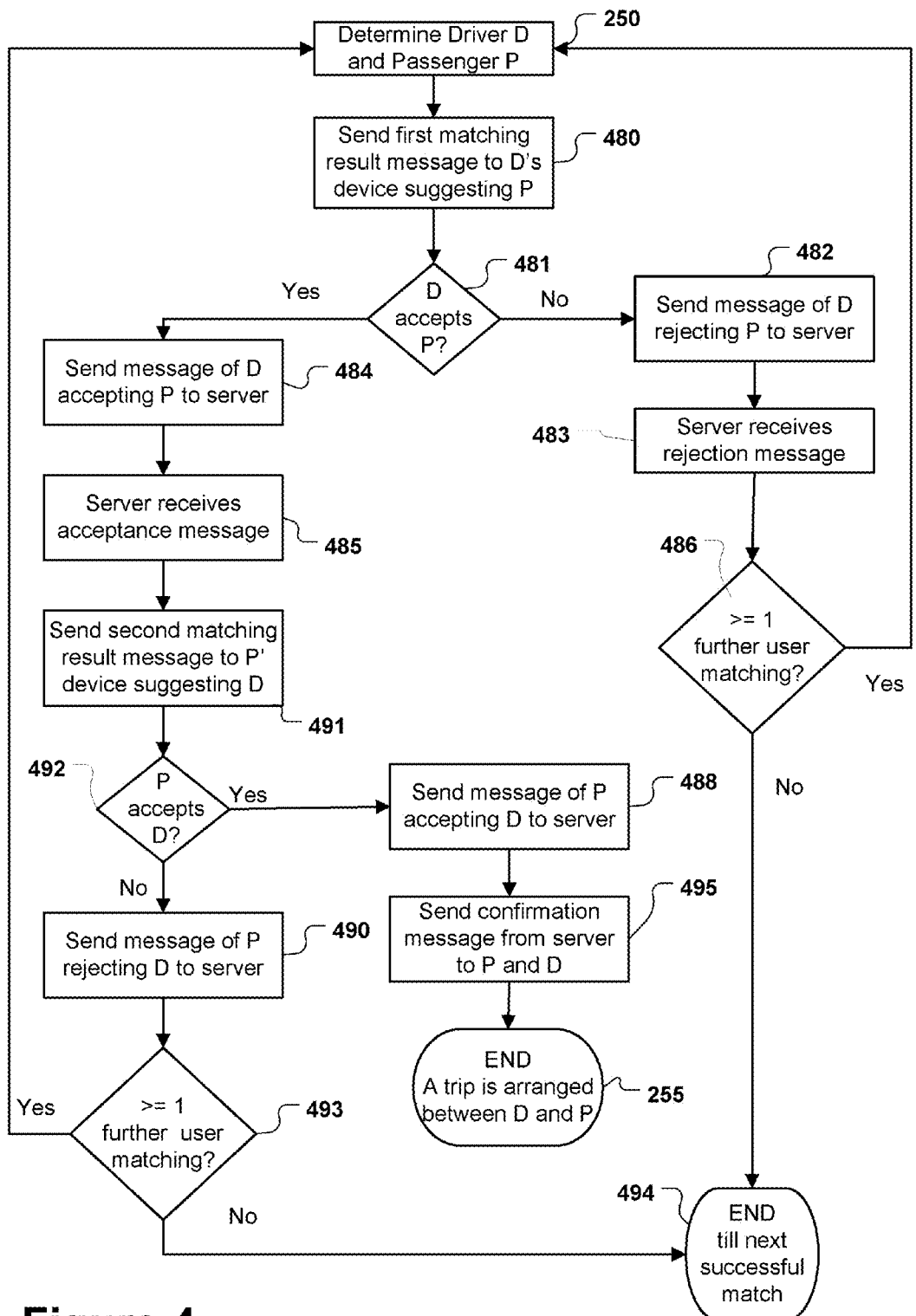
FIG. 4 illustrates the semi-automatic, server-based allocation of trip accompanies after a successful match of users.
Figure 5:
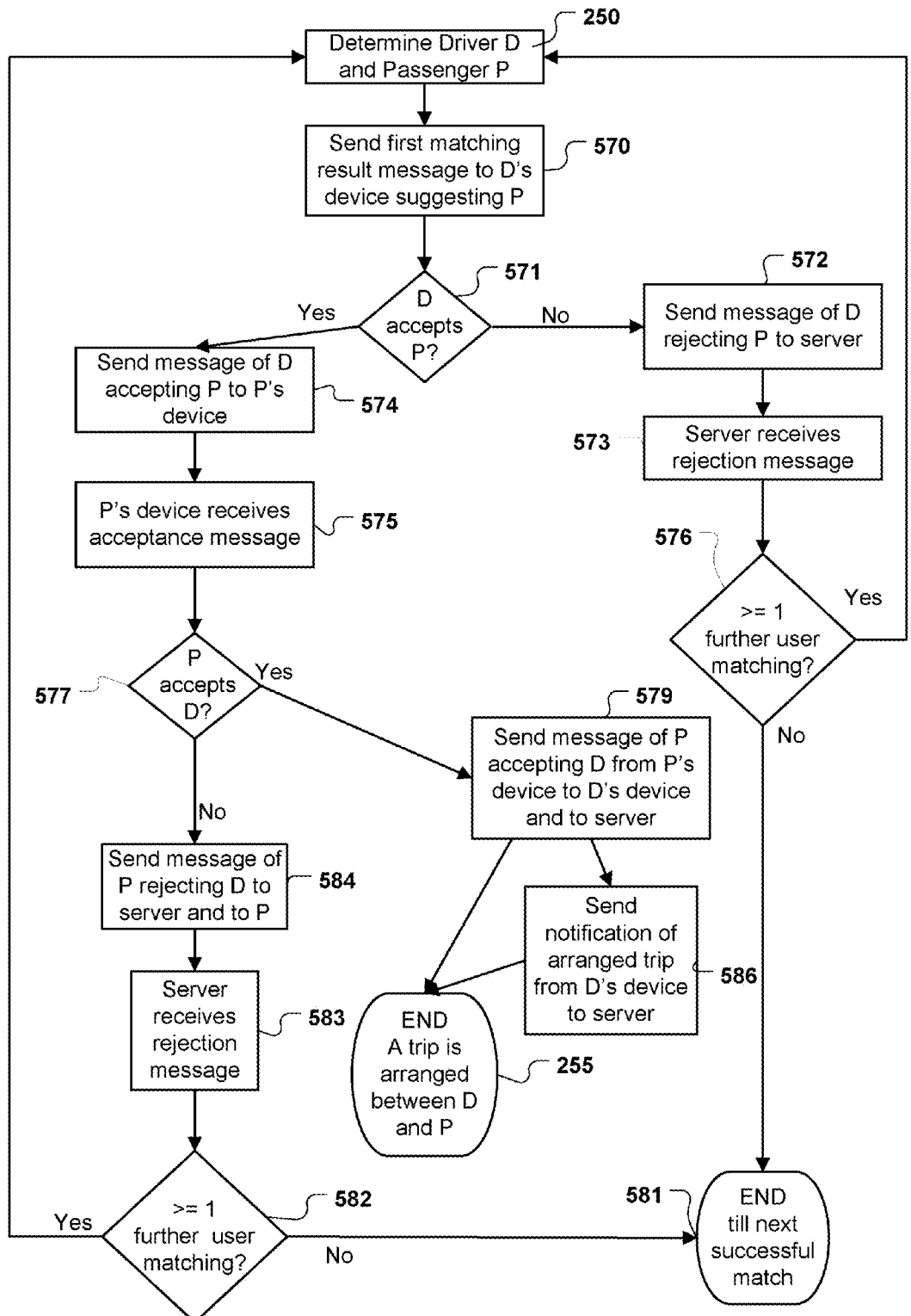
FIG. 5 illustrates the semi-automatic, client-device based allocation of trip accompanies after a successful match of users.
Figure 11A:
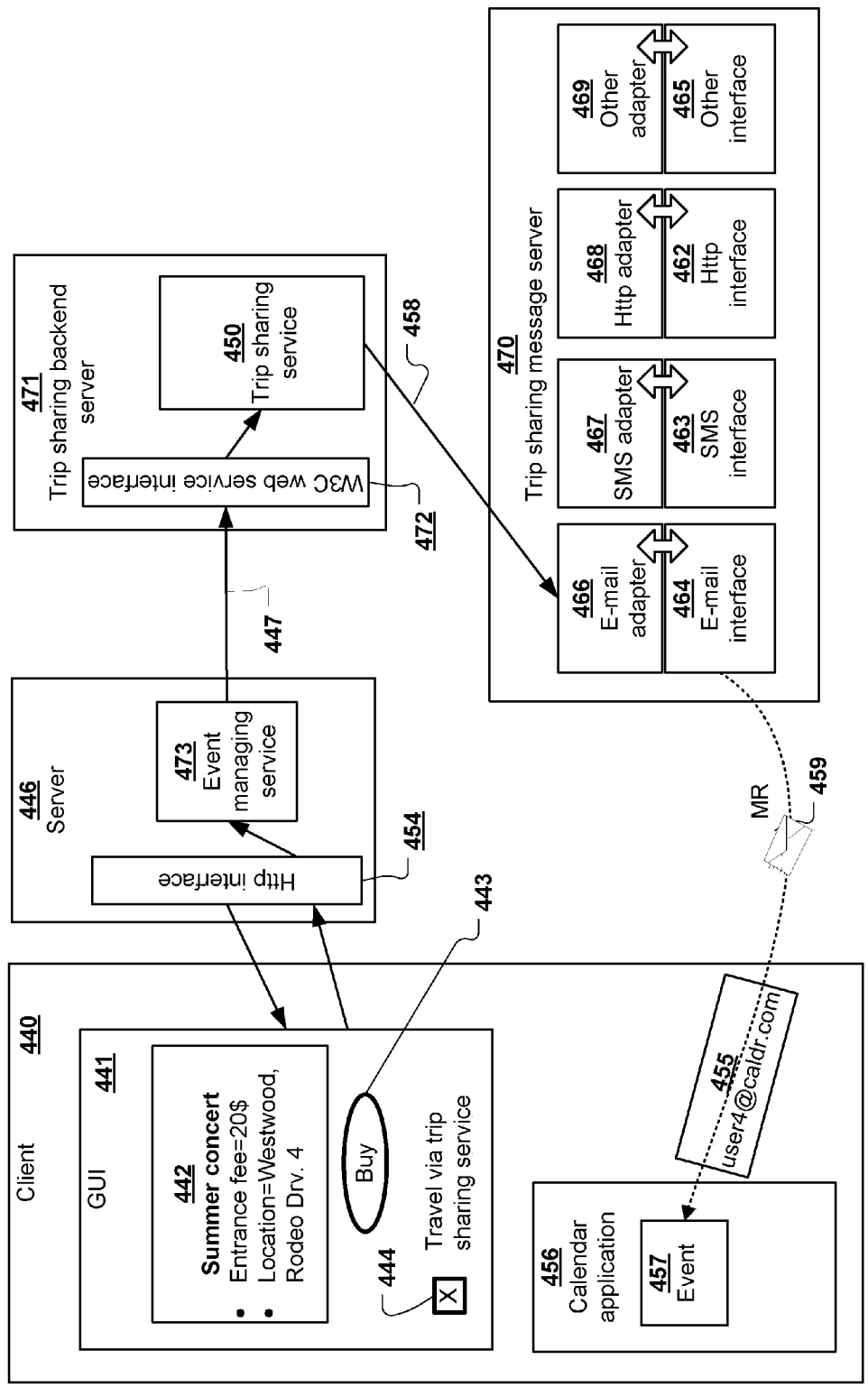
FIG. 11a illustrates a computer system of a trip sharing service called by an event managing service, the call being initiated by a user ordering a ticket.

In case the level of congruency is high enough, e.g. in case the matching score reaches a particular threshold, the users corresponding to each matching potential trip data object are allocated to each other as potential trip accompanies. The allocation can be executed automatically by the trip sharing service as depicted in FIG. 2. The allocation of trip accompanies can also be executed semi-automatically based on the server hosting the trip sharing service communicating with the client devices as depicted in FIG. 4. The allocation of trip accompanies can also be executed semi-automatically based on the server communicating with the client devices and the client devices communicating with each other as depicted in FIG. 5. The service requests can be submitted to the trip sharing service via third party services, for example, an event management service, as depicted in FIG. 11a. One embodiment of the trip sharing service is can be seen by a combined consideration of FIGS. 11a and 11b. The trip sharing service provides a multitude of interfaces and may be called by a multitude of clients via a multitude of technical communication protocols as depicted in FIG. 13.

Figure 13:
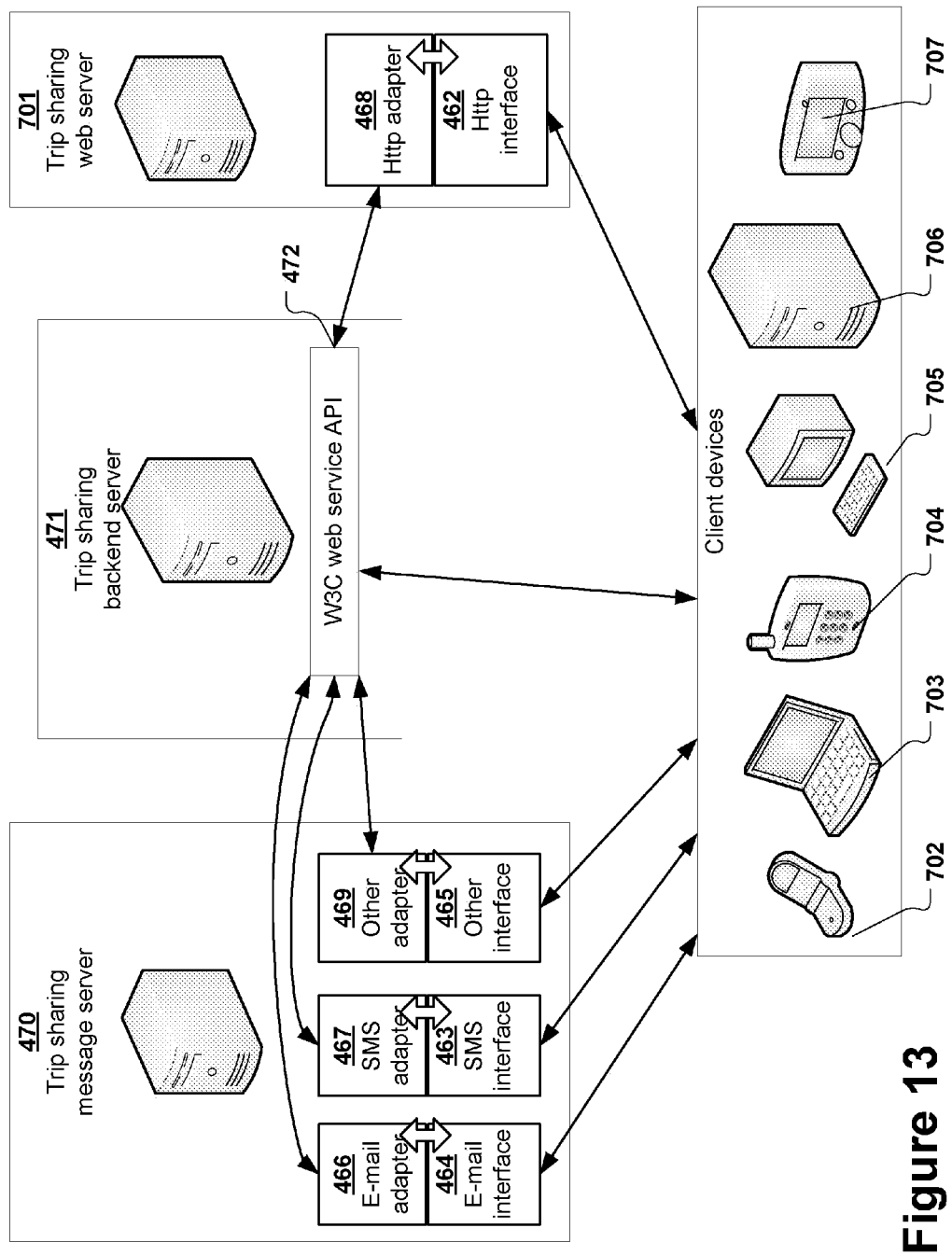
FIG. 13 depicts sets of end user devices being able to call via a service integration module the trip sharing service directly or indirectly via multiple interfaces.

According to further embodiments of the invention, the adapter modules and communication interfaces hosted according to FIGS. 11a and 13 on a trip sharing message server are hosted on the same server as the trip sharing service (not shown).

Figure 9A:
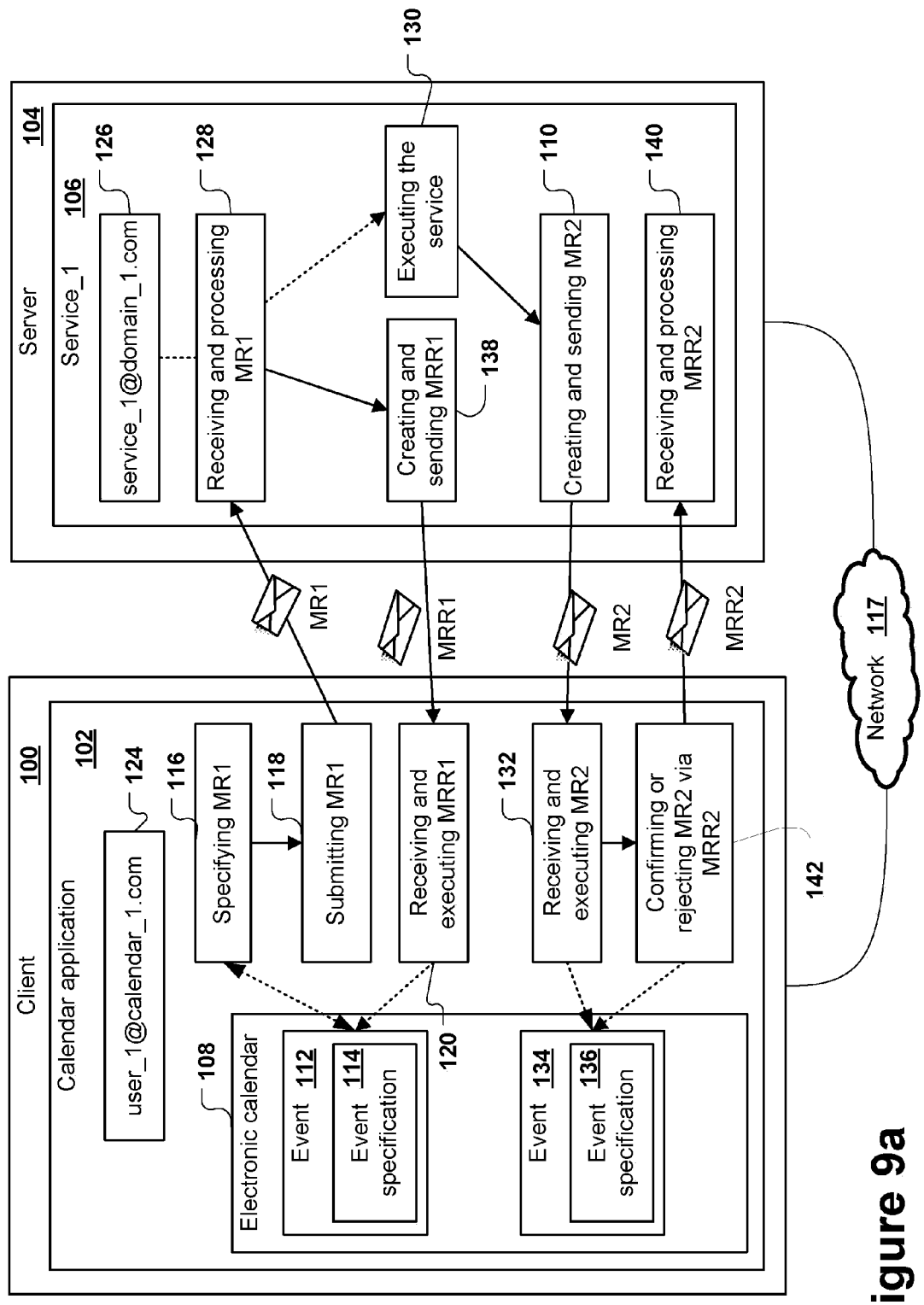
FIG. 9a illustrates a calendar application running on a client and the integration of a service via a meeting request e-mail according to the 'default updating strategy'.
Figure 9B:
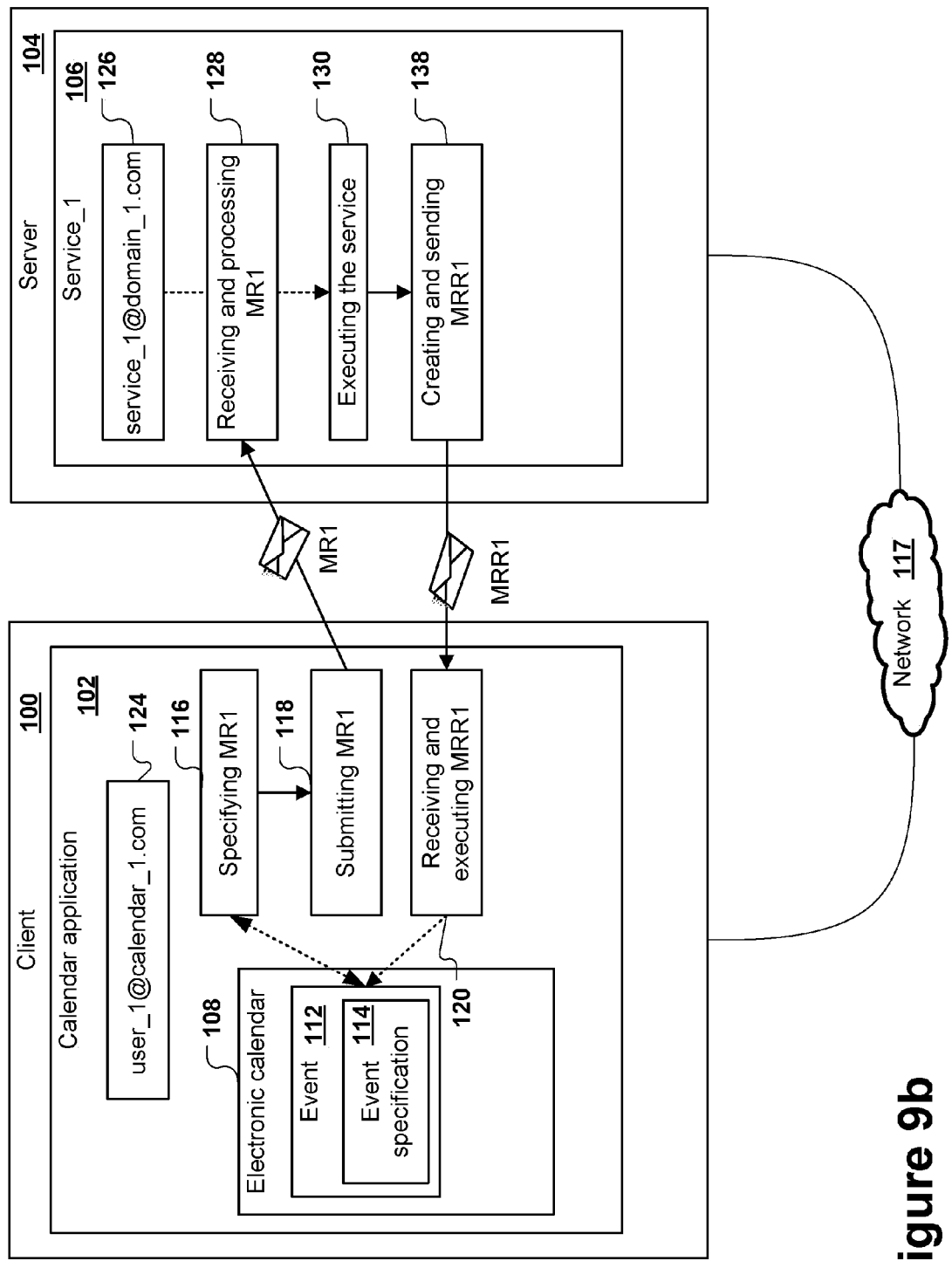
FIG. 9b illustrates a calendar application running on a client and the integration of a service via a meeting request e-mail according to the 'advanced updating strategy'.

The service requests can be specified and submitted by a user explicitly, e.g. by creating a meeting request e-mail in a calendar application such as Microsoft Outlook which is sent to an e-mail interface of the trip sharing service. This application scenario is depicted in FIGS. 9a and 9b. A meeting request response email and, depending on the implementation of the calendar application, a second meeting request e-mail, is sent by the trip sharing service to the user's e-mail address and received by the calendar application of the user's client device. The response e-mails are submitted by the trip sharing service to the user in case the trip sharing service was executed successfully. The trip sharing service was executed successfully in case the matching service, which is a part of the trip sharing service, detected in the database of the trip sharing service at least one potential trip data object reaching a matching score above a threshold with the trip data object created upon receipt of the service request. The e-mails returned in this case comprise the result of the execution of the trip sharing service, e.g. user specific data of the matching user. Upon receipt of the meeting request response email or the second meeting request e-mail, the calendar application of the user is updated. In effect, the trip sharing service is integrated into the calendar application of the user.

Figure 7A:
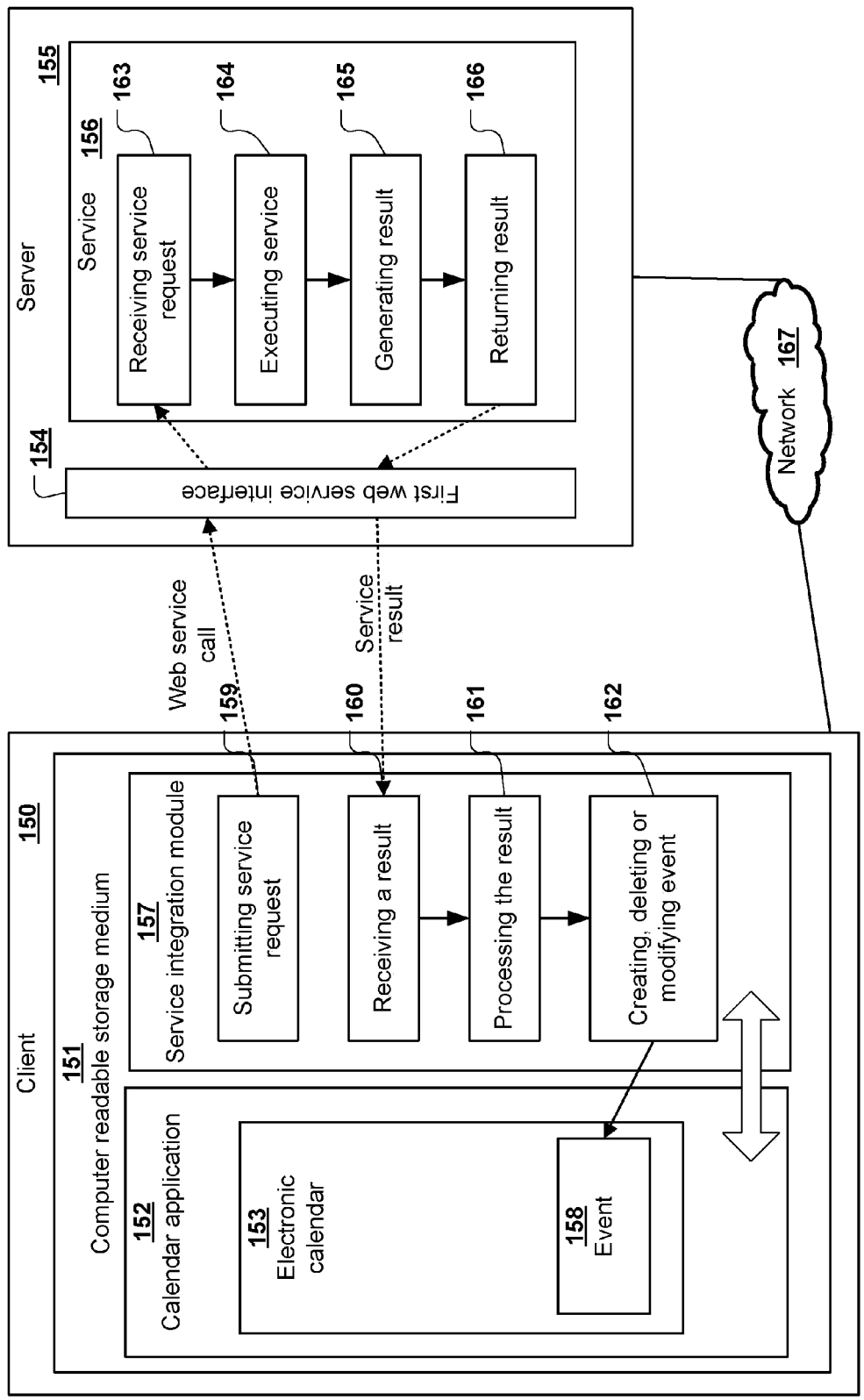
FIG. 7a illustrates the integration of a remote service in an calendar application, result being returned via the first web service interface and the updating of the electronic calendar being executed by the service integration module.
Figure 7B:
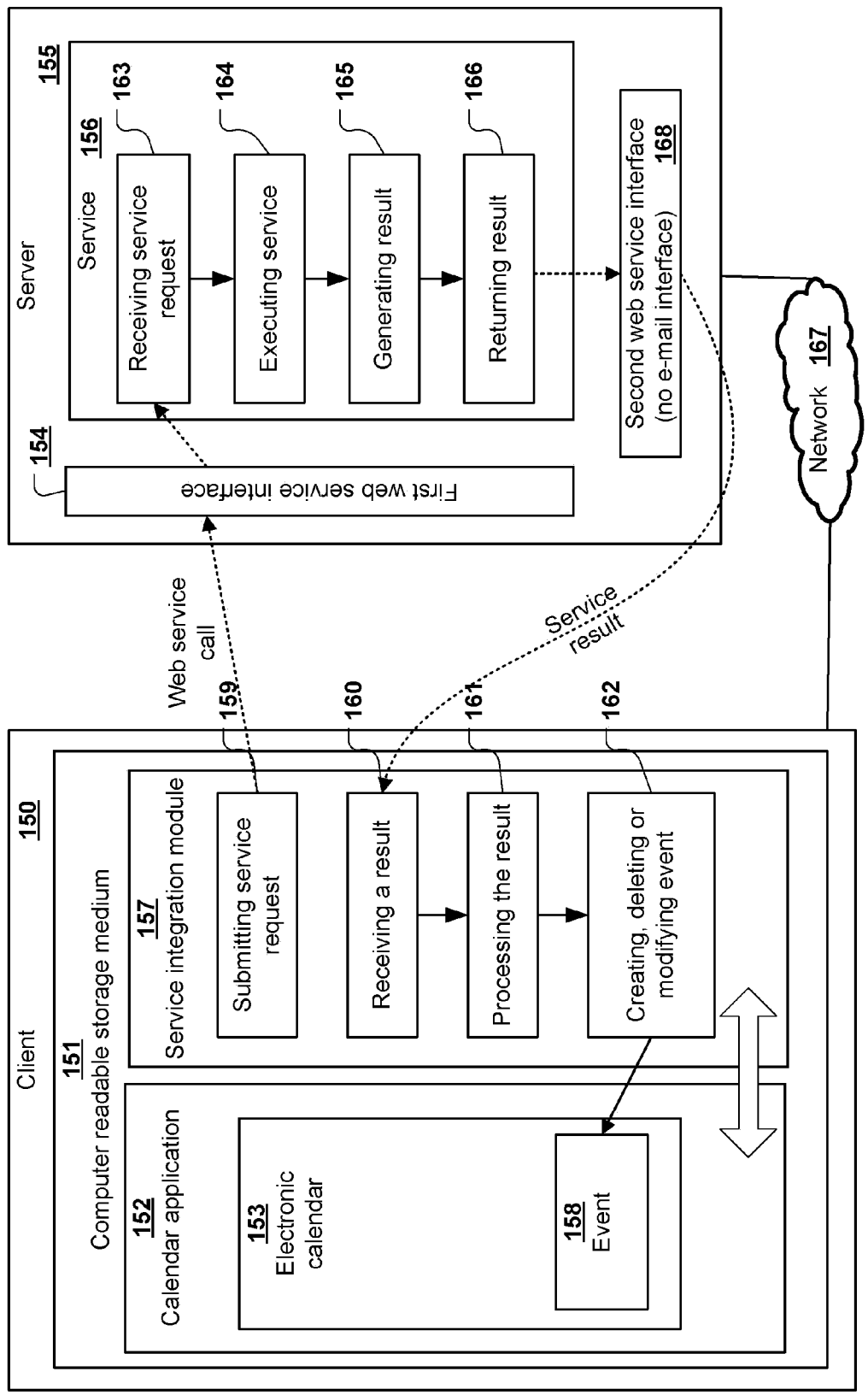
FIG. 7b illustrates the integration of a remote service in an calendar application, result being returned via a second web service interface and the updating of the electronic calendar being executed by the service integration module.
Figure 8:
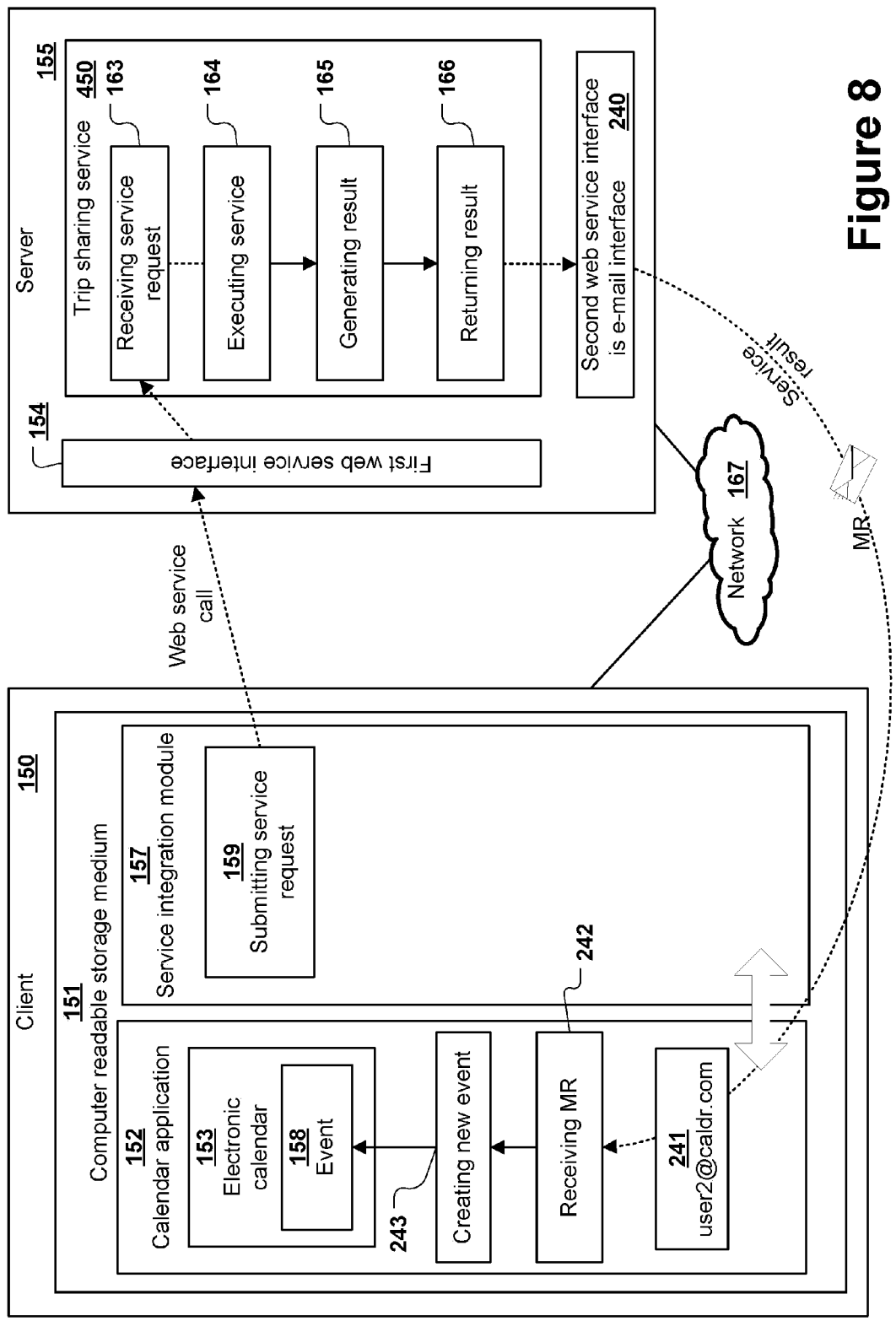
FIG. 8 illustrates the integration of a remote service in an calendar application, the updating of the electronic calendar being executed by the calendar application receiving a meeting request e-mail.

Other client devices as depicted in FIGS. 7a, 7b and 8 may use a special software module installed on the client device which is operable to submit service requests to the trip sharing service. Said additional software component is referred to as service integration module. The service integration module may use W3C web service technology, SMS, e-mail, instant messaging or any other communication technology to submit a service request to a corresponding interface provided by the trip sharing service. The service integration module may receive the results of the service via the same or a different interface as the interface used to submit the service request. The service integration module receives the result returned by the service and updates the electronic calendar of the calendar application. In case the trip sharing service returns the result via e-mail, the service integration module is only required for submitting service requests, not for receiving the result and for updating the calendar application. Said scenario is depicted in FIG. 8.

According to a further embodiment of the invention, a trip manager program may be installed on the client device in addition or instead of the service integration module. The trip manager program provides the user with a graphical user interface to conveniently specify and manage planned, arranged and past trips.

Figure 10:
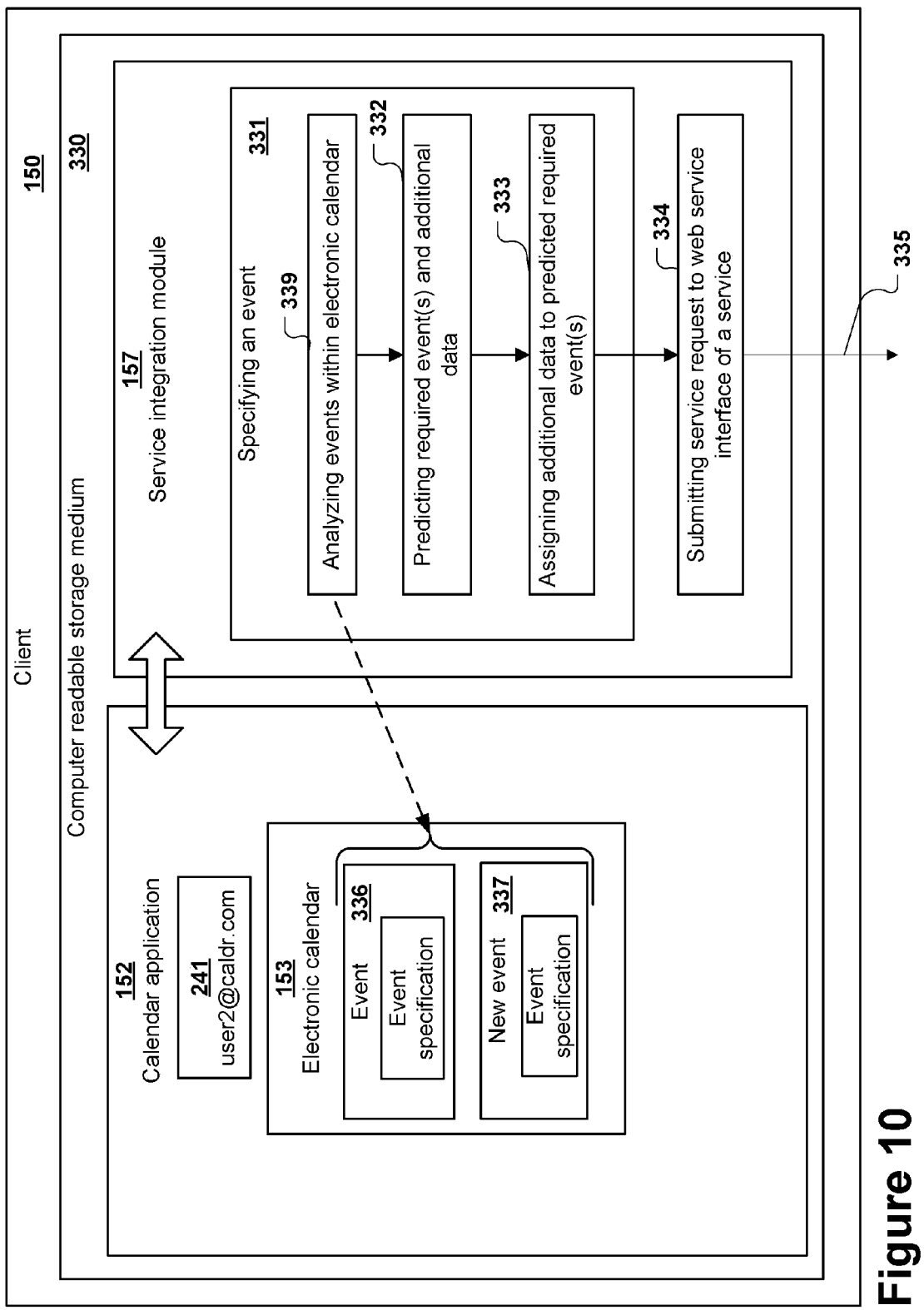
FIG. 10 illustrates a calendar application and a service integration module, the service integration module being operable to predict required events according to the 'implicit required event prediction' approach.

According to further embodiments, the service requests are not specified manually and explicitly by the user. Rather, required trip events are predicted by the service integration module having access to the calendar application of the trip sharing service as depicted in FIG. 10.

The trip sharing service according to further embodiments of the invention can be integrated into any calendar application comprising a meeting request e-mail functionality, e.g. Microsoft Outlook, Apple iCal, Mozilla Thunderbird, Google Calendar, Blackberry Calendar, Lotus Notes, the iPhone Calendar and many more. A meeting request functionality of a calendar application is a function by which users can invite one or multiple other persons to a meeting, the meeting being defined by a starting time, location and arrival time. Each invited person may accept, postpone or reject a meeting invitation by sending a meeting request response (MRR) e-mail to the e-mail address of the organizer. In case an invited person accepts the suggested meeting date, the event in the electronic calendar of the organizer corresponding to the MR for the meeting is automatically updated with the information that the invited participant will join the meeting.

Each invited person may accept the appointment, reject it or propose a new time. The invited user submits his decision to the calendar application of the organizer by clicking on an 'accept', 'reject' or 'suggest new time' button displayed by the calendar application of the invited person after opening the meeting request (MR) e-mail. In most current calendar applications, it is possible to submit more information than said three options 'accept', 'decline' or 'propose new time', e.g. by adding comprehensive supplementary data or comments to the MRR e-mail in the e-mail's text body. However, due to security considerations, this additional data is not added to the calendar event in the organizer's calendar. For said reason, the options for automatically updating electronic calendars via a MRR e-mail are currently restricted to a limited set of parameters and cannot be used to add complex textual comments via a meeting request response e-mail. A possible workaround is the sending of a second meeting request e-mail to the list of recipients comprising the comments a user wants to add. The electronic calendars of the recipients are automatically or upon confirmation updated, because the receipt of the second MR e-mail will trigger the creation of new events.

Other calendar applications following a less restrictive security policy than e.g. Microsoft Outlook or Lotus Notes are more permissive regarding the possibility to update events via MRR e-mail of invited users. In order to update those calendar applications, the submission of a second MR e-mail by a recipient of the first MR is not required. Rather, the recipient of the first e-mail is able to provide all other invited persons and the organizer with additional relevant data simply by adding said data directly e.g. to the text body or another field of the first MRR e-mail. If the calendar applications of the recipients follow a permissive updating policy, the additional data provided in the first MRR e-mail will automatically be added to the existing MR related event in their respective electronic calendars.

In the following, the updating of the organizer's electronic calendar regarding said limited list of options ('accept', 'decline', 'propose new time') via a first MRR e-mail in combination with creating a new event in the organizer's calendar by sending a second MR e-mail (from the recipient of the first MR to the organizer of the first MR) will be referred to as 'default updating strategy'. The second MR e-mail comprises additional data and may also comprise modified event specifications. The specifications of an event can comprise a time information, e.g. the starting time or arrival time, but can in addition or alternatively also comprise information such as location, subject, a recurrence pattern for recurring events and additional information required by a recipient, the additional information being contained in the text body of the event.

A second 'advanced updating strategy' does not require the submission of the second MR e-mail, because according to this update strategy all additional data can be provided already within the MRR e-mail. The advanced updating strategy requires the calendar application of the organizer and other participants of the event to follow a permissive security policy: the calendar application must allow the update of any kind of information of a calendar event, e.g. starting time, arrival time, location or the text contained in the text body of the event).

The term update request (UR) will in the following refer to the submission of e-mails from the trip sharing service to the user of a client device having installed a calendar application in response to a service request submitted by the client, wherein the e-mail may be one single MRR e-mail or a combination of a MRR e-mail and a second MR e-mail.

The update request comprises, in case of the default updating strategy, the submission of a first MRR-email and a second MR e-mail to the organizer's e-mail address, the first MRR updating only a limited list of options of the event associated with the first MR, the second MR e-mail updating the organizer's electronic calendar by creating a second event. The second event comprises all the additional data and optionally modified event specifications. Said updating strategy is in the following referred to as 'default updating strategy'.

The update request comprises, in case of the advanced updating strategy, the submission of only a first MRR-email to the user's email address by the trip sharing service, the first MRR e-mail being able to update any kind of data specifying the event associated with the first MR, e.g. time and location and being able to add supplementary data to the event corresponding to the first MR e-mail.

Which kind of updating strategy is applicable in the context of a particular use case scenario depends on the implementation and security policy of the calendar application installed on the client device.

Due to the fact that in praxis many calendar applications for security reasons do not provide the full update functionality they could provide, further embodiments of the present invention follow a dual strategy for automatically integrating services into calendar applications via the MR and MRR functionality provided by current calendar applications.

DETAILED DESCRIPTION

In the following like elements are designated by identical reference numerals throughout the various embodiments.

FIG. 1 illustrates the receipt of service requests and the execution of the matching method 185 by the trip sharing service.

At first, the trip sharing service receives a first service request 175 submitted from a first user. The service request comprises trip related data. The service request comprises a starting time, an arrival time, a place of departure and a destination location. In case the user profile comprises a default departure location or a default destination, the respective information may be absent in the service request. The service request comprises also information allowing the mapping of the service request to a user profile. This information can be provided e.g. in the form of an e-mail address corresponding to the e-mail address used in the user profile of the first user. The trip sharing service creates and specifies in step 177 a first potential trip data object which comprises trip related information, e.g. time and place of departure and arrival and which comprises in addition user related information derived from the user profile of the first user. User related information can comprise the smoking preferences or taste in music of the first user. The created first potential trip data object is stored to a database of the trip sharing service. All service requests received in the past which have not yet been allocated to a matching trip accompany are stored in the form of potential trip data objects in the database of the trip sharing service. The trip sharing database typically comprises several 100.000 or several million potential trip data objects.

After receiving the first service request in step 175 and creating and specifying a first potential trip data object based on the first service request in step 177, the matching method 185 is initiated: a loop process 187 looping over all potential trip data objects currently existing in the trip sharing database except the first potential trip database is executed.

For each existing potential trip data object, steps 180, 181, 184, 182 and 183 is executed. The current potential trip data object of the loop, in FIG. 1 referred to as 'second potential trip data object', is compared in step 180 with the first potential trip data object. According to a preferred embodiment of the invention, the comparison between the first and the second trip data object is implemented as a comparison of two multidimensional vectors whose dimensions are weighted. The comparison is executed on the trip related specifications, e.g. time and place of departure, and on user related specifications, e.g. smoking habits, driver/passenger preferences or taste in music. In step 181, the degree of congruency of both potential trip data objects is determined. According to a preferred embodiment of the invention, the degree of congruency is specified as a matching score. The higher the weight of a dimension of the compared vectors, the higher the impact of said dimension on the matching score. In Step 184, a final role is assigned to each of the users corresponding to the first and the second potential trip data object. Categorical drivers and categorical passengers will be assigned their categorical role, but they cannot be matched to each other if they have the same categorically specified role. In case both users have specified to act preferentially, but not categorically, as driver or passenger, their final role may not in every case be their preferred role. The final role may depend on the preferences of the assigned trip accompany and on the places of departure of both users in relation to the destination location.

In case in step 180, the comparison of potential trip data objects, a permissive location strategy was applied to determine a match between locations, a filtering method 179 has to be executed. The filtering method checks if the pick-up or drop-off radius of the user having been assumed in step 180 to have the driver role is indeed larger than or equal to the pick-up or drop-off radius of the user having been finally assigned the passenger role. If this assumption is false, the matching score is reduced accordingly.

The decision 182 determines, if the degree of congruency exceeds a first threshold for adding a potential trip data object to the result list of matching trip data objects. The degree of congruency is preferentially indicated by a matching score. Depending on the embodiment of the invention, the threshold may be specified by each user in his user profile or may be predetermined by the trip sharing service. In case the matching score exceeds a first threshold, the matching potential trip data object is added to a result list in step 183. The list is sorted according to the matching score of each second potential trip data object. After step 183 is finished, the loop proceeds to the next potential trip data object of the database and compares this current trip data object as new 'second trip data object' with the first trip data object according to the steps of the loop procedure 187.

After having compared all existing potential trip data objects with the first potential trip data object, the decision 186 determines if the matching method was executed successfully. The matching method was executed successfully in case the result list comprises at least one matching existing potential trip data object.

In case the result list comprises at least one matching potential trip data object, the trip data object with the highest matching score is used to allocate the first user as trip accompany to the best matching user. In case of the successful execution of the matching method, a method allocating the user corresponding to the first potential trip data object to the user corresponding to the best matching potential trip data object as trip accompanies is initiated. Depending on the embodiment of the invention, on user specific settings and on the reached degree of congruency, the step 188 may be executed automatically as shown in FIG. 2, may be executed semi-automatically and server-based as depicted in FIG. 4 or may be executed semi-automatically and client-device based as depicted in FIG. 5.

FIG. 2 illustrates the automatic allocation of trip accompanies after a successful match of users. The user corresponding to the first potential trip data object is referred to as first user, the user corresponding to the best matching trip data object already existing in the database is referred to as best matching user.

Each user can specify in his user profile the value of a matching score threshold for an automatic allocation of trip accompanies. Said threshold determines, if a matching user should be allocated as trip accompany automatically or semi-automatically (requiring the confirmation by the user). The automatic allocation of users is initiated by the trip sharing service only in case the matching score of the highest matching potential trip data object exceeds the threshold.

In case the decision step 186 determines, that the matching score exceeds the threshold for an automatic allocation of trip accompanies, the trip sharing service determines in step 250, which user has been allocated the driver role and which user has been assigned the passenger role in step 184.

In Step 251, the trip sharing service sends a first matching result message to the driver's client device, which is received by the client device of the driver in step 252. The first matching result message comprises a notification of a successful match, the pick-up place of the passenger and passenger related information. The driver may contact the passenger, but he is not required to do so. The automatic allocation of drivers does not require the driver or the passenger to explicitly confirm an allocated trip accompany.

Accordingly, a second matching result message is sent from the server hosting the trip sharing service to the client device of the passenger in step 253. The passenger's device receives the second matching result message in step 254. Said result message comprises a notification on a trip and user related data of the driver.

The allocation of trip accompanies is finished in step 255. After the first user and the best matching user have successfully been allocated to each other as trip accompanies, an arranged trip data object is created by the trip sharing service (not shown).

After the trip has expired, the arranged trip data object of the trip sharing service is moved from the list of arranged trip data objects to the list of past trip data objects. Each user corresponding to a past trip data object may be supplemented with feedback information given from the other trip accompanies within three month after the trip.

FIG. 3 illustrates four multi-dimensional vectors v1-v4 (356, 353, 354 and 355). Each vector represents a potential trip data object. A potential trip data object and its corresponding vector comprise specifications of a multitude of trip related and user related features. Each particular specification or feature of a potential trip data object corresponds to one dimension of the vector. FIG. 3 depicts the dimensions d1 351, d2 352 and dn 350. Dimension d1 351 could, for example, represent the smoking habits of a user, d2 the user's taste in music and dn the earliest acceptable starting time. Each dimension has assigned a weight. The weight of some of the features, e.g. the taste in music, is thereby specified by the user in his user profile. The weight determines the impact of each dimension on the overall matching score. The overall matching score obtained by comparing the vectors of two potential trip data objects of two different users. The similarity of two vectors is determined based on the angle 357, 358 between both vectors within a multidimensional space. The number of dimensions of that multi-dimensional space corresponds to the number of dimensions of the potential trip data object of each compared vector. The smaller said angle, the more similar are both multidimensional vectors to each other, and the higher the weight of a particular dimension, the higher the impact of that dimension on the similarity score of two vectors. The weighted similarity score between two vectors is in the following referred to as matching score.

FIG. 4 illustrates the semi-automatic, server-based allocation of trip accompanies after a successful match of users.

The trip sharing service determines in step 250 the driver/passenger roles having been assigned to each user in step 184 of the matching method. A first matching result message 480 is sent to the client device of the driver. It is assumed that more passengers use trip sharing services than drivers, therefore the drivers are assumed to be more selective regarding the passengers and receive the first matching result message. The first matching result message comprises a notification of a successful match and user specific data of the passenger. The client device of the driver receives the first matching result message and prompts the user to decide whether he wants to accept the suggested passenger as trip accompany. In case the driver accepts the passenger in decision 481, an acceptance message is sent in step 484 to the server hosting the trip sharing service. Upon receipt of the acceptance message of the driver, the server sends a second matching result message to the client device of the passenger in step 491. The second matching result message comprise a notification of a successful match and user related data of the driver. In case the passenger accepts in decision step 492 the driver as trip accompany, a second acceptance message is sent in step 488 to the server. The trip sharing service hosted on the server creates an arranged trip data object in the trip sharing database. The arranged trip sharing database comprises references to its corresponding two or more potential trip data objects. In step 495, the trip sharing service sends a confirmation message to the client devices of the driver D and the passenger P comprising the information that a trip was arranged and that D and P were successfully allocated as trip accompanies. At the end point 255, the first user and the best matching user have successfully been allocated to each other as trip accompanies. After the trip has expired, the arranged trip data object of the trip sharing service is moved from the list of arranged trip data objects to the list of past trip data objects. Each user corresponding to a past trip data object may be supplemented with feedback information given from the other trip accompanies within three month after the trip.

In case the driver in step 481 rejects the suggested passenger, a first rejection message is sent to the trip sharing service in step 482. The trip sharing service examines, whether another user matches the driver according to the result list of the previously executed matching method. If no further user is contained in the result list, the allocation of users is aborted without a result (end point 484). In case at least one further user matching the driver is found in the result list, the further matching user is used as potential trip accompany. As the roles distribution of the further matching user and the current driver may be different, it is examined in step 250, which roles both users have assigned according to the further match in the result list. The former driver may, according to the further match, still act as driver, but it is also possible that he now acts as passenger. After step 250 determined the current driver, a matching result message is sent in step 480 to the client device of the current driver.

In case the passenger rejects in step 492 a suggested driver, a second rejection message is sent to the trip sharing service. The trip sharing service examines, whether another user matches the current passenger according to the result list of the previously executed matching method. If no further user is contained in the result list, the allocation of users is aborted without a result (end point 494). In case at least one further user matching the current passenger is found in the result list, the further matching user is used as potential trip accompany. As the roles distribution of the further matching user and the current driver may be different, it is examined in step 250, which roles both users have assigned according to the further match in the result list. The former passenger may still act as passenger or may now act as driver according to the further match in the list. After step 250 determined the current driver, a matching result message is sent in step 480 to the client device of the current driver.

FIG. 5 illustrates the semi-automatic, client-device based allocation of trip accompanies after a successful match of users. The trip sharing service determines in step 250 the driver/passenger roles having been assigned to each user in step 184 of the matching method. A first matching result message 570 is sent to the client device of the driver. It is assumed that more passengers use trip sharing services than drivers, therefore the drivers are assumed to be more selective. The driver decides in decision step 571, whether he accepts the suggested passenger as trip accompany. In case the driver accepts the suggested trip accompany, the driver's device in step 574 sends a message to the client device of the passenger indicating the acceptance of the passenger by the driver. In case the passenger accepts the driver in step 577, a message is sent in step 579 from the client device of the passenger to the client device of the driver, the message indicating the acceptance of the driver by the passenger as trip accompany. In addition, the client device of the passenger submits a notification message upon a successful allocation of trip accompanies to the server in step 579. The client device of the driver, upon receiving the acceptance message of the client device of the passenger, also submits a notification message upon a successful allocation of trip accompanies to the server in step 586.

In analogy to the semi-automatic server-based matching, in case a driver rejects a suggested trip accompany in step 577, a rejection message is submitted to the trip sharing service in step 572. The trip sharing service determines in step 576, if a further matching potential trip data object and corresponding further matching user was found in the previous matching step. If no further matching user was found the allocation of users is aborted without a result. No arranged tip data object is created. The potential trip data objects remain unchanged in the trip sharing service database and may match to another user in a future execution of a service request. In case a further matching user was detected in the result list, the roles of the further matching user and the current passenger are assigned according to the further mach in step 587. In step 578, a message suggesting the current passenger to the current driver is sent from the server to the client device of the current driver.

In case the passenger in step 577 rejects a suggested driver, a rejection message is sent in step 584 to the server and to the client device of the driver. The trip sharing service as a result checks in step 582, if a further user matches the passenger. If no further matching user was found the allocation of users is aborted without a result. In case a further matching user was detected in the result list, the driver and passenger roles of the new matching user pair are determined in step 250.

FIG. 6a illustrates the location matching based on pick-up and drop-off radiuses. The route 652 connects the place of departure 653 of the driver with the destination location 656 of the driver. In his user profile, each user has specified a pick-up radius 651 and a drop-off radius 658. The pick-up radius determines the maximum distance from his own place of departure the user owning said user profile is willing to drive to pick-up a passenger in case the user is assigned the role of a driver. Analogously, the drop-off radius determines the maximum distance from his own destination location a user is willing to drive to drop-of a passenger. The pickup radius 651 defines a pick-up area 650 around the place of departure 653 of a user. The drop-off radius 658 defines a drop-off area 655 around the destination location 656 of a user. Both radiuses 651 and 658 can be as a time value or a distance value. They can be given in absolute numbers, e.g. a particular number of minutes or kilometers. According to further embodiments, they can be defined relative to the length of the route 652 or the estimated time the trip along the route 652 will take.

The values for the pick-up and drop-off radiuses of a user are only of relevance in case the user is assigned the driver role. The radiuses specified in the user profile of the user acting as passenger need in principle not to be considered as it can be assumed that the passenger would not reject a driver willing to drive a large detour.

In case one user is a categorical driver or a categorical passenger, the assignment of the user roles is clear and will not change during the execution of the matching method. In this case, two users yield a match in the matching method only in case the pick-up place 654 of the passenger is located within the pick-up area 650 of the driver and if in addition the drop-off place 657 of the passenger is located within the drop-off area 655 of the driver.

The driver/passenger roles are dynamically assigned by the trip sharing service at the end of the matching method in case none of the users is a categorical driver or a categorical passenger. In said case it is not possible during the matching method to determine which of the two compared potential trip data objects belongs to the driver and should be used as a source for the required radiuses. It is not clear during the comparison of vectors in the matching method who of the two users will finally be assigned the driver role. This is problematic as the first user may have significantly smaller radius values than the best matching user.

To solve this problem, the trip sharing service, according to further embodiments of the invention, uses a permissive location matching method. The permissive location matching method determines the larger pick-up radius of the pick-up radiuses of the two compared potential trip data objects. The place of departure of that potential trip data object having the larger pick-up radius is taken as the driver's place of departure and is the center of the pick-up area. Analogously, the larger drop-off radius of the drop-off radiuses of the two compared potential trip data objects is determined and taken as the driver's drop-off radius. The destination location of that potential trip data object having the larger drop-off radius is taken as the driver's destination location and is the center of the drop-off area.

Further embodiments of the invention use a strict location matching method. The strict location matching method bears the danger of overseeing potential users but is easier to implement.

The use of the permissive location matching method guarantees that all matching users are detected, but requires the execution of an additional filtering step after the matching score has been calculated. In the filtering step, it is checked if the pick-up and drop-off radiuses of the user having finally been assigned the driver role are indeed larger than or equal to the radiuses of the passenger. If not, it is checked whether either the pick-up or drop-off place of the passenger lies outside the pick-up or drop-off area of the driver. If so, the matching score is significantly reduced, and may result in the removal of the corresponding potential trip data object from the result list of matching trip data objects.

FIG. 6b illustrates the segmentation of the circular pick-up and drop-off areas. According to further embodiments of the invention, the information, within which segment the pick-up place 654 is located within the pick-up area 650 and within which segment the drop-off place 657 is located within the drop-off area 655 is also taken into consideration by the matching method and has an impact on the matching score. In each of the two areas 650 and 655, the S0 segment 656, 666 is that very segment being partitioned by the line 652 representing the rout. Segments lying adjacent to S0 are referred to as S1 segments 665, 663, 660, 661. Depending on the embodiment of the invention, there may be two, three or more segments. The segmentation has segment a circular area in a way that there exists one S0 segment per area being partitioned by the line 652. The smaller the segment size, the more segments exist and the more fine-grained information on the required detour for picking up a passenger is available.

In case there are more than three segments per area, the segments lying adjacent to S1 which are not the S0 segment are referred to as S2 segments and so on. The higher the segment number of the pick-up or drop-off location of a passenger, the lower the matching score of the passenger and the driver.

In analogy to the location matching, there exists problem that during the vector comparison the final allocation of roles may be undetermined. Therefore, a correction of the matching score is implemented in the filtering step which may reduce the matching score in case a permissive location matching method was applied by the matching method.

FIG. 7a depicts the integration of the trip sharing service 156 into a calendar application 152 according to one embodiment of the invention. The calendar application 152 is installed on a client device 150, e.g. a computer, mobile phone or other processing device. According to further embodiments of the invention, the client is operable to permanently or temporarily (transiently) connect to a network 167, e.g. the Internet or the intranet of a company. Other embodiments of the invention according to which the client 150 is, for example, a navigation device, are not connected via a network permanently to other devices but comprise means for exchanging data with other end user devices and servers, e.g. via a RDS, satellite link or a SMS interface and corresponding mobile telephony stations. According to a further embodiment of the invention, instant messaging based on the XMPP/Jabber protocol is used to call a remote service and receive results. The exchange of data via instant messaging is particularly advantageous as it is possible to dynamically indicate the status (the availability) of a particular service and to exchange data asynchronously. In the following, the term network will also subsume the existence of means for exchanging data between two devices via a defined data exchange interface and format which do not have to be in use permanently. The calendar application 152 comprises an electronic calendar 153 containing events, e.g. event 158. An event in an electronic calendar is a data object being characterized e.g. by date and time of the begin and end of the event, by an event location and by additional information, e.g. by information on the type of the event (meeting, telephone conference, a trip) or the list of participants. The server 155 hosts the trip sharing service 156, the trip sharing service being accessible via a first web service interface 154 and returning its result via the same interface. In the following paragraphs, the integration of trip sharing service 156 into the calendar application 152 via the service integration module will be described, the service integration module updating the electronic calendar by creating new events or by modifying existing events depending on the result obtained from the called trip sharing service 156.

In the first step 159, the service integration module submits a service request to a first web service interface 154 provided by the remote trip sharing service 156. The web service interface is an interface adapted to a particular kind of data exchange format between two processing devices, including web services in the broad and in the strict sense as defined beforehand. The service request submitted in step 159 may be specified explicitly and manually by the user, e.g. via a GUI provided by the service integration module 157, according to further embodiments of the invention. According to other embodiments, the service request is submitted fully automatically or semi-automatically by the service integration module 157 if the module is operable to implicitly predict required events and service requests.

Depending on the implementation and settings of the service integration module, predicted required events and corresponding service requests may be submitted fully automatically or may be submitted after the user has approved to the submission of the service request (semi-automatic service request submission). The trip sharing service 156 receives the service request in step 163, executes the service in step 164 and generates a result in step 165.

The result is returned via the first web service interface 154 as depicted in FIG. 7a.

The first web service interface is a W3C web service interface based on XML and SOAP. This communication technology is particularly advantageous for machine-to-machine communication as depicted in FIGS. 7a, 7b and 8. The service integration module calls the trip sharing service via the first web service interface and may in addition retrieve the result via the same 154 or a different web service interface 168.

According to further embodiments of the invention, other data exchange technologies are used to submit service requests to the trip sharing service, e.g. SMS. For example, if the client device 150 is an old mobile phone lacking a network card and the integrated service is a taxi ordering service, the usage of a W3C web service interface may be inappropriate. Rather, the submission of the service request to the server via a SMS interface provided by the service would currently appear as more appropriate. The service integration module submitting the service request in step 159 and for receiving the result in step 160 according to the embodiment depicted in FIG. 7a uses the same web service interface 154, here referred to as first web service interface.

After the service integration module has received in step 160 the result generated by the service 156, the service integration module processes the result and creates an event 158 in the electronic calendar 153 in step 162. Alternatively, the service integration plug-in modifies an existing event in the calendar application. The existing event may be deleted or modified, e.g. by supplementing the event with additional data or by changing the staring or arrival time or location of the event. Step 162 requires the service integration module to be interoperable with a particular calendar application, e.g. Microsoft Outlook or Lotus Notes, and to have read and write access to the electronic calendar 153.

According to a further embodiment, the service integration module 157 creates or modifies multiple events in the electronic calendar 153 after receiving and processing the result generated by the trip sharing service.

To simplify matters, embodiments of the present invention according to which the service integration module is installed on the machine hosting the groupware server of the calendar application are not depicted. The exchange of data between said machine and the servers hosting the requested services is in principle the same as explained for the communication between the service integration module installed on the client hosting the calendar application. The service integration module installed on the groupware server machine has read and write access to the data managed by the group ware server. The managed data corresponds to electronic calendars of one or multiple groupware-clients. Based on said calendars, the service integration module may predict required events and services, submit service requests to the trip sharing service and update the electronic calendar(s) after receiving and processing the result from the service. In case service requests are submitted via the service integration module installed on the host machine of the groupware server, the results of the called trip sharing service can be received by the said service integration module via a first or via a second web service interface. The service integration module processes the results and deletes, creates and modifies events in one or multiple electronic calendars of the clients by manipulating data of the groupware server. Alternatively, the trip sharing service may return the results via an e-mail to an e-mail address of a user of the calendar application.

The submission of the service request to the first web service interface 154 and the receipt of the result by the service via the first web service interface 154 can be synchronous or asynchronous.

FIG. 7b illustrates an embodiment of the invention according to which the service uses a second web service interface 168 to return the results to the service integration module, the second web service interface being accessible by the service integration module. The second web service interface 168 as depicted in FIGS. 7b and 8 is an interface for exchanging data based on any kind of web service protocol with the exception of e-mails. The purpose of FIGS. 7b and 8 is to illustrate embodiments of the invention wherein the service integration modules communicates with the remote trip sharing service (submitting service request, receiving results) and integrate the result into the electronic calendar of a calendar application, thereby updating the electronic calendar. In case the service returns its result to the client via an e-mail, the service integration module is solely involved in specifying and submitting the service request, not in updating the calendar. Said situation and embodiment of the invention is depicted and described in FIG. 8, wherein the second interface 240 is an e-mail interface and the result is returned in the form of a meeting request directly to the calendar application.

According to embodiments of the invention depicted in FIG. 7b, two different web service interfaces for receiving a service request and for returning the result are used by the service, depending on the service integration component, the service and the communication technology which can be assumed to be available to the client in situations in which the service is usually called.

The submission of the service request to the first web service interface 154 and the receipt of the result by the service via the second interface 168 can be synchronous or asynchronous.

FIG. 8 illustrates a further embodiment of the invention according to which a trip sharing service 156 is called by a service integration module 157 as described for the embodiment depicted in FIG. 7b. The embodiment depicted in FIG. 8 differs from the embodiment depicted in FIG. 7b in that the result is returned via an e-mail interface 240 in the form of a meeting request (MR) e-mail from the service to the client. The MR e-mail is sent to the e-mail address 241 of the user of the calendar application 152, the user being the same user who submitted the service request directly or indirectly (manual specification of a service request or automatic/semi-automatic submission of a service request by the service integration module started by the user). According to a further embodiment of the invention, the e-mail address and the instruction to return the result via the e-mail interface have been specified in the service request submitted in step 159. According to a further embodiment of the invention, the service request comprises information enabling the trip sharing service 156 to map a user profile to the service request and to send the result via the preferred communication interface as specified in the settings of the user's profile. The embodiment of the invention depicted in FIG. 8 requires the service integration module 157 solely for submitting the service request. The service integration component is not required for receiving the result and for creating and writing new events to the electronic calendar 153, because these tasks are executed by the calendar application 152 in steps 242 and 243. The calendar application is operable to send and receive e-mails via the e-mail address 241 of a user of the calendar application. As the result is returned in step 166 via a meeting request e-mail directed to the e-mail address of a user of the calendar application, the creation of a new event corresponding to the meeting request e-mail is executed by the calendar application upon receipt of the meeting request e-mail.

According to a further embodiment of the invention, the service integration module comprises a graphical user interface (GUI) facilitating the entry and specification of a service request. For example, a plug-in integrating the trip sharing service into the calendar application Microsoft Outlook could provide the user with means to specify trip sharing service request interpretable by the service. The user is provided with means to specify planned trips by the service integration module. GUI elements specially adapted to facilitate the entry of data for specifying a trip could, for example, comprise a popup window resembling a small calendar for selecting dates and being displayed upon setting the mouse cursor on an input field regarding the starting time and date of the planned trip.

According to a further embodiment, a service integration module integrating a remote trip sharing service provides the user with means to conveniently specify his trip sharing preferences, e.g. his driver/passenger preferences. Said service integration module may display graphical elements like drop down lists and checkboxes facilitating the specification of service requests for a particular trip via a particular route.

A particular advantage of the service integration module is its ability to integrate a service to a calendar application by submitting one or multiple service requests to a remote service. In case the result generated by the service is not returned via a meeting request e-mail directly to the calendar application, but via the first 154 or a second interface accessible to the service integration module, the service integration module may in addition receive and process the result, specify one or multiple events and write the events into the electronic calendar of the calendar application. In addition, the service integration module may provide features such as an implicit required event prediction or the provision of a GUI facilitating the entry of a service request by the user.

FIG. 9a depicts the integration of a trip sharing service 106 into calendar application 102 according to one embodiment of the invention. The embodiment of the invention depicted in FIG. 9a makes use of the 'default updating strategy' comprising the updating of the organizer's calendar via a first MRR e-mail (MRR1), in reply to a first MR e-mail (MR1) and a second MR e-mail (MR2).

The calendar application 102 is installed on a client device 100, e.g. a computer, mobile phone or other processing device. The calendar application is operable to send and receive e-mails via the e-mail address 124 of a user of the calendar application. The client is operable to permanently or temporarily connect to a network 117, e.g. the Internet or the intranet of a company. The calendar application comprises an electronic calendar 108 containing events, e.g. event 112. Event specification 114 comprises data characterizing event 112, e.g. date and time of the begin and end of the event, the event location and additional information, e.g. on the type of the event (meeting, telephone conference, a trip) or the list of invited participants. The server 104 hosts the trip sharing service 106, the service being represented by its service e-mail address 126.

In the following paragraphs, the integration of trip sharing service 106 into the calendar application 102 will be described, the integration providing an update of the electronic calendar via a first MRR e-mail (MRR1) and a second MR e-mail (MR2).

At first, a meeting request e-mail MR1 is specified 116 by a user (meeting organizer) of the calendar application 102 or by a calendar implementation dependent software component 314 having read and write access to the calendar application. The process of specifying a meeting request e-mail automatically by software component 314 is described in detail in the paragraphs describing the embodiment of the invention depicted in FIG. 10. The specification 116 comprises the steps of specifying meeting request e-mail text fields required by the called service(s), e.g. the location, starting time and arrival time, subject and text body field of the meeting request. Step 116 also comprises specifying the service e-mail address(es) to be used as input for the recipients field. FIGS. 9a and 9b illustrate the case of calling the trip sharing service 106 which is represented by the service email address 126. According to other embodiments of the invention, the recipients field of the meeting request e-mail may also contain multiple service e-mail addresses.

After specifying 116 the first MR e-mail MR1, in the next step 118 a service request SR is submitted in the form of a meeting request e-mail MR1 and is sent from the sender address user_1@calendar_1.com 124 to the service e-mail address of trip sharing service 106, service_1@domain_1.com 126. According to a preferred embodiment of the invention, the e-mail is transferred over an SMTP server (not shown). Server 104 monitors the mailbox corresponding to the service e-mail address 126 for incoming meeting request e-mails, which are also referred to as service requests (SR). After receiving the service request sent to 126, the server initiates the trip sharing service 106.

The trip sharing service 106 reads and processes 128 the data contained in all or in some of the fields of the meeting request e-mail MR1, the type of the read and evaluated e-mail fields being dependent on the service. The extracted data is used as input for the service. The service according to the depicted embodiment supports the 'default updating strategy' applicable for most current calendar applications. The service creates 138 and specifies a first MRR e-mail (MRR1) in response to the first MR e-mail (MR1). The MRR1 e-mail comprises only limited options for updating the organizer's calendar application. MRR1 is sent to the e-mail address 124. Upon receipt 120 of the MRR1 e-mail by the calendar application, the event 112 corresponding to the first MR e-mail MR1 is updated regarding the status of the service request (accepted/declined). The service may e.g. flag the MRR1 with 'accepted' in case the service is operable to process the service request, or flag the MRR1 e-mail with 'rejected' in case the request cannot be processed, e.g. because of a network error or because the input provided with MR1 does not meet the requirements of the service. The trip sharing service 106 processes the data contained in the MR1 e-mail and executes 130 the service. The execution 130 of the service is decoupled (asynchronous) from the submission of the MRR1 e-mail. Step 130 may be executed immediately after sending the MRR1 e-mail or after a predefined period of time. The service may also be executed 130 repeatedly on a regular basis until a certain condition is fulfilled or may be triggered by any other event. Which kind of trigger is used by the service for its execution depends on the service. The execution 130 may involve the calling of one or more second order services (not shown) or the reading and/or writing of data from or to various storage media, e.g. a database. Depending on the results of step 130, a second meeting request MR2 is created and specified by the service which is finally sent 110 as a result to the e-mail address 124 of the user. After receiving 132 the second MR email MR2 by the calendar application 102, a second event 134 is created according to the specifications of MR2, the specifications (time, location, subject, additional data within the text body) being the result of the execution 130 of the service. The user of the calendar application may confirm or decline 142 MR2 by submitting a second MRR e-mail MRR2 to the service. After receiving 140 MRR2, the server may execute additional processing steps depending on the acceptance status of MRR2 and on the implementation of the trip sharing service 106.

For example, if the service request submitted to the trip sharing service resulted in a match and a successful allocation of trip accompanies, the MRR1 email may have been marked by the service with the status 'accepted' resulting in the event 112 being flagged in the electronic calendar as 'confirmed'. The MR2 e-mail leading to the creation of a second event 134 in the electronic calendar may comprise a different starting and arrival time than event 112, in case e.g. the trip accompany preferred an earlier arrival time as specified in event 112 and MR1. The starting time of the MR2 e-mail is according to this use case scenario the actual departure time of the trip and the arrival time is the arrival time according to the arranged trip data object. The MR2 e-mail may also comprise additional information regarding the allocated trip accompany, information on the route, the pick-up place in case the allocated trip accompany is the passenger and the like. This additional data is contained in the second event 134 created by the calendar application upon receipt 132 of MRR2. In case there service request did not yield a match or a successful allocation of a user, the trip sharing service could have returned a decline via MRR1.

In case the calendar application supports the 'advanced updating strategy' (FIG. 9b), the MRR1 e-mail would have been created after the execution 130 of the trip sharing service 106. Depending on the service, MRR1 may have been created only after a successful completion of the service yielding a particular kind of result. The MRR1 e-mail would comprise the results of the execution of the service and could differ regarding its specifications (starting time, arrival time, location) from the specifications of MR1. As the calendar application 102 according to this scenario is able to update the calendar event 112 automatically, the additional information generated by the service would be added to event 112 automatically and the specification of event 112 would have been replaced in the update step by the event specifications (e.g. starting and arrival time, location) of MRR1. In this case, the creation and submission 110 of a second MR e-mail is not required and no second event 134 is created.

FIG. 10 illustrates a computer readable storage medium 322 according to a further embodiment of the invention, the storage medium comprising instructions for a processor for executing a calendar application 152 and a service integration module 157. The service integration module in operation has read and write access to the data contained in the electronic calendar 153 of the calendar application. The service integration module is operable to submit a service request to a first web service interface of at least one service. The implementation of the service integration module depends on the operating system and on the type of the calendar application 152 installed on the client 150 (Microsoft Outlook, Lotus Notes, Blackberry calendar). The service integration module 157 can be implemented as 'plug-in' or 'add-in' for the calendar application or the groupware server of the calendar application. It can also be implemented as an independent service program being registered as event listener with a calendar event of the calendar application or with an event of the groupware server of the calendar application. The service integration module can also be implemented as an independent service program searching the calendar application or the groupware server of the calendar application for new calendar entries and updating the calendar on a regular basis.

The service integration module 157 in operation analyzes in step 339 the events contained in the electronic calendar 153 in order to predict events or service request necessary or useful for organizing the events in the real world represented by the existing calendar event data objects. The begin of the analysis step 339 is triggered according to one embodiment of the invention by the entry of a new event by the user. Step 339 can also be initiated and executed on a regular basis in predefined time intervals according to a further embodiment. In step 339, all events within a calendar or only a subset of events may be evaluated. The subset of events to be evaluated can be determined e.g. by the temporal proximity of an event 336 to a newly entered event 337 or any other criteria depending on the implementation of the service integration module 157.

According to a further embodiment of the invention, all events of the electronic calendar being in temporal proximity to a newly entered event 337 are used by the service integration module 157 for the prediction of required trip events. If, for example, event 336 is a business meeting in the office of an employee at 9.00 a.m. already existing within the calendar application and the newly entered event 337 is a business meeting in another town at 4 p.m., then the service integration module 157 predicts in step 332 that a trip is required in order to get from the office to the meeting in the other town in time. The service integration module 157 may execute several additional computation tasks depending on the implementation of 157. For example, the service integration module 157 could comprise the functionality of mapping tags contained in the location or text body fields of events to unequivocal addresses. If the meeting locations have been entered in the electronic calendar in the form of ambiguous names, e.g. 'Mike' or 'Mr. Miller', these location tags are replaced by their respective unequivocal addresses. The mapping of route tags to routes is also supported. In addition, or alternatively, the unequivocal addresses of the first and the second meeting place may be used by service integration module 157 to predict the best route, predict the route with the shortest travel time and to suggest a starting time corresponding to the specified route. The prediction of the best route may also depend on user specific settings if available to the service integration module 157. The arrival time of the first event and the starting time of the following event may determine the earliest acceptable starting time and the latest acceptable arrival time for the planned trip. Those settings may comprise data on the driver/passenger preferences of the user registered for the trip sharing service. In step 333, additional data which may be required by the trip sharing service for processing the service request is assigned to the predicted required event. In step 334, the service integration module 157 submits a service request 335 to the first web service interface of a trip sharing service assisting in organizing the trip, the request comprising the start and arrival time of the predicted required event. The request may comprise additional data provided by the service integration module 157.

According to one embodiment of the invention, the service integration module 157 in step 334 automatically initiates the submission of a service request to the first web service interface of the service.

Depending on the implementation of the service integration module and the prediction result, step 332 may also comprise the prediction of multiple required events of different types. For example, service integration module 157 could have predicted the required event of a trip to get from one appointment to the next appointment, and could have in addition predicted the requirement of ordering a business gift for a particular meeting participant in time resulting in the submission of one service request to a trip sharing service to organize the trip and the submission of a second service request to a vendor of business gifts.

According to a further embodiment of the invention, the predicted required events are presented to the user of the calendar application before submission, they are not used to automatically specify and submit service requests to the services. The user has the option to check if he really wants to submit the predicted required service request, e.g. to the trip sharing service. In case the user accepts the prediction of the service integration module 157 and marks a predicted required event accordingly, the corresponding service request(s) are submitted to one or multiple services. This embodiment of the invention is particular beneficial if the predicted required events and actions often vary depending on multiple additional factors and an automatic service request may therefore be inappropriate. In case the user feels ill and does not know in advance if he will be able to join a meeting scheduled in the following week, the user in this case has the option to delay his approval to the submission of the service requests until he is sure to be able to join the meeting and to make use of the trip sharing service.

According to a further embodiment of the invention, the service integration module 157 is used to predict required trip events and to submit corresponding service requests to a trip sharing service. The service integration module 157 predicts required trip events to get from one appointment to the next. The service integration module analyzes all events 336 being in temporal proximity to a particular event 337, e.g. an event that has just been added to the calendar application. The analysis according to one embodiment of the invention is initiated by the entry of the new event 337, but according to other embodiments, the analysis could be triggered by other events or be executed on a regular basis.

According to a typical use case scenario, a supplier of a remote service provides the service integration module 157 in the form of a downloadable service integration module 157, e.g. a downloadable plug-in, developed for a particular calendar application, e.g. Microsoft Outlook. After installation on the client machine, the plug-in in operation is capable to analyze the calendar application, to predict required events and actions and to send corresponding service requests to the service. The service providing the downloadable plug-in may also provide means for entering user profile data or any other additional data to the plug-in, this data being used as additional information submitted in the service requests.

The service integration module 157 may have access to the user's profile data via accessing an online service related to the service integration module 157 or via the user entering his profile data to the service integration module 157 manually. This user profile data, if available, and context data of the analyzed events (e.g. time and location) is used in the analyzing step 339 to determine required trip events to get from the first meeting event to the next.

The existing event 336 in the calendar may be a telephone conference on Monday, 9 a.m., having associated the location tag 'Work'. The second event may be a business meeting on 3 p.m. on the same day being assigned the location tag 'Dr. Millor Ltd.'. The plug-in predicts a required trip event to get from the employee's home to his office, the trip having an arrival time several minutes before the telephone conference starts. The time security margin can be specified by the user in the user profile, e.g. 15 minutes. In this case, the service integration module 157 will predict a required trip event from home to the employee's office with an arrival time 8.45 a.m. (15 minutes earlier than 9 a.m.). The predicted departure time is the earliest departure time acceptable for the user while the arrival time is the latest arrival time acceptable for the user. The latest acceptable arrival time can be calculated by considering the starting time of a meeting in combination with a time margin specified e.g. in the user's profile data ensuring the user does not arrive late at a meeting. The predicted starting and arrival time therefore specify a time window within which the user is willing to travel. The service integration module may in addition predict further trip events required during the office day, e.g. in order to get from the office to the meeting scheduled at 3 p.m. in another town, or predict trip events required for spare time activities, e.g. to travel from the office to a movie theater. The prediction comprises the following steps:

1. Determine the earliest acceptable starting time, the place of departure, the destination location and the latest acceptable arrival time based upon the event specifications in the electronic calendar. The earliest acceptable starting time may be the arrival time of the first meeting, e.g. 10 a.m. The place of departure is the office of the user. The destination location is the address of the meeting starting at 3 p.m. The latest acceptable arrival time is the starting time of the meeting at 3 p.m.
2. The predicted required trip events may now be submitted automatically to the trip sharing service via a service request created by the service integration module 157 to the interface of the trip sharing service. If the user has specified that the predicted required trip events should not be submitted to the corresponding service automatically, the predicted trips are collected in a first list of predicted trip data objects. This list is then presented to the user. The user may check the predicted trip data objects for correctness of the prediction and may also alter some properties of the predicted trips, e.g. the starting or arrival time. The user may also delete predicted trips. After checking and optionally editing the predicted trips, the specifications of the predicted trips are used by the service integration module 157 and submitted as service requests to the first web service interface of the trip sharing service. The user may at any time deactivate the manual approval step and switch to automatic submission of the predicted required trip events as service request to the trip sharing service if the quality of the predictions is sufficient.
3. The service request is then processed by the remote trip sharing service as described beforehand.
4. In case the trip sharing service was able to detect one or multiple user profiles matching the submitted service request, the user receives a result. The result is received by the service integration module via the same or a different web service interface or is received by the calendar application in the form of a meeting request e-mail. The user receiving the result may contact one or multiple potential trip accompanies with the help of the contact data being also contained in the result returned by the trip sharing service.

According to further embodiments of the invention, the service integration module is operable to write predicted required events as predicted trip event objects into the first list of trip data objects of a trip manager program installed on the same client device.

FIG. 11a depicts the system architecture of a trip sharing service 450 according to a further embodiment of the invention, the trip sharing service being called by an event managing service 473. The embodiment of the invention according to which a trip sharing service is integrated into calendar application of is particularly beneficial in situations in which multiple users, here also referred to as customers, intend to travel to the same event. In this case, the chance is high that an appropriate driver or passenger participating in the same event can be found via a trip sharing service. According to the embodiment of the invention depicted in FIG. 11a, the execution of the trip sharing service is triggered by another service, an event managing service 473. A service request 447 is submitted to a first web service interface 472 (in this case a W3C web service interface) while the result is returned via a meeting request e-mail 459 to the calendar application of the user.

An event managing service 473 is installed on a remote server 446. The event managing service offers its customers via an interface, e.g. an Http interface, tickets for concerts and sports events. The Http interface 454 is an Html page hosted on the server 446 which is accessible via the World Wide Web by the customers of the event managing service. The Html page comprises an Html form which upon submission triggers the execution of the event managing service 473. The execution of the event managing service may result in the reservation or ordering of a concert ticket for a particular customer. The Http page is presented to the customer of the event managing service in the form of an Html based graphical user interface 441 by a browser installed on the client processing device 440. The client processing device, e.g. a notebook or desktop PC of the customer, is connected to the server 446 via a network, e.g. the Internet. In operation, the customer opens the Html page provided by the event managing service 473 via the browser installed on the customer's processing device 440. The customer selects the event he wants to take part in, in this case, a concert 442. The graphical user interface 441 provides the user with the option 444 o select 'travel via trip sharing service'. The option can be provided for example in the form of a checkbox or radio button. After the user presses the Html button 443, an Http request is transmitted via the network to the Http interface of the event managing service 473. The event managing service processes the request according to its particular implementation.

In case the customer selected the option 444 to travel to the concert with the assistance of the trip sharing service, the event managing service 473 submits a service request 447 to the W3C web service interface of the trip sharing service 450 hosted on the trip sharing backend server 471. The service request 447 comprises at least the information of the starting time and location of the event booked by the customer. The starting time and location of the concert represent the destination location and latest acceptable arrival time. The service request 447 may in addition comprise information on the place of departure, e.g. the home or office address of the customer, which could be specified by the user via additional GUI elements on the GUI 441. The architecture of the trip sharing service 450 is depicted and explained in greater detail in FIGS. 11*a* and 11*b*. The trip sharing service 450 processes the service request 447 and tries to find other persons traveling at the same or a similar time to the same event like the customer ordering the ticket for the concert 442. In case at least one person having similar travel plans and congruent driving preferences, e.g. driver/passenger preferences, a result is returned to the customer ordering the concert ticket via a meeting request e-mail 459. The sending of the result is executed via a second server belonging to the trip sharing service, the trip sharing message server 470. The trip sharing message server comprises multiple interfaces and corresponding adapters, e.g. an e-mail interface 464 and an e-mail adapter 466, an SMS interface 463 and a corresponding SMS adapter 467. According to further embodiments of the invention, it is also possible that some interface/adapter pairs are hosted on a third server, e.g. in order to raise the performance of the system.

Each adapter software module 466-469 is operable to receive a result generated by the trip sharing service 450. The result is processed and formatted according to the requirements of the communication protocol used to forward the result to the client. The formatted result is then forwarded from the adapter module to its corresponding interface. For example, the result received by the SMS adapter 467 would be processed and formatted according to the requirements of an exchange of data based on SMS technology. The data would then be forwarded to the corresponding SMS interface 463, the interface 463 submitting an SMS to the mobile phone number of the customer. The data exchange between the interfaces 462-465 and their corresponding adapter modules is illustrated with double arrows. The result generated by the trip sharing service 450 can be returned 458 via many different communication technologies (SMS, W3C web services, e-mail), because the result can be is transformed with the help of an appropriate adapter software module according to the data exchange format used to forward the result to the user/the client device 440. While the adapter components comprise program routines for data exchange with the trip sharing service 450 hosted on the trip sharing backend server 471, the interfaces 462-465 and the W3C web service interface 472 can be used for the data exchange with a client device 440.

According to the embodiment depicted in FIG. 11*a*, the service request 447 may comprise the additional information that the result generated by the trip sharing service is to be returned to the customer via a meeting request e-mail. This information could also be contained in the user profile data of the customer available to the trip sharing service 450. In case the trip sharing service 450 was able to detect an appropriate trip accompany, the result 458 is returned to the e-mail adapter 466 hosted on the trip sharing message server 470. The data contained in the result 458 is extracted and used by the e-mail adapter 466 to specify a meeting request e-mail. The e-mail is returned via the e-mail interface 464 to the e-mail address 455 of the customer. The information on the customer's e-mail address 455 may, for example, be submitted as part of the service request 447.

Depending on the customer's preferences and on the type of the client device 440, the trip sharing service result could alternatively have been delivered to the customer via SMS or a W3C web service interface, the result being formatted according to the selected interface by the corresponding adapter.

According to a further embodiment of the invention, the user can specify, e.g. in his user profile, that the result generated by the called service shall be returned via different second interfaces depending on the time span that is left between the generation of the result (a trip event associated with at least one matching user profile) and the begin of the trip event. For example, the user can specify to receive the result via an e-mail interface one day before the trip starts. In addition, or alternatively, the user can specify that the server should return the result per SMS one hour before the trip starts.

According to a further embodiment of the invention, the trip sharing service 450 comprises a registry. The registry is a data structure mapping a particular service request of a client to a particular adapter module 466-469. The registry in addition comprises information required to send the result to the client according to the preferred interface, e.g. a mobile phone number for the SMS adapter or an email address for the e-mail adapter. Upon receipt of a service request by the service 450, the service is mapped to a particular adapter module by specifying a new entry in the registry connecting the request with a preferred adapter module. After the service 450 has finished processing the service request, the generated result is returned via push technology to the adapter module mapped to the service request. The adapter module hosted on the trip sharing message server receives the result, generates a message according to the communication technology supported by the adapter module and forwards the result to its corresponding interface. The interface returns the result to the client, e.g. via an SMS or an e-mail.

Figure 11B:
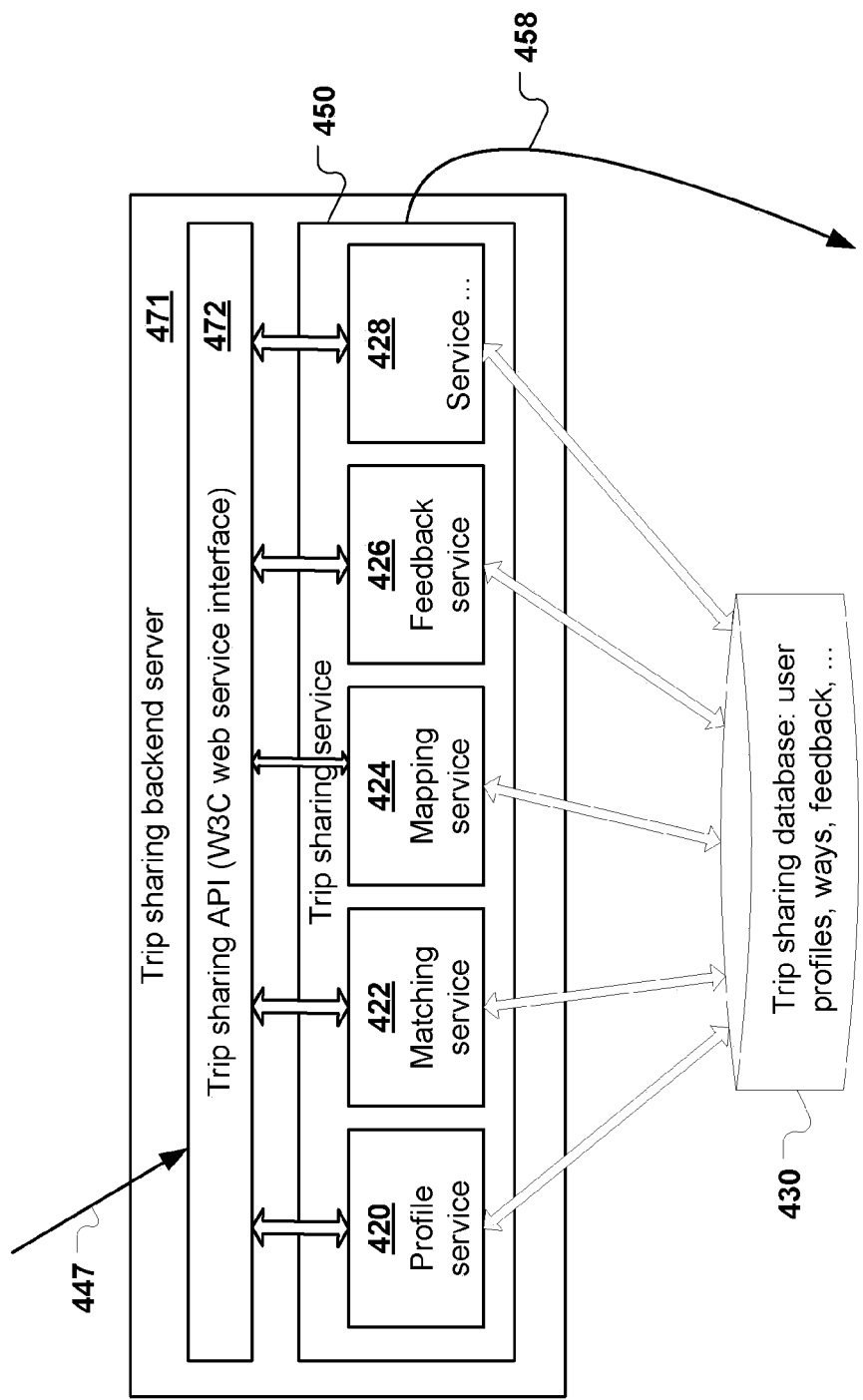
FIG. 11b illustrates the trip sharing service hosted on a trip sharing backend server in greater detail.

FIG. 11*b* depicts the architecture of the trip sharing service 450 hosted on the trip sharing backend server 471 in greater detail. The trip sharing service comprises multiple service modules 420-428, the backend server being accessible via a trip sharing W3C web service API 472. The services 420-428 have access to a trip sharing database 430 comprising user profiles, ways, feedback information provided by trip sharing service users and other trip sharing related information.

A service request 447 is sent to the trip sharing service 450 via the service's W3C web service interface 472. The service request may be received directly from a client device 440, a server 446 hosting a different service or from the trip service messaging server receiving a service request from a client e.g. via its e-mail interface or SMS interface (not shown). The service request comprises departure and arrival time of the trip, starting point and destination location and may also comprise additional parameters, e.g. tag mapping information. The service request 447 may, for example, be specified by the user of the calendar application 152 manually via a service specific plug-in providing a GUI or may have been submitted (semi-) automatically upon prediction of a required trip event by a service integration module 157 (not shown) or via a remote required event prediction service (not shown). The service request 447 comprises the starting time and location of an event, e.g. the concert booked by the customer. The service request also contains the e-mail address of the customer 455. The location may be encoded as complete and unequivocal address or as user specific tag which can be mapped to an unequivocal address by the service 450. The service request in addition contains information on the location from which the customer plans to start his trip to the concert.

All relevant information is extracted from the service request 447. At first, a profile service is invoked for assigning a user profile to the service request. The profile service has access to the database 430 comprising, among other data, also user profiles. A user profile 561 may comprise multiple attributes, e.g. the real name of the user 556, his date of birth 557, his e-mail address 558, and may also comprise mapping information 559 and additional parameters 560 specifying e.g. driver/passenger preferences of the user.

Figure 12:
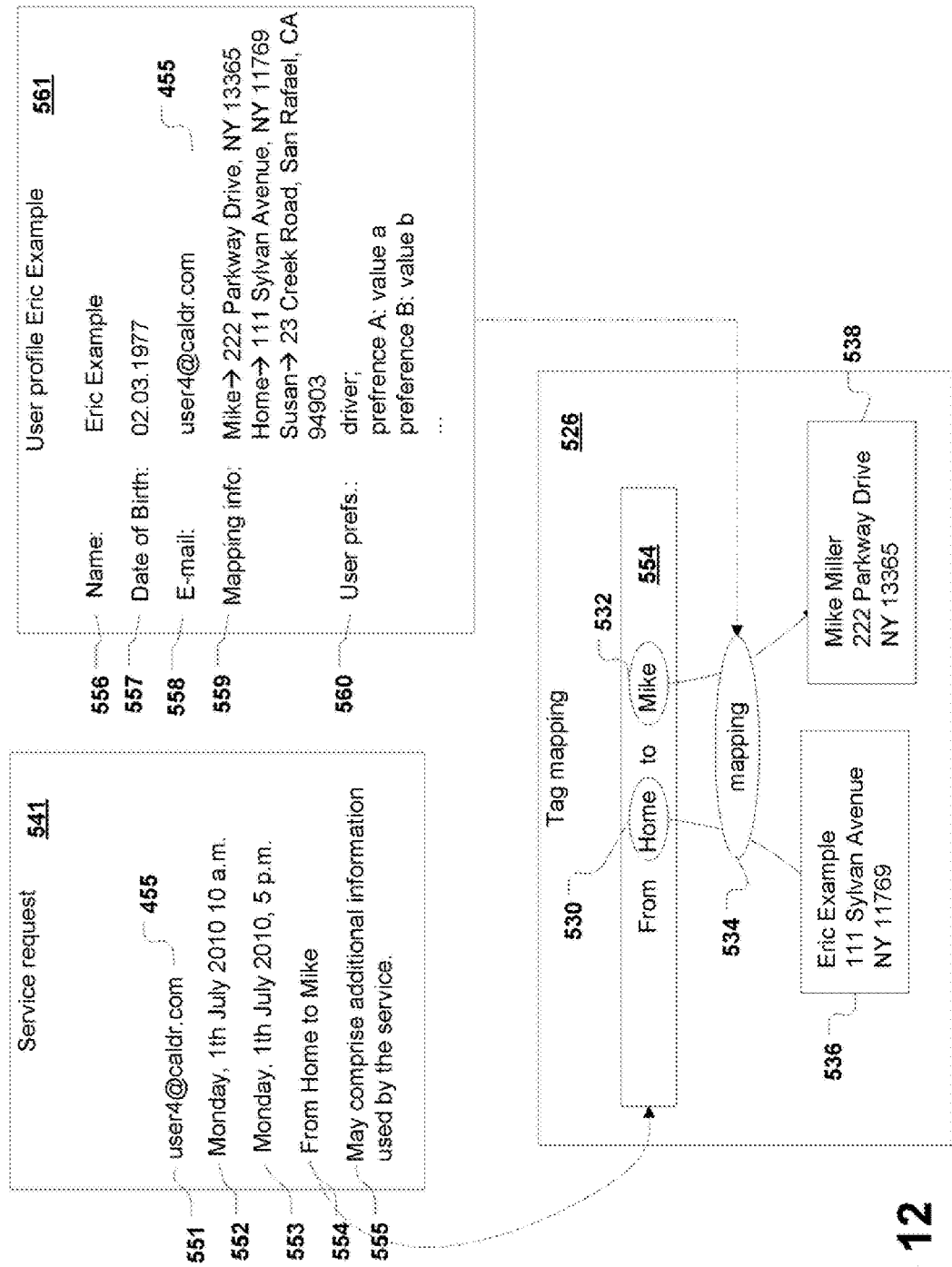
FIG. 12 depicts the mapping of tags contained within a service request to unequivocal addresses as specified in a user profile.

The profile service 420 searches for the user profile stored in the database 430. The search concentrates on the e-mail address attribute 558 of the user profile in order to map a user profile to the service request based on identity of the e-mail address of the user profile 558 and the customer's e-mail address 551 specified in the service request. The data contained in a service request sent to the trip sharing service and the data contained in each user profile according to one embodiment of the invention is illustrated in detail in FIG. 12. If an appropriate user profile 561 was found by the profile service, mapping information 559 contained in this user profile is retrieved and used during the execution of the mapping service 424. The mapping service maps ambiguous tags 530, 532 within the service request to unequivocal addresses 536, 538 (FIG. 12). There exist generally available tags, e.g. 'Home' or 'Work', but also user-specific tags, e.g. 'Mike' or 'Supermarket'. These tags are automatically replaced by user specific, complete addresses as specified in the mapping schema 559 of the user profile. The two addresses 536 and 538 define the starting point and destination location of the trip. In addition, external services such as Google Maps may be used to derive the of those addresses or to derive street maps depicting the route of the shared trip.

According to a further embodiment of the invention, the service request 447 may comprise additional mapping information 555 overwriting the tag mapping schema 559 of the user profile. For example, the tag 'Work' may be mapped according to the specification in a user's profile to a particular address. Three days in a year the employee works in a different dependence of his company. Instead of changing the mapping information of his user profile, the employee during those three days may simply add additional mapping information to his service requests sent to the trip sharing service, the additional information mapping 'Work' to a different address. The additional mapping information could, for example, be submitted via the GUI of a service integration module for the trip sharing service installed on the client machine. After retrieving the unequivocal addresses for the location tags, a route is calculated to get by car from the starting point to the destination location. According to a further embodiment of the invention, the route calculation may be executed by a third party service, e.g. Google maps. The route can be used by the service to calculate the time the trip via the predicted route will probably take.

After the execution 534 of the mapping service 424, a matching service 422 is executed. Based on the calculated route and additional parameters contained in the user's profile or the service request 541, the mapping service of the trip sharing service searches for users having associated preferences being congruent with the preferences specified in the service request 541 and the sender's user profile 561 and who plan to travel the same route or a part of the same route within the time window defined by the starting time (the earliest acceptable starting time for the user) and the arrival time (the latest acceptable arrival time for the user) as specified in service request 541. In addition, the matching service checks if the profile of the user submitting the service request 541 and the profile of a potential trip accompany match regarding their trip specifications and preferences 560, e.g. regarding their driver/passenger preferences. In case one or multiple matching user profiles are detected in the database 430, the best matching profiles are assigned automatically to the trip. The result comprising the best matching user profiles is sent according to the depicted use case scenario via a second order service request 458 to the e-mail adapter component hosted on the trip sharing message server 470. The Email adapter 466 creates a meeting request e-mail with the e-mail address of the customer in the recipients field. The MR e-mail is sent to the customers e-mail address 455 by the E-mail interface 464, resulting in an update of the electronic calendar of the customer. The updated calendar comprises a new trip event characterized by a starting and arrival time, the location of the concert and user profile data of one or multiple matching trip accompanies.

According to a further embodiment of the invention, the user profile database of the trip sharing service is operable to be populated via an automatic import of user profiles of various social networks, e.g. Facebook, via an import of lists of employee profiles of a company, via an import of LDAP directories or an import of user profiles stored according to any other data format. The import is executed by software modules being operable to read the user profiles from a source data repository and to store them to the user profile database 430 of the trip sharing service. This feature is advantageous, as the user specific settings used in the matching procedure of the trip sharing service may comprise the option for a preferential matching of users being member of the same social network or company. If a company uses the trip sharing service to reduce expenses, preferentially employees from the same company will be matched by the matching service 422. Only in case there are car seats left which cannot be assigned to employees of the same company, persons outside the company may be accepted by the matching service in this scenario.

FIG. 12 depicts the data comprised in a service request 541 sent to the trip sharing service according to one embodiment of the invention. In addition, the figure depicts data that is comprised by a user profile 561 of the trip sharing service and illustrates how this data can be used by the trip sharing service for tag mapping 526. The service request and user profile data of other embodiments of the invention may comprise data on another set of features. The service request 541 according to one embodiment of the invention comprises the e-mail address 551 of the user submitting the service request (455). The service request in addition contains the earliest acceptable starting time 552 of the user and the latest acceptable arrival time 553. The request in addition comprises a human and machine-readable set of terms 554 used by the service to determine the place of departure and the destination location. The service request may in addition comprise further data, e.g. user preferences overwriting user preferences specified in the user profile solely for the execution of this particular service request 541. The user profile 561 comprises the name 556 of the user, the date of birth 557, the user's e-mail address 558, tag mapping information 559 and user specific preferences 560. In the preferences, the user may specify e.g. his driver/passenger preferences.

In operation, the trip sharing service allocates a user profile 561 and the data contained therein to a service request 541, e.g. via the user's e-mail address 455 being specified in the service request as well as in the user profile. The mapping of a user profile to a service request enables the mapping of user specific ambiguous location tags such as 'Home' 530 or 'Mike' 532 to unequivocal addresses 536 and 538 according to the tag mapping information 559 of the user profile.

FIG. 13 depicts sets of possible end user devices having installed a calendar application and being able to call the trip sharing service 450 hosted on the trip sharing backend server directly or indirectly via multiple interfaces according to one embodiment of the invention. Possible client devices comprise, but are not limited to, mobile phones 704, processing devices such as notebooks 703, desktop PCs 705 or third party servers 706, navigation devices 707 or smart phones 702. The navigation device 707 may be a mobile phone having installed a calendar application and in addition comprising a software component providing GPS based navigation assistance. The client devices, provided they are able to communicate via a W3C web service interface, can submit service requests to the W3C web service API 472 of the trip sharing service hosted on the trip sharing backend server 471 directly and process the result returned by this interface 472. In said use case scenario, the interface for submitting the service request and for receiving the result is the same. The submission of the service request to the first web service interface and the receipt of the response via the first or a second web service interface can be implemented as synchronous or asynchronous data exchange.

According to a further embodiment of the invention, the service request may be sent at first to an interface hosted on the trip sharing message server 470 or the trip sharing web server 701. The trip sharing web server 701 hosting an Http interface 462 and an Http adapter 468 fulfils an equivalent function like the trip sharing message server 470 hosting adapters and interfaces supporting the data exchange between the backend server and the client via other communication technologies, e.g. SMS or e-mail. Not every client device 702-707 may be able to communicate via all communication interfaces 462-465, 472 provided by the trip sharing service.

The trip sharing service hosted on server 471 can be integrated into a calendar application running on any of the user devices 702-707 by installing a service integration module 157 on any of those devices, the module 157 being operable to submit a service request to at least one of the interfaces 462-465, 472 for accessing the trip sharing service.

Some exemplary and in no way limiting use case scenarios are:

A service request is submitted from a service integration module installed on notebook 703 to interface 472. In case a matching trip accompany was found and could be allocated successfully to the user by the trip sharing service 450, the result is returned via the same interface 472 to the service integration module 157. The service integration module 157 creates or modifies a corresponding event in the calendar.

A service request is submitted from a service integration module installed on notebook 703 to interface 472. According to the settings of the user's profile available to the trip sharing service, the user prefers to receive the result of the service via e-mail. In case a matching trip accompany was found and could be allocated successfully to the user by the service 450, the result is returned to the e-mail adapter 466 hosted on the trip sharing message server 470. The e-mail adapter 466 creates a meeting request email which is sent to the calendar application installed on the client 703. In the calendar application, an event corresponding to the result generated by the trip sharing server is created.

A service request is submitted from a service integration module installed on a mobile phone 704 to interface 463 via an SMS. According to the settings of the user's profile available to the trip sharing service, the user prefers to receive the result of the service via e-mail. In case a matching trip accompany was found and could be allocated successfully to the user by the service, the result is returned to the e-mail adapter 466 hosted on the trip sharing message server 470. The e-mail adapter 466 creates a meeting request e-mail which is sent to the calendar application installed on the client 703 via the e-mail interface 464. In the calendar application, an event corresponding to the result generated by the trip sharing server is created.

A web site comprising a graphical user interface is provided by the trip sharing web server 701. The user may specify a service request directed to the trip sharing service 450 via the submission of an Html form filled with user specific data on a planned trip. The Http based service request is sent to the Http interface 462 hosted on the server 701. The Http interface creates a second order service request submitted to the W3C web service API 472 of the trip sharing backend server 471. According to the settings of the user's profile available to the trip sharing service, the user prefers to receive the result of the service via e-mail. In case a matching trip accompany was found and could be allocated successfully to the user by the service, the result is returned to the e-mail adapter 466 hosted on the trip sharing message server 470. The e-mail adapter 466 creates a meeting request e-mail which is sent to the calendar application installed on the client 703 via the e-mail interface 464. In the calendar application, an event corresponding to the result generated by the trip sharing server is created.

The features described with reference to particular embodiments can freely be combined depending on the requirements of a particular service to be integrated. The main purpose of the service integration module according to a preferred embodiment of the invention is to integrate a service into a calendar application. Additional benefits provided by the service integration module may comprise the automatic detection of required service requests or the facilitation of the entry and specification of a service request via a GUI. Features such as the mapping of tags to unequivocal addresses are highly beneficial in the context of services helping to organize trips but may be unnecessary in case a different service is integrated. Other service integration modules designed to integrate other services may therefore comprise other or additional program routines assisting in the seamless integration of service they are designed to help integrating.

The event being specified in the electronic calendar upon the receipt of a meeting request e-mail by the calendar application or upon the receipt of the service result by the service integration plug-in can be a singular or a recurring event. This statement holds true for each described embodiment of the invention.

Figure 14:
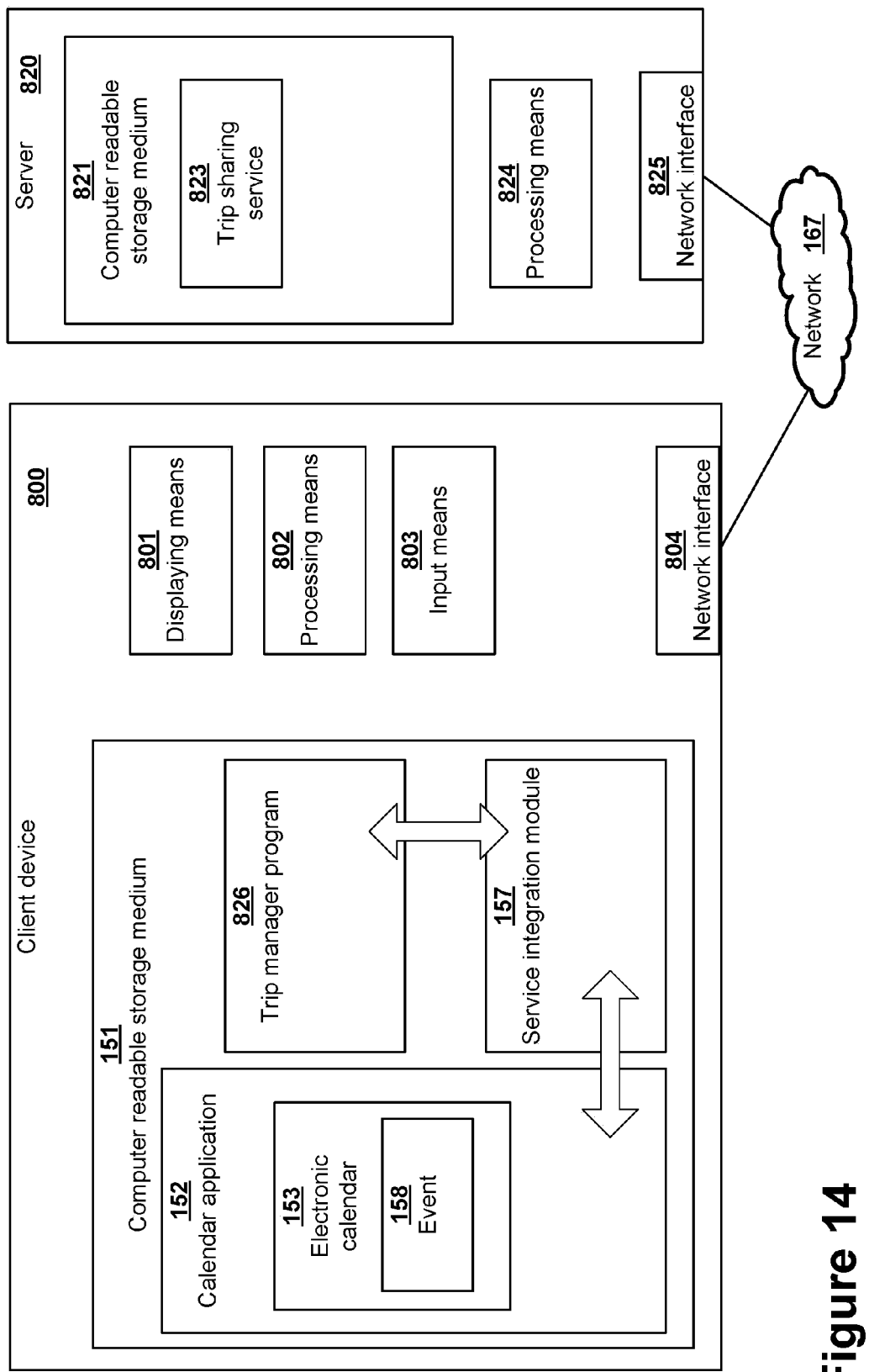
FIG. 14 depicts a client computer system comprising a storage with instructions for executing a calendar application and a service integration module.

FIG. 14 depicts a computer system according to one embodiment of the invention comprising a server 820 having installed a trip sharing service 823 on its computer readable storage medium 821. The trip sharing service can be executed by processing means 824, e.g. one or multiple processors. The system further comprises at least one client device 800. The client device can be embodies, for example, by any of the device types depicted in FIG. 13. The client device and the server each comprise a network interface 804, 825 to permanently or temporarily exchange data. The data exchange can be executed via a network 167, e.g. via the Internet or an intranet of a company. The data exchange may also comprise the transient connection to a network, e.g. a mobile phone network via satellite, to exchange SMS. The client device also comprises processing means 802 and a computer readable storage medium 151. The storage medium 151 comprises program instruction for executing a calendar application 152, a service integration module 157 and a trip manager program 826. The service integration module is interoperable with the calendar application. The computer system 800 further comprises displaying means 801, e.g. a CRT monitor, a TFT screen or a touch screen. The processing means are operable to interpret the program instructions stored to the computer readable storage medium 151, resulting in the execution of the calendar application and the service integration module. The system further comprises input means, e.g. a mouse, keyboard, a voice recognition interface or a touchscreen or touchpad. The input means receive input data provided by the user and forwards the data to the service integration module and the calendar application. The network interface 804 is operable to establish a network connection. The network interface can be an Ethernet card, a WLAN adapter, an adapter for exchanging information via a satellite or fiberglass, a mobile phone adapter for exchanging data e.g. via SMS or other technical means fulfilling equivalent functions and provide access to the Internet or enable the transmission of information to other mobile or immobile processing devices.

According to a further embodiment of the invention, the client device is a mobile processing device, for example a mobile phone, a smart phone, a blackberry, an iPhone, a notebook or a netbook comprising a mobile phone adapter or any equivalent mobile device. Said mobile processing device, also referred to as 'mobile device', comprises means to exchange data with other mobile or immobile processing devices. The means for exchanging data may be available permanently or temporarily. In operation, they provide access to the Internet or provide access to other data transfer technologies and systems. For example, the means for exchanging data can provide the mobile device with the function to exchange data with other processing devices via SMS, via instant messaging technology. The data exchange can be based on various different Protocols, for example Http, XMPP/Jabber and others.

The trip manager program 826 can be used to manage trips arranged by the trip sharing service 823 on the client side. The trip manager program provides the user of the client device with means to conveniently specify various types of trip data objects in a first or second trip data object list. While the first list of trip data objects comprises predicted trip data objects which are only stored on the client device and which are not fully specified or not guaranteed to take place yet. The predicted trip event can be specified by the user or can be predicted by the service integration module 157 being interoperable with the trip manager program. The service integration module according to the depicted embodiment has read and write access to the lists of trip data objects and creates a predicted trip data object in the first list in case the service integration module predicts a required trip based on the analysis of the electronic calendar of the calendar application 152. The user may alternatively specify a predicted or published trip data object manually via a graphical user interface provided by the trip manager program. In case a published trip data object is specified, a service request comprising the specifications of the published trip data objects is submitted to the server.

According to further embodiments, the functions provided by the service integration module and the trip manager program are implemented as one single piece of software.

A third list managed by the trip manager program comprises trips which have been arranged by the trip sharing service via a successfully executed matching method and an succeeding successful allocation of trip accompanies. The third list of arranged trip data objects is located on the client device of the user and second instance of the list is located on the server.

A fourth list comprises past trip events. The fourth list is stored in one copy on the computer readable storage device of the client and a further instance of the list is stored on the server. The list can assist the user in conveniently giving feedback information for a past event.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

ABBREVIATIONS

API Application Programming Interface
CalDAV Calendaring Extensions to WebDAVGPS Global Positioning System
LAN Local Area Network
LDAP Lightweight Directory Access Protocol
MR Meeting Request
MRR Meeting Request Response
UDDI Universal Description, Discovery and Integration
UR Update Request
SR Service Request
XMPP Extensible Messaging and Presence Protocol formerly named JabberW3C World Wide Web Consortium
WAN Wide Area Network
WebDAV Web-based Distributed Authoring and Versioning

LIST OF REFERENCE NUMERALS 100 client device
102 calendar application 104 server
106 trip sharing service
108 electronic calendar
110 step
112 event
114 event specification
116 step
117 network
118 step
120 step
124 user's e-mail address
126 service e-mail address
128 step
130 step
132 step
134 event (data object)
136 event specification
138 step
140 step
142 step
150 client device
151 computer readable storage medium
152 calendar application
153 electronic calendar
154 first web service interface
155 server
156 trip sharing service
157 service integration module
158 calendar event (data object)
159 step
160 step
161 step
162 step
163 step
164 step
165 step
166 step
167 network
168 web service interface (not an e-mail interface)
175 step
177 step
179 step
180 step
181 step
182 decision
183 step
184 trip accompany allocation process
185 matching method
186 decision
187 single loop of loop process
188 step
240 second web service interface being an e-mail interface
241 e-mail address of user of calendar application 152
242 step
243 step
250 step
251 step
252 step
253 step
254 step
255 end point successful allocation
330 computer readable storage medium
331 step
332 step
333 step
334 step
335 service request
336 event (data object)
337 new event (data object)
339 step
350 dimension n
351 dimension d1
352 dimension d2
353 vector v3
354 vector v2
355 vector v4
356 vector v1
357 angle
358 angle
430 trip sharing database
420 profile service
422 matching service
424 mapping service
426 feedback service
428 other service
440 client device
441 GUI
442 concert event
443 'Buy' button
444 checkbox
446 server
447 service request
450 trip sharing service
454 Http interface
456 calendar application
457 event (data object)
455 e-mail address of customer of event managing service 469
458 returned result
459 meeting request e-mail
462 http interface
463 SMS interface
464 e-mail interface
465 other interface
466 e-mail adapter
467 SMS adapter
468 Http adapter
469 other adapter
470 trip sharing message server
471 trip sharing backend server
472 W3C web service interface
473 event managing service
480 step
481 decision
482 step
483 step
484 step
485 step
486 decision
488 step
489 step
490 step
491 step
492 decision
493 decision
495 step
494 end point —no allocation
526 tag mapping process
530 location tag
532 location tag
534 tag mapping step
536 unequivocal address
538 unequivocal address
550 service request 551 e-mail address of user submitting service address
552 starting time
553 arrival time
554 sequence of terms optionally comprising tags
555 additional data
556 real name of user
557 date of birth
558 e-mail address of user
559 tag mapping information
560 user preferences
561 user profile
570 step
571 decision
572 step
573 step
574 step
575 step
576 decision
577 decision
579 step
581 end point—no allocation
582 decision
583 step
584 step
586 step
650 pick-up area
653 place of departure
654 pick-up place
655 drop-off area
656 destination
657 drop-off place
658 drop-off radius
659 S0 segment of pick-up area
660 S1 segment of pick-up area
661 S1 segment of pick-up area
662 S2 segment of pick-up area
663 S1 segment of drop-off area
664 S2 segment of drop-off area
665 S1 segment of drop-off area
666 S0 segment of drop-off area
701 trip sharing web server
702 smart phone
703 notebook
704 mobile phone
705 desktop computer
706 third party server
707 navigation device
800 client computer system
801 displaying means
802 processing means
803 input means
804 network interface
820 server
821 computer readable storage medium
823 trip sharing service
824 processing means
825 network interface

We claim:

1. A computer implemented method for allocating drivers and passengers sharing a trip, the method being executed by processing means configured to execute a trip sharing service, the method comprising:

receiving, by the trip sharing service, a first service request, the first service request being submitted from a first client device belonging to a first user, wherein the first service request comprises sufficient data to specify at least a starting time, a place of departure and a destination;

specifying, by the trip sharing service, a first potential trip data object by the trip sharing service, the specification being initiated upon receiving the first service request, the first potential trip data object being the result of processing the first service request, the specifications of the first potential trip data object comprising the starting time, an arrival time, the place of departure and the destination, the specifications of the first potential trip data object further comprising user related specifications;

executing, by the trip sharing service, a matching method, the matching method checking the first potential trip data object against at least a second potential trip data object, the second potential trip data object having been created by the trip sharing service upon receipt of a service request of a second user, the matching method comprising for each checking of the first against the second potential trip data objects the steps of:

comparing the specifications of the first potential trip data object with the specifications of the at least one second potential trip data object, determining the degree of congruency of the specifications of the compared potential trip data objects, assigning one role to the first and the second user, the role being taken from the group consisting of a driver role and a passenger role, wherein the assigned roles of the two users are distinct from each other and are determined upon comparison of at least the driver/passenger preferences specified in the first and in the second potential trip data object, wherein the user having been assigned the driver role is referred to as driver and the user having been assigned the passenger role is referred to as passenger, adding the second potential trip data object to a result list in case the determined degree of congruency between the first and the second potential trip data object exceeds a predefined threshold, wherein the matching method has been executed successfully in case the result list comprises at least one second potential trip data objects after having checked the first potential trip data object against all second potential trip data objects available to the trip sharing service; and allocating the first user to a best matching user as trip accompany in case of a successful execution of the matching method, wherein the best matching user is the user corresponding to the trip data object in the result list having the highest degree of congruency with the first potential trip data object and wherein the matching method is executed successfully in case the result list comprises at least one matching potential trip data object.

2. The computer implemented method according to claim 1 further comprising:

determining, by the trip sharing service, in case of a successful execution of the matching method, the role of the first user and the role of a best matching user, wherein the potential trip data objects of the result list having the highest degree of congruency with the first potential trip data object is the best matching potential trip data object and wherein the best matching user is the user corresponding to the best matching potential trip data object, sending, by the trip sharing service, a first matching result message to the client device belonging to the driver determined in the role determination step, the first matching result message comprising data specifying the passenger, and data specifying pick-up time and pick-up place of the passenger;

sending, by the trip sharing service, a second matching result message to the client device belonging to the passenger determined in the role determination step, the second matching result message comprising data specifying the driver.

3. The computer implemented method according to claim 1 further comprising:

determining, by the trip sharing service, in case of a successful execution of the matching method, the role of the first user and the role of a best matching user, wherein the potential trip data objects of the result list having the highest degree of congruency with the first potential trip data object is the best matching potential trip data object and wherein the best matching user is the user corresponding to the best matching potential trip data object, sending, by the trip sharing service, in case of a successful execution of the matching method, a first matching result message to the client device belonging to the driver determined in the role determination step, the first matching result message comprising data specifying the passenger, and data specifying pick-up time and pick-up place of the passenger;

receiving, by the trip sharing service, a driver's acceptance message from the client device belonging to the driver in case the driver accepted the passenger as trip accompany, the passenger having been specified in the first matching result message;

sending, by the trip sharing service, in case of receiving a driver's acceptance message, a second matching result message to the client device belonging to the passenger determined in the role determination step, the second result message comprising data specifying the driver;

receiving a passenger's acceptance message from the client device belonging to the passenger in case the passenger accepted the driver as trip accompany, the driver having been specified in the second matching result message;

receiving by the trip sharing service, a driver's rejection message from the client device belonging to the driver in case the driver rejected the passenger as trip accompany, the passenger having been specified in the first matching result message;

receiving by the trip sharing service, a passenger's rejection message from the client device belonging to the passenger in case the passenger rejected the driver as trip accompany, the driver having been specified in the second matching result message;

evaluating, by the trip sharing service, in case of receiving a driver's rejection message, in a first evaluation step, if at least one further potential trip data object and corresponding user was found by the matching method for the driver, the evaluation resulting in a termination of the method in case no further user matched, the evaluation resulting in the initiation of a new trip accompany allocation process in case at least one further user matched the driver, the allocation process beginning with the determination of the role of the former driver and the further matching user;

evaluating, by the trip sharing service, in case of receiving a passenger's rejection message, in a second evaluation step, if at least one further potential trip data object and corresponding user was found by the matching method for the passenger, the evaluation resulting in a termination of the method in case no further user matched, the evaluation resulting in the initiation of a new trip accompany allocation process in case at least one further user matched the passenger, the allocation process beginning with the determination of the role of the former passenger and the further matching user; and sending, by the trip sharing service, in case of receiving a passenger's acceptance message, a first notification message to the device belonging to the driver and sending a second notification message to the device belonging to the passenger, the first and second notification messages comprising a notification on the arrangement of the trip.

4. The computer implemented method according to claim 1, wherein the starting time specified in the first potential trip data object is the earliest acceptable starting time for the first user, wherein an arrival time is specified in the first potential trip data object, the arrival time being the latest acceptable arrival time for the first user, wherein the starting time specified in the second potential trip data object is the earliest acceptable starting time for the second user, and wherein an arrival time is specified in the second potential trip data object, the arrival time being the latest acceptable arrival time for the second user.

5. The computer implemented method according to claim 1, wherein the matching method comprises a permissive location matching method, the location matching method comprising:

comparing, by the trip sharing service, the pick-up radius specified by the first user with the pick-up radius specified by the second user, the first pick-up radius determining the maximum acceptable detour for picking-up passengers for the first user, the second pick-up radius determining the maximum acceptable detour for picking-up passengers for the second user;

comparing, by the trip sharing service, the drop-off radius specified by the first user with the pick drop-off radius specified by the second user, the first drop-off radius determining the maximum acceptable detour for dropping-off passengers for the first user, the second drop-off radius determining the maximum acceptable detour for dropping-off passengers for the second user;

determining, by the trip sharing service, the larger of the two pick-up radiuses and the larger of the two drop-off radiuses;

calculating, by the trip sharing service, a pick-up area, the pick-up area being a circle around the place of departure of the user having assigned the larger pick-up radius, the circle having as radius the larger of the two pick-up radiuses;

calculating, by the trip sharing service, a drop-off area, the drop-off area being a circle around the destination location of the user having assigned the larger drop-off radius, the circle having as radius the larger of the two drop-off radiuses;

determining, by the trip sharing service, in a first determination step, if the place of departure of the user having assigned the smaller pick-up radius lies within the pick-up area;

determining, by the trip sharing service, in a second determination step, if the destination location of the user having assigned the smaller drip-off radius lies within the drop-off area; and determining, by the trip sharing service, the matching score of the potential trip data objects corresponding to the first and the second user according to the results of the first and the second determination steps, wherein the matching score is highest if the place of departure of the user having assigned the smaller pick-up radius lies within the pick-up area and the destination location of the user having assigned the smaller drip-off radius lies within the drop-off area.

6. The computer implemented method according to claim 1, wherein the step of comparing the specifications of the first potential trip data object with the specifications of the at least one second potential trip data object is implemented as a comparison of vectors, wherein a first vector represents the first potential trip data object, a second vector represents the second potential trip data object, the first and the second vector each comprise multiple dimensions, wherein each dimension represents one specification of the represented potential trip data object, wherein each dimension has associated a weight, and wherein the comparison of the first and the second vector comprises a comparison of the angle of both vectors in a multi-dimensional space and wherein the weight of each dimension determines the impact of the corresponding dimension on the result of the comparison.

7. The computer implemented method according to claim 1, wherein the step of comparing the specifications of the first potential trip data object with the specifications of the at least one second potential trip data object to calculate a matching score comprises:
determining the distance of the places of departure of the first and the second potential trip data objects;
determining the distance of the destinations of the first and the second potential trip data objects;
determining the temporal proximity of the starting times of first and the second potential trip data objects; and determining the temporal proximity of the arrival times of first and the second potential trip data objects, wherein the matching score raises with the determined degree of similarity regarding the compared starting times, arrival times, places of departures and destinations.

8. The computer implemented method according to claim 1, wherein specifications of the first and the at least one second potential trip data object in addition each comprise a specification of the price a driver expects to receive from each passenger and of the amount of money a passenger is willing to pay to the driver for being carried.

9. The computer implemented method according to claim 1, wherein specifications of the first and the at least one second potential trip data object in addition each comprise:
a specification of smoker/non-smoker preferences of a user;
a specification of the taste in music of a user;
a specification of the preferred age of a trip accompany;
a specification of the preferred gender of a trip accompany;
a specification of the preferred minimum acquaintance of the first user with the second user, wherein the acquaintance being calculated from the number of trips shared by both users in the past; and
a specification of the preferred minimum social proximity of one user to another user, the social proximity being determined by the consideration of social groups both users are member of, the social groups being taken from the group consisting of social online-communities, employee lists of companies and social groups being defined within the trip sharing service.

10. The computer implemented method according to claim 1, wherein the specifications of the first and the at least one second potential trip data object each comprise a user's preference to act as driver, the preference to act as driver being specified as a value of a scale, the scale comprising at least three different values, the value indicating the degree of the user's willingness to act as driver, wherein the driver role is never allocated to a user who's preference to act as driver is zero, wherein the driver role is always allocated to a user who's preference to act as driver is the maximum possible according to the scale, and wherein the probability of a user to be allocated the driver role raises with the specified degree of preference of a user to act as driver.

11. The computer implemented method according to claim 1, wherein the starting location and the destination location of each potential trip data object is determined by mapping tags to unequivocal addresses, wherein the tags being taken from the group of general tags, user specific tags, group specific tags, location tags and route tags.

12. The computer implemented method according to claim 1, wherein assigning one role to each of the users comprises assigning the driver role to that user who's starting point is the most distant starting point from the destination location of the first user and who's preference to act as driver is greater than zero.

13. The computer implemented method according to claim 1, wherein the trip sharing service receives a request from an event managing service hosted on a remote server, the event managing service providing via a graphical user interface its customers the option to book tickets, the graphical user interface providing the customer in addition with the option to select the trip sharing service for traveling to the booked event, wherein the selection of this trip sharing service option results in the submission of a trip sharing service request to the trip sharing service, the trip sharing service request comprising at least the e-mail address of the customer and the starting time and location of the booked event, and wherein at least one result generated during the execution of the trip sharing service is sent as meeting request e-mail to the customers e-mail address.

14. A non-transitory computer readable storage medium containing instructions that when executed by a processor cause the processor to perform a trip sharing service method, the trip sharing service method allocating drivers and passengers sharing a trip, the method comprising:
receiving, by the trip sharing service, a first service request, the first service request being submitted from a first client device belonging to a first user, wherein the first service request comprises sufficient data to specify at least a starting time, a place of departure and a destination;
specifying, by the trip sharing service, a first potential trip data object by the trip sharing service, the specification being initiated upon receiving the first service request, the first potential trip data object being the result of processing the first service request, the specifications of the first potential trip data object comprising the starting time, an arrival time, the place of departure and the destination, the specifications of the first potential trip data object further comprising user related specifications;
executing, by the trip sharing service, a matching method, the matching method checking the first potential trip data object against at least a second potential trip data object, the second potential trip data object having been created by the trip sharing service upon receipt of a service request of a second user, the matching method comprising for each checking of the first against the second potential trip data objects the steps of:
comparing the specifications of the first potential trip data object with the specifications of the at least one second potential trip data object, determining the degree of congruency of the specifications of the compared potential trip data objects, assigning one role to the first and the second user, the role being taken from the group consisting of a driver role and a passenger role, wherein the assigned roles of the two users are distinct from each other and are determined upon comparison of at least the driver/passenger preferences specified in the first and in the second potential trip data object, wherein the user having been assigned the driver role is referred to as driver and the user having been assigned the passenger role is referred to as passenger, adding the second potential trip data object to a result list in case the determined degree of congruency between the first and the second potential trip data object exceeds a predefined threshold, wherein the matching method has been executed successfully in case the result list comprises at least one second potential trip data objects after having checked the first potential trip data object against all second potential trip data objects available to the trip sharing service; and allocating the first user to a best matching user as trip accompany in case of a successful execution of the matching method, wherein the best matching user is the user corresponding to the trip data object in the result list having the highest degree of congruency with the first potential trip data object and wherein the matching method is executed successfully in case the result list comprises at least one matching potential trip data object.

15. A data processing system comprising a server and at least a first client device, the server and the first client device being configured for communicating with one another, the first client device being configured to submit a first service request to the service, the server being configured to generate a result in response to the first service request and to return the result to the first client device, the server including:

processing means for executing the instructions;

a network interface for connecting the computer system to a network;

a computer readable storage medium containing instructions that when executed by a processor cause the processor to perform a trip sharing service for allocating drivers and passengers sharing a trip, the trip sharing service being a computer-implemented method comprising the steps of:

receiving a first service request by the trip sharing service, the first service request being submitted from a first client device belonging to a first user, wherein the first service request comprises sufficient data to specify at least a starting time, a place of departure and a destination;

specifying a first potential trip data object by the trip sharing service, the specification being initiated upon receiving the first service request, the first potential trip data object being the result of processing the first service request, the specifications of the first potential trip data object comprising the starting time, an arrival time, the place of departure and the destination, the specifications of the first potential trip data object further comprising user related specifications;

executing a matching method, the matching method checking the first potential trip data object against at least a second potential trip data object, the second potential trip data object having been created by the trip sharing service upon receipt of a service request of a second user, the matching method comprising for each checking of the first against the second potential trip data objects the steps of:

comparing the specifications of the first potential trip data object with the specifications of the at least one second potential trip data object, determining the degree of congruency of the specifications of the compared potential trip data objects, assigning one role to the first and the second user, the role being taken from the group consisting of a driver role and a passenger role, wherein the assigned roles of the two users are distinct from each other and are determined upon comparison of at least the driver/passenger preferences specified in the first and in the second potential trip data object, wherein the user having been assigned the driver role is referred to as driver and the user having been assigned the passenger role is referred to as passenger;

adding the second potential trip data object to a result list in case the determined degree of congruency between the first and the second potential trip data object exceeds a predefined threshold, wherein the matching method has been executed successfully in case the result list comprises at least one second potential trip data objects after having checked the first potential trip data object against all second potential trip data objects available to the trip sharing service; and allocating the first user to a best matching user as trip accompany in case of a successful execution of the matching method, wherein the best matching user is the user corresponding to the trip data object in the result list having the highest degree of congruency with the first potential trip data object and wherein the matching method is executed successfully in case the result list comprises at least one matching potential trip data object.

16. The data processing system according to claim 15, the first client device comprising:

a non-transitory computer readable storage medium having installed a calendar application and a service integration module, the service integration module having read and write access to a calendar application installed on the first client device, the service integration module comprising instructions, the instructions when executed by a processor cause the processor to perform a method for integrating the trip sharing service in the calendar application, the method comprising:

submitting a service request to the trip sharing service by the service integration module, the service integration module having read and write access to the calendar application, the service request being a call of a first web service interface of the trip sharing service, the call of the first web service interface initiating the execution of the trip sharing service and the generation of at least one result, receiving the at least one result by the service integration module via a web service interface provided by the trip sharing service, the web service interface being taken from the group consisting of the first web service interface and a second web service interface, processing the result by the service integration module, the processing comprising extracting data required for specifying an event in an electronic calendar of the calendar application from the result, the event being taken from the group consisting of singular events and recurring events, the recurring events being events with a particular recurrence pattern, the event being a data object in an electronic calendar of the calendar application, updating the electronic calendar of the calendar application, the updating comprising the execution of updating steps, the updating steps being taken from the group consisting of creating, deleting and modifying an event in the electronic calendar of the calendar application by the service integration module in response to receiving the at least one result, means for displaying the graphical user interface of the electronic calendar application and the updates introduced to the calendar application;

processing means for executing instructions;

input means for specifying via a graphical user interface provided by the service integration module a service request to the trip sharing service, the input being provided by the user; and a network interface for connecting the computer system to a network.

17. The data processing system according to claim 16, wherein the service integration module is in addition operable to automatically predict a required calendar event by:

analyzing events within the electronic calendar;

predicting and specifying at least one required event;

assigning the at least one predicted required event additional data required by the service for execution;

submitting a service request to the first web service interface of the trip sharing service, the service request comprising the data of the predicted required event, the call of the first web service interface initiating the execution of the trip sharing service and the generation of at least one result; and wherein the service integration module is a software program being interoperable with the calendar program and being selected from the group consisting of: a software implemented as 'plug-in' for the calendar application, an independent service program being registered as event listener with a calendar event, and an independent service program searching the calendar application for new calendar entries on a regular basis.

18. The data processing system according to claim 15, the storage medium of the at least one client having installed a trip manager program, the trip manager program comprising instructions, the instructions when executed by a processor cause the processor to perform a method for managing trips arranged by the trip sharing service, the method comprising:

managing predicted trip data objects in a first list of trip data objects, the first list residing solely on the first client device;

managing published trip data objects in a second list of trip data objects, the second list residing on the first client device, each published trip data object corresponding to a service request submitted to the trip sharing service from the first client device, wherein moving a predicted trip data object from the first list to the second list results in a submission of a service request to the trip sharing service;

managing arranged trip data objects in a third list of trip data objects, each arranged trip data object corresponding to a trip in the future having been successfully organized by the trip sharing service in response to receiving a service request, the third list residing on the first client device and on the server; and managing past trip data objects in a fourth list of trip data objects, each past trip data object corresponding to a past trip having been successfully organized by the trip sharing service, the fourth list residing on the first client device and on the server.

19. The data processing system according to claim 15, the first client device including:

a computer-readable storage medium containing instructions that when executed by a processor cause the processor to perform a method for integrating the trip sharing service into an calendar application, the calendar application being installed on the computer-readable storage medium, the method comprising:

submitting, by the calendar application, a service request to the trip sharing service, the service request comprising the specification of a trip event, the service request being sent in the form of a first meeting request e-mail to a service e-mail address by the calendar application, wherein the service e-mail address represents the trip sharing service, wherein the receipt of the service request initiates the execution of the trip sharing service, receiving, by the calendar application of the first client device, a result returned by the trip sharing service hosted on the server, the result having the form of an update request by the service, the update request being an update request e-mail sent to the e-mail address used by the calendar application for sending the service request, the update request e-mail being taken from the group consisting of a meeting request response e-mail and a second meeting request e-mail, executing the received update request by the calendar application, resulting in an automatic update of the electronic calendar of the calendar application;

means for displaying the graphical user interface of the electronic calendar application and the updates introduced to the calendar application;

processing means for executing the instructions;

input means for specifying via a graphical user interface provided by the service integration module a service request to the service to be integrated in the calendar application, the input being provided by the user; and a network interface for connecting the computer system to a network.

20. The data processing system according to claim 15, wherein the client is a mobile processing device, and wherein the network interface is an interface of the mobile processing device providing ongoing or transient means to exchange data with other processing devices.

* * * * *